United States Patent
Alexandrov et al.

(10) Patent No.: US 11,748,657 B2
(45) Date of Patent: *Sep. 5, 2023

(54) SOURCE IDENTIFICATION BY NON-NEGATIVE MATRIX FACTORIZATION COMBINED WITH SEMI-SUPERVISED CLUSTERING

(71) Applicant: Triad National Security, LLC, Los Alamos, NM (US)

(72) Inventors: Boian S. Alexandrov, Santa Fe, NM (US); Ludmil B. Alexandrov, Santa Fe, NM (US); Filip L. Iliev, Oakland, CA (US); Valentin G. Stanev, Crofton, MD (US); Velimir V. Vesselinov, Santa Fe, NM (US)

(73) Assignee: Triad National Security, LLC, Los Alamos, NM (US)

( * ) Notice: Subject to any disclaimer, the term of this patent is extended or adjusted under 35 U.S.C. 154(b) by 241 days.

This patent is subject to a terminal disclaimer.

(21) Appl. No.: 17/020,504

(22) Filed: Sep. 14, 2020

(65) Prior Publication Data

US 2021/0004724 A1  Jan. 7, 2021

Related U.S. Application Data

(63) Continuation of application No. 15/690,176, filed on Aug. 29, 2017, now Pat. No. 10,776,718.

(Continued)

(51) Int. Cl.
*G06N 20/00* (2019.01)
*G06F 17/16* (2006.01)
(Continued)

(52) U.S. Cl.
CPC .............. *G06N 20/00* (2019.01); *G06F 17/16* (2013.01); *G06F 18/2115* (2023.01);
(Continued)

(58) Field of Classification Search
CPC ...................................................... G06F 17/16
See application file for complete search history.

(56) References Cited

U.S. PATENT DOCUMENTS

| | | | |
|---|---|---|---|
| 7,953,682 | B2 | 5/2011 | Smith et al. |
| 8,015,003 | B2 | 9/2011 | Wilson et al. |

(Continued)

OTHER PUBLICATIONS

Alexandrov, Ludmil B., Serena Nik-Zainal, David C. Wedge, Peter J. Campbell, and Michael R. Stratton. "Deciphering signatures of mutational processes operative in human cancer." *Cell reports* vol. 3, No. 1 (2013): pp. 246-259.

(Continued)

*Primary Examiner* — Michael D. Yaary
(74) *Attorney, Agent, or Firm* — Klarquist Sparkman, LLP

(57) ABSTRACT

Machine-learning methods and apparatus are provided to solve blind source separation problems with an unknown number of sources and having a signal propagation model with features such as wave-like propagation, medium-dependent velocity, attenuation, diffusion, and/or advection, between sources and sensors. In exemplary embodiments, multiple trials of non-negative matrix factorization are performed for a fixed number of sources, with selection criteria applied to determine successful trials. A semi-supervised clustering procedure is applied to trial results, and the clustering results are evaluated for robustness using measures for reconstruction quality and cluster separation. The number of sources is determined by comparing these measures for different trial numbers of sources. Source locations and parameters of the signal propagation model can also be determined. Disclosed methods are applicable to a wide range of spatial problems including chemical dispersal, pressure transients, and electromagnetic signals, and also to non-spatial problems such as cancer mutation.

28 Claims, 36 Drawing Sheets

Related U.S. Application Data

(60) Provisional application No. 62/381,486, filed on Aug. 30, 2016.

(51) Int. Cl.
| | |
|---|---|
| *G06F 18/2115* | (2023.01) |
| *G06F 18/2133* | (2023.01) |
| *G06F 18/2135* | (2023.01) |
| *G06N 7/01* | (2023.01) |

(52) U.S. Cl.
CPC ...... *G06F 18/2133* (2023.01); *G06F 18/2135* (2023.01); *G06N 7/01* (2023.01)

(56) References Cited

U.S. PATENT DOCUMENTS

| | | | |
|---|---|---|---|
| 8,195,734 | B1 | 6/2012 | Long et al. |
| 8,209,138 | B1 | 6/2012 | Shaeffer |
| 2009/0287624 | A1 | 11/2009 | Rouat et al. |
| 2011/0246573 | A1* | 10/2011 | Liu .................. G06F 17/16 709/204 |
| 2014/0181171 | A1 | 6/2014 | Dourbal |

OTHER PUBLICATIONS

Alexandrov, Ludmil B., Serena Nik-Zainal, David C. Wedge, Samuel AJR Aparicio, Sam Behjati, Andrew V. Biankin, Graham R. Bignell et al. "Signatures of mutational processes in human cancer," pp. 1-24 (also published as Alexandrov et al. "Signatures of mutational processes in human cancer," *Nature* vol. 500, No. 7463 (2013): pp. 415-438).

Alexandrov, Boian S., and Velimir V. Vesselinov. "Blind source separation for groundwater pressure analysis based on nonnegative matrix factorization." *Water Resources Research* vol. 50, No. 9 (2014): pp. 7332-7347.

Alexandrov, Ludmil B., and Michael R. Stratton. "Mutational signatures: the patterns of somatic mutations hidden in cancer genomes." *Current opinion in genetics & development* vol. 24 (2014): pp. 52-60.

Alexandrov, Ludmil B. "Understanding the origins of human cancer." *Science* vol. 350, No. 6265 (2015): pp. 1175-1177.

Alexandrov, Ludmil B., Philip H. Jones, David C. Wedge, Julian E. Sale, Peter J. Campbell, Serena Nik-Zainal, and Michael R. Stratton. "Clock-like mutational processes in human somatic cells," pp. 1-19 (also published as Alexandrov et al. "Clock-like mutational processes in human somatic cells," *Nature genetics* vol. 47, No. 12 (2015): pp. 1402-1407).

Alexandrov, Ludmil B., Serena Nik-Zainal, Hoi Cheong Siu, Suet Yi Leung, and Michael R. Stratton. "A mutational signature in gastric cancer suggests therapeutic strategies." *Nature communications* vol. 6, No. 8683 (2015): pp. 1-7.

Alexandrov, Ludmil B., Young Seok Ju, Kerstin Haase, Peter Van Loo. Iñigo Martincorena, Serena Nik-Zainal, Yasushi Totoki et al. "Mutational signatures associated with tobacco smoking in human cancer," pp. 1-19 (also published as Alexandrov et al. "Mutational signatures associated with tobacco smoking in human cancer," *Science* vol. 354, No. 6312 (2016): pp. 618-622).

Belouchrani, Adel, Karim Abed-Meraim, J-F. Cardoso, and Eric Moulines. "A blind source separation technique using second-order statistics." *IEEE Transactions on Signal Processing* vol. 45, No. 2 (1997): pp. 434-444.

Beutel, Alex, Partha Pratim Talukdar, Abhimanu Kumar, Christos Faloutsos, Evangelos E. Papalexakis. and Eric P. Xing. "FlexiFaCT: Scalable flexible factorization of coupled tensors on Hadoop," 11 pages (also published in *Proceedings of the 2014 SIAM International Conference on Data Mining*, (2014): pp. 109-117).

Cervone, Guido, Pasquale Franzese, and Allen PK Keesee. "Algorithm quasi-optimal (AQ) learning." *Wiley Interdisciplinary Reviews: Computational Statistics* vol. 2, No. 2 (2010): pp. 218-236.

Chan, Christine W., and Guo H. Huang. "Artificial intelligence for management and control of pollution minimization and mitigation processes." *Engineering applications of artificial intelligence* vol. 16, No. 2 (2003): pp. 75-90.

Cichocki, Andrzej, Rafal Zdunek, Seungjin Choi, Robert Plemmons, and Shun-Ichi Amari. "Novel multi-layer non-negative tensor factorization with sparsity constraints," pp. 1-10 (also published as Cichocki et al. "Novel multi-layer non-negative tensor factorization with sparsity constraints," *Adaptive and Natural Computing Algorithms* (2007): pp. 271-280).

Cichocki, Andrzej, Rafal Zdunek, Anh Huy Phan, and Shun-ichi Amari. *Nonnegative matrix and tensor factorizations: applications to exploratory multi-way data analysis and blind source separation.* John Wiley & Sons (2009): pp. 17-19.

Facchinelli, A., E. Sacchi, and L1 Mallen. "Multivariate statistical and GIS-based approach to identify heavy metal sources in soils." *Environmental pollution* vol. 114, No. 3 (2001): pp. 313-324.

Github.com, "rNMFk/ShiftNMFk.jl," document marked Oct. 26, 2016, downloaded from https://github.com/rNMF/ShiftNMFk.jl on Aug. 21, 2017, 2 pages.

Hansen, Scott G., Helen L. Wu, Benjamin J. Burwitz, Colette M. Hughes, Katherine B. Hammond, Abigail B. Ventura, Jason S. Reed et al. "Broadly targeted CD8+ T cell responses restricted by major histocompatibility complex E," pp. 1-16 (also published as Hansen et al., *Science* vol. 351, No. 6274 (2016): pp. 714-720).

Harp, Dylan R., and Velimir V. Vesselinov. "Identification of Pumping Influences in Long-Term Water Level Fluctuations." *Groundwater* vol. 49, No. 3 (2011): pp. 403-414.

Harshman, Richard A., Sungjin Hong, and Margaret E. Lundy. "Shifted factor analysis—Part I: Models and properties." *Journal of chemometrics* vol. 17, No. 7 (2003): pp. 363-378.

Hartigan, John A., and Manchek A. Wong. "Algorithm AS 136: A k-means clustering algorithm." *Journal of the Royal Statistical Society. Series C (Applied Statistics)* vol. 28, No. 1 (1979): pp. 100-108.

He, Jiachuan, Hansen, S. K., and Vesselinov, V. V. "Analysis of Hydrologic Time Series Reconstruction Uncertainty Due to Inverse Model Inadequacy Using the Laguerre Expansion Method." In *AGU Fall Meeting Abstracts* (2016) 15 pages.

Hong, Sungjin, and Richard A. Harshman. "Shifted factor analysis—part II: algorithms." *Journal of chemometrics* 17, No. 7 (2003): pp. 379-388.

Huang, Qinghua, and Tong Wang. "Acoustic source localization in mixed field using spherical microphone arrays." *EURASIP Journal on Advances in Signal Processing*, vol. 2014, article 90 (2014): pp. 1-16.

Iliev, Filip L., Valentin G. Stanev, Velimir V. Vesselinov, and Boian S. Alexandrov. "Sources identification using shifted non-negative matrix factorization combined with semi-supervised clustering." ArXiv <https://arxiv.org/abs/1612.03950>1612.03950 (2016), pp. 1-25.

Ince, Nuri Firat, Chu-Shu Kao, Mostafa Kaveh, A. Tewfik, and Joseph F. Labuz. "A Machine Learning Approach for Locating Acoustic Emission." *EURASIP Journal on Advances in Signal Processing* vol. 2010, article 895486 (2010): pp. 1-14.

Jutten, Christian, and Jeanny Herault. "Blind separation of sources, part I: An adaptive algorithm based on neuromimetic architecture." *Signal processing* vol. 24, No. 1 (1991): pp. 1-10.

Khalil, Abedalrazq, Mohammad N. Almasri., Mac McKee, and Jagath J. Kaluarachchi. "Applicability of statistical learning algorithms in groundwater quality modeling." *Water Resources Research* vol. 41, W05010 (2005), pp. 1-16.

Lee, Daniel D., and H. Sebastian Seung. "Unsupervised learning by convex and conic coding." In *Advances in neural information processing systems* (1997): pp. 515-521.

Lee, Daniel D., and H. Sebastian Seung. "Learning the parts of objects by non-negative matrix factorization." *Nature* vol. 401, No. 6755 (1999): pp. 788-791.

Lee, Daniel D., and H. Sebastian Seung. "Algorithms for non-negative matrix factorization," 7 pages (also published in *Advances in neural information processing systems* (2001): pp. 556-562).

Long, C.J., Bunker, D., Li, X., Karen, V.L., Takeuchi, I., "Rapid identification of structural phases in combinatorial thin-film librar-

(56) References Cited

OTHER PUBLICATIONS ies using x-ray diffraction and non-negative matrix factorization," *Review of Scientific Instruments* vol. 80, No. 10, article 103902 (2009), pp. 1-6.

Manca, Germana, and Guido Cervone. "The case of arsenic contamination in the Sardinian Geopark, Italy, analyzed using symbolic machine learning," 7 pages (also published as Manca et al. "The case of arsenic contamination in the Sardinian Geopark, Italy, analyzed using symbolic machine learning," *Environmetrics* vol. 24, No. 6 (2013): pp. 400-406).

McCann, John P., et al. "Phase II Investigation Report for Sandia Canyon." Technical Report LA-UR-12-24593. Los Alamos National Laboratory (2012) 506 pages.

Mørup, Morten, Kristoffer H. Madsen, and Lars K. Hansen. "Shifted Non-negative Matrix Factorization." *2007 IEEE Workshop on Machine Learning for Signal Processing* (2007): pp. 139-144.

Mørup, Morten, and Lars Kai Hansen. "Tuning Pruning in Sparse Non-negative Matrix Factorization." *17th EuropeanSignal Processing Conference* (2009): pp. 1923-1927.

Nguyen, Viet-Dung, Karim Abed-Meraim, and Nguyen Linh-Trung. "Second-order optimization based adaptive PARAFAC decomposition of three-way tensors." *Digital Signal Processing* vol. 63 (2017): pp. 100-111.

Oakley, Jeremy E., and Anthony O'Hagan. "Probabilistic sensitivity analysis of complex models: a Bayesian approach." *Journal of the Royal Statistical Society: Series B (Statistical Methodology)* vol. 66, part 3 (2004): pp. 751-769.

O'Malley, Daniel, and Velimir V. Vesselinov. "ToQ. jl: A high-level programming language for D-Wave machines based on Julia," 7 pages, (also published as O'Malley et al. "ToQ. jl: A high-level programming language for D-Wave machines based on Julia," in *High Performance Extreme Computing Conference (HPEC), IEEE* (2016): 7 pages).

Paatero, Pentti, and Unto Tapper. "Positive matrix factorization: A non-negative factor model with optimal utilization of error estimates of data values." *Environmetrics* vol. 5, No. 2 (1994): pp. 111-126.

Phillips, S. W. "Inverse Identification of Transient Thermal Properties and Heat Sources Using Genetic Algorithms", thesis, Cornell University, 2006. Accessed from https://ecommons.cornell.edu/bitstream/handle/1813/3442/Phillips_ThesisDraft8.pdf;sequence-1 on Aug. 29, 2016, 60 pages.

Rasekh, Amin, and Kelly Brumbelow. "Machine Learning Approach for Contamination Source Identification in Water Distribution Systems." In *World Environmental and Water Resources Congress 2012: Crossing Boundaries* (2012): pp. 3171-3177.

Rousseeuw, Peter J. "Silhouettes: a graphical aid to the interpretation and validation of cluster analysis." *Journal of computational and applied mathematics* vol. 20 (1987): pp. 53-65.

Schmidt, Mikkel N., Ole Winther, and Lars Kai Hansen. "Bayesian Non-negative Matrix Factorization," 8 pages (also published as Schmidt et al. "Bayesian Non-negative Matrix Factorization," in *Proceedings of 8th International Conference on Independent Component Analysis and Signal Separation, ICA 2009*, Paraty, Brazil (2009): pp. 540-547).

Shahraiyni, Hamid Taheri, Sahar Sodoudi, Andreas Kerschbaumer, and Ulrich Cubasch. "A new structure identification scheme for ANFIS and its application for the simulation of virtual air pollution monitoring stations in urban areas." *Engineering Applications of Artificial Intelligence* vol. 41 (2015): pp. 175-182.

Shin, Kijung, Lee Sael, and U. Kang. "Fully scalable methods for distributed tensor factorization." pp. 1-14 (also published as Shin et al., "Fully scalable methods for distributed tensor factorization," *IEEE Transactions on Knowledge and Data Engineering* vol. 29, No. 1 (2017): pp. 100-113).

Shrestha, S., and Fl Kazama. "Assessment of surface water quality using multivariate statistical techniques: A case study of the Fuji river basin, Japan." *Environmental Modelling & Software* vol. 22, No. 4 (2007): pp. 464-475.

Smaragdis, Paris, and Judith C. Brown. "Non-negative matrix factorization for polyphonic music transcription." TR2003-139, Mitsubishi Electric Research Laboratories (2003): 6 pages (also published as Smaragdis et al. "Non-negative matrix factorization for polyphonic music transcription," in 2003 *IEEE Workshop on Applications of Signal Processing to Audio and Acoustics* (2003): pp. 177-180).

Srivastava, S. K., S. Niebling, B. Küstner, P. R. Wich, C. Schmuck, and S. Schlücker. "Characterization of guanidiniocarbonyl pyrroles in water by pH-dependent UV Raman spectroscopy and component analysis." *Physical Chemistry Chemical Physics* vol. 10, No. 45 (2008): pp. 6770-6775.

Stanev et al., "Machine learning approach for identification of release sources in advection-diffusion systems," available at: https://arxiv.org/pdf/1612.03948.pdf , document marked Mar. 3, 2017, pp. 1-25.

Tan, Vincent Y. F., and Cédric Févotte. "Automatic relevance determination in nonnegative matrix factorization with the beta-divergence." ArXiv <https://arxiv.org/abs/1111.6085> 1111.6085 (2012): pp. 1-15 (also published as Tan et al. "Automatic relevance determination in nonnegative matrix factorization with the beta-divergence," *IEEE Transactions on Pattern Analysis and Machine Intelligence* vol. 35, No. 7 (2013): pp. 1592-1605).

Tariq, Saadia R., Munir H. Shall, N. Shaheen, M. Jaffar, and A. Klialique. "Statistical source identification of metals in groundwater exposed to industrial contamination," 7 pages (also published as Tariq et al. "Statistical source identification of metals in groundwater exposed to industrial contamination," *Environmental Monitoring and Assessment* vol. 138, No. 1 (2008): pp. 159-165).

Vesselinov, Velimir V., Shlomo P. Neuman, and Walter A. Illman. "Three-dimensional numerical inversion of pneumatic cross-hole tests in unsaturated fractured tuff: 1. methodology and borehole effects." *Waler Resources Research* vol. 37, No. 12 (2001): pp. 3001-3017.

Vesselinov, Velimir V., Shlomo P. Neuman, and Walter A. Illman. "Three-dimensional numerical inversion of pneumatic cross-hole tests in unsaturated fractured tuff: 2. equivalent parameters, high-resolution stochastic imaging and scale effects." *Water Resources Research* vol. 37, No. 12 (2001): pp. 3019-3041.

Vesselinov, Velimir V. "An alternative conceptual model of groundwater flow and transport in saturated zone beneath the Pajarito Plateau." Technical Report LA-UR-05-6741. Los Alamos National Laboratory (2004): pp. 1-12.

Vesselinov, Velimir V., Danny Katzman, David Broxton, Kay Birdsell, Steven Reneau, David Vaniman, Pat Longmire et al. "Data and Model-Driven Decision Support for Environmental Management of a Chromium Plume at Los Alamos National Laboratory-13264." *WM Symposia*, 1628 E. Southern Avenue, Suite 9-332, Tempe, AZ 85282 (United States) (2013): pp. 1-18.

Vesselinov, V. V., and Alexandrov, B. S., "Model-free Source Identification" in *AGU Fall Meeting*, San Francisco (2014): 31 pages.

Vesselinov, V. V., and Alexandrov, Boian S. "Deconstruction of groundwater transients using non-negative matrix factorization (NMFt)," 1 page (also published as Vesselinov et al. "Deconstruction of groundwater transients using non-negative matrix factorization (NMFt)," in *Computational Methods in Water Resources 2014*, Stuttgart, Germany (2014)).

Vesselinov, V. V., and B. Alexandrov. "Model-free data analysis for source separation based on Non-Negative Matrix Factorization and k-means clustering (NMFk)." In *AGU Fall Meeting Abstracts*, (2014): 1 page.

Vesselinov, O'Malley, and Katzman, "Model-Assisted Decision Analyses Related to a Chromium Plume at Los Alamos National Laboratory," in: *Waste Management Symposium* (2015): 41 pages.

Vesselinov, V. V., Alexandrov, B. & O'Malley, D. "Blind Source Separation for Contaminant Source Characterization." No. LA-UR-16-23702, Los Alamos National Laboratory (2016): 27 pages.

Vesselinov, V. V., O'Malley, D. & Alexandrov, B. "Imaging Contaminant Plumes Using Non-Nonnegative-Matrix Factorization." LANL May 25, 2016, SIAM Imaging, Albuquerque, New Mexico, Apr. 20-24, 2016: 1 page.

(56) References Cited

OTHER PUBLICATIONS

Vesselinov, Velimir Valentinov, and Daniel O'Malley. Model Analyses of Complex Systems Behavior using MADS. No. LA-UR-16-29120. Los Alamos National Laboratory (2017): 25 pages.

Vesselinova et al., "Dynamical Model of Drug Accumulation in Bacteria: Sensitivity Analysis and Experimentally Testable Predictions," *PloS One*, vol. 11, No. 11, Nov. 8, 2016, pp. 1-20.

Vihola, Matti. "Robust adaptive Metropolis algorithm with coerced acceptance rate." ArXiv <https://arxiv.org/abs/1011.4381v2> 1011. 43 81 (2011): pp. 1-21.

Wachter, Andreas, and Lorenz T. Biegler. "On the implementation of an interior-point filter line-search algorithm for large-scale nonlinear programming," 33 pages (also published as Wachter et al. "On the implementation of an interior-point filter line-search algorithm for large-scale nonlinear programming," *Mathematical programming* vol. 106, No. 1 (2006): pp. 25-57).

Wagner, Brian J. "Simultaneous parameter estimation and contaminant source characterization for coupled groundwater flow and contaminant transport modelling." *Journal of Hydrology* vol. 135, No. 1-4 (1992): pp. 275-303.

Wang, Jingbo, and Nicholas Zabaras. "Using Bayesian statistics in the estimation of heat source in radiation." pp. 1-13 (also published as Wang et al. "Using Bayesian statistics in the estimation of heat source in radiation," *International Journal of Heat and Mass Transfer* vol. 48, No. 1 (2005): pp. 15-29).

Wang, Yiyin, and Geert Lens. "Reference-free time-based localization for an asynchronous target." *EURASIP Journal on Advances in Signal Processing* vol. 2012, article 19 (2012): pp. 1-21.

Watanabe, K., Hidaka, A., Nobuyuki, O., Kurita, T. "Automatic Analysis of Composite Physical Signals Using Non-Negative Factorization and Information Criterion," PLoS ONE, vol. 7, No. 3, (2012): pp. 1-9.

Weiss, Robert. "An approach to Bayesian sensitivity analysis," pp. 1-15 (also published as Weiss, "An approach to Bayesian sensitivity analysis," *Journal of the Royal Statistical Society, Series B* (1996): pp. 739-750).

Wikipedia.com, "Akaike information criterion," downloaded from https://en.wikipedia.org/wiki/Akaike_information_criterion, on Aug. 24, 2017, 8 pages.

Xu, Wei, Xin Liu, and Yihong Gong. " Document clustering based on non-negative matrix factorization." In *Proceedings of the 26th annual international ACM SIGIR conference on Research and development in informaion retrieval*, ACM (2003): pp. 267-273.

Yokota, Tatsuya, Namgil Lee, and Andrzej Cichocki. "Robust multilinear tensor rank estimation using higher order singular value decomposition and information criteria." *IEEE Transactions on Signal Processing* vol. 65, No. 5 (2017): pp. 1196-1206.

Zarzoso, V., and A. K. Nandi. "Blind source separation." In *Blind Estimation Using Higher-Order Statistics*, Springer US (1999): pp. 167-252.

\* cited by examiner

FIG. 1B    FIG. 1C

SOURCE IDENTIFICATION BY NON-NEGATIVE MATRIX FACTORIZATION COMBINED WITH SEMI-SUPERVISED CLUSTERING

CROSS-REFERENCE TO RELATED APPLICATIONS

This application is a Continuation of U.S. patent application Ser. No. 15/690,176 (now U.S. Pat. No. 10,776,718), entitled "SOURCE IDENTIFICATION BY NON-NEGATIVE MATRIX FACTORIZATION COMBINED WITH SEMI-SUPERVISED CLUSTERING," filed Aug. 29, 2018, which claims the benefit of U.S. Provisional Application No. 62/381,486, entitled "SOURCE IDENTIFICATION BY NON-NEGATIVE MATRIX FACTORIZATION COMBINED WITH SEMI-SUPERVISED CLUSTERING," filed Aug. 30, 2016, both of which applications are incorporated by reference herein in their entirety.

ACKNOWLEDGMENT OF GOVERNMENT SUPPORT

This invention was made with government support under Contract No. DE-AC52-06NA25396 awarded by the U.S. Department of Energy. The government has certain rights in the invention.

SUMMARY

Apparatus, computer-readable storage media, and methods are disclosed to identify an unknown number of sources from mixed signals observed at a plurality of sensors, in the presence of signal variations from sources to sensors, or between sensors. In certain examples of the disclosed technology, the sources and sensors have spatial locations, and identification of the sources includes determining the location of each source. In certain examples of the disclosed technology, the sources, the sensors, or both the sources and the sensors do not have spatial locations, or can have abstract locations. The spatial locations can be distributed in any number of dimensions, including in one dimension, in two dimensions, and in three dimensions, and in spaces that have curvature or no curvature. In certain examples of the disclosed technology, the sources can generate respective signals that evolve continuously over time, while in other examples the signals can evolve as a function of a discrete variable, such as cell division or mutation. In certain examples, the source signals can be unknown, and identification of sources can include determination of one or more signals as generated by respective sources. In certain examples of the disclosed technology, the signal variations can evolve according to a signal propagation model, which can be a wave-like propagation model associated with a medium-dependent propagation velocity, and/or an attenuation that is dependent on distance. In certain examples of the disclosed technology, the signal variations can evolve according to a diffusion and/or advection model, in which signal evolution can depend on signal gradients, or according to another model amenable to Green's function treatment. In certain examples of the disclosed technology, the signal variations can be isotropic, while in other examples the signal variations can be anisotropic.

In some examples of the disclosed technology, multiple runs are performed. Each run assumes a respective, different number of contributing sources. In a first phase of each run, multiple independently seeded trials of a non-negative matrix factorization (NMF) procedure are performed. In certain examples of the disclosed technology, the NMF procedure incorporates a model for signal variation, which could be a wave-like propagation model in some embodiments, or a diffusion model in some other embodiments. In certain examples of the disclosed technology, the trial results can be discarded if specified selection criteria are not met; if the selection criteria are met, or if there are no selection criteria, the trial is regarded as successful, and the resulting source information is collected. The NMF procedure can additionally generate a solution for the signal propagation model, and also a transfer matrix specifying coupling factor coefficients from each source to each sensor. In a second phase of each run, the collected source information from all trials is subjected to a clustering procedure. In certain examples of the disclosed technology, the clustering procedure can use a k-Means algorithm, can operate in a semi-supervised mode, and can constrain the clustering procedure to maintain an equal number of trial results within each cluster. In a third phase of each run, the clustering results are evaluated using one or more evaluation criteria. In certain examples of the disclosed technology, goodness of fit is used as an evaluation criterion, which in some embodiments can be computed as a Frobenius norm. In alternative examples, goodness of fit can be evaluated using a Kullback-Leibler divergence, an L1 norm, or another cost function. Furthermore, any of these norm or goodness of fit criteria can be incorporated into a modified Akaike Information Criterion (AIC). In certain examples of the disclosed technology, a degree of clustering is used as an evaluation criterion, which in some embodiments can be computed as a silhouette value. Generally, it is desirable to have a small value of Frobenius norm, indicating that the results are well matched to the NMF trial results, and it is also desirable to have a high silhouette value, indicating that the clustering results correspond to discrete separated sources.

In certain examples of the disclosed technology, the multiple runs cover all integer values for assumed number of sources, from 1 to some maximum number B, while in other examples the multiple runs cover a restricted subset of these numbers. In certain examples of the disclosed technology, the multiple runs can be performed sequentially, and in certain examples of the disclosed technology they can be performed in parallel. Additionally, the multiple trials of each run can be performed sequentially, or they can be performed in parallel.

Subsequent to completion of the runs, the number of contributing sources is determined based on the evaluation criteria determined for the various runs. In some examples a figure of merit score can be calculated for each run, and the number of contributing sources is determined by the run having the highest figure of merit score.

Subsequent to determination of the number of contributing sources, the respective signals from each source are determined from the clustering results for the corresponding run. In certain examples of the disclosed technology, solutions for the signal propagation model and the transfer matrix can also be computed.

In certain examples of the disclosed technology, innovative methods can be performed on computing hardware incorporating one or more processors, storage, and memory. The processors can be communicatively coupled to non-transitory computer-readable media on which are stored instructions embodying the innovative methods described herein.

Examples of the technology disclosed herein provide robust, efficient solutions to blind source separation problems, including those where a number of sources is not known a priori, those where different signal shifts occur between different source-sensor pairs (whether due to, for example, wave-like propagation, attenuation, diffusion, and/or advection), and those where simplifying models or assumptions required by other techniques are inappropriate.

Computer systems configured to perform the disclosed methods, including those computer systems coupled to, and not coupled to, disclosed apparatus for generating and receiving signals from sensors, can exhibit a number of tangible benefits in reading, analyzing, displaying, and producing output using such data, including but not limited to: improved performance times, improved sensor error, improved resilience to defects or damage in sensors, improved cost or speed of manufacture (e.g., by allowing the use of fewer, lower cost, and/or more readily available or accessible sensors), amongst other benefits. Thus, examples of the disclosed technology are disclosed for improvements in the deployment and use of sensor or transducer technologies. Further, certain computer-implemented examples of the disclosed technology can improve the performance of the disclosed computer systems themselves, for example, by improved use of computational resources such as processor and memory resources, reducing the number of sensors deployed in a particular sensing environment, allowing for lower-cost and/or more readily available or accessible sensors, as well as improving the accuracy of analyzing such data received from a physical environment. Indeed, certain computer-implemented examples of the disclosed technology allow for novel functionalities to be performed by the computer that are otherwise difficult if not impossible to perform.

Exemplary problems to which the innovative methods are applicable include chemical decomposition, where chemical species can be detected by multiple sensors, and an objective is to identify sources of the chemicals and/or their propagation and diffusion characteristics. Such problems are presented in the context of airborne transport, for example, air pollution, dispersion of smoke or aerosols, waterborne transport, and groundwater pollution.

One such problem is the identification and remediation of contamination sources or plumes based on hydro-geochemical data or other types of chemical data.

Exemplary problems further arise in the decomposition of pressure transients. Pressure transients can be airborne or waterborne, in any of subsonic, acoustic, or supersonic frequencies, and can also include shock waves. Pressure transients can be seismic. Exemplary problems also arise in decomposition of electromagnetic signals across the whole electromagnetic spectrum including gamma-rays, x-rays, ultraviolet, visible light, infrared, far-infrared, microwaves, and radio waves, where it may be desirable to identify one or more transmitters. Such problems can include identification of sources of radio interference, for example near airports, identification of disturbances on a power grid, and retrieval of lost transmitters.

Identifying and locating sources of pollution in air, water or another medium is a necessary step for emergency response and for preventing or limiting the pollution, by removing some of the sources or otherwise mitigating their effect. Sources of pollution can be remediated by turning off emitting sources, collecting or redirecting pollutant outputs, filtration of emissions, or replacing emitting sources with cleaner equivalents. Sources of groundwater pollution can also be remediated by drilling and pumping out contaminated water. Locating sources of radioactive particles or fission reaction products like noble gas isotopes (known as radionuclide monitoring) in the atmosphere is vital for nuclear weapons non-proliferation efforts. If clandestine nuclear weapons programs are detected, a variety of diplomatic and military measures can be taken to stop the program. Radioactive materials can also be remediated by physical removal, or encapsulation in shielding. The ability to identify and locate sources of signals could be critical for emergency response in areas such as threat reduction, nuclear non-proliferation, and environmental safety.

Electromagnetic sources can be remediated by disabling, removing, or shielding unwanted sources, and alternatively through electromagnetic countermeasures such as signal cancellation or jamming. Not all unknown electromagnetic sources are unwanted; other electromagnetic sources can be accommodating into an existing environment of electromagnetic devices, for example by establishing a communication link to a newly identified electromagnetic source. In search and rescue operations, an identified device can be retrieved, even with equipment or one or more persons found in the vicinity of the source. Pressure and acoustic sources can be remediated by one or more of the above techniques, including removing, disabling, jamming, or canceling the source.

Heat Diffusion Applications

Another example of innovative technologies described herein is for identification of heat sources from which diffused heat signals can be remotely detected. For example, heat sources can be detected in the exothermic curing of concrete to locate non-uniformities, which could be associated with increased risk of premature cracking. Such defects can be remediated through injection of one or more sealants, or by injection of crack inhibition chemicals, or by removal and replacement of concrete sections. Other wide-ranging heat diffusion applications are found in space technology, combustion, coating and forming technology, solar energy utilization, high-temperature engines, and other technologies that benefit from inverse techniques for solving heat transfer problems and identifying unknown heat sources.

Genomics Applications

Exemplary problems can also be found in the field of somatic and cancer genomics, where mutations cause changes in the genome of a cell, and mixed mutational signatures can be resolved into temporally distinct populations.

The genome of each normal cell of the human body acts as a sensor constantly recording the activity of various mutational processes occurring inside and outside of the body throughout a person's lifetime. These processes imprint mutational patterns termed mutational signatures. In this context, a source is the activity of any endogenous or exogenous mutational process imprinting a mutational signature on the genome of a somatic cell. A sensor is the genome of any somatic cell in the human body and the recorded data in each somatic cell can be read by leveraging next-generation DNA sequencing techniques. A shift reflects a dynamic evolution of a mutational process, for example, due to changes in individual cells (e.g., failure of a DNA repair mechanism), changes in the local microenvironment (e.g., localized inflammation), or overall changes in a person (e.g., immune response).

In the context of cancer, identification of sources results in determining the mutational processes that have been operative throughout the lineage of the cancer cell. This information can be leveraged for determining suitable treatment for the afflicted person as well as to remediate or remove causal environmental factors for the benefit of other persons. In this context, determination of signal shifts can inform about changes in mutational processes over time, caused by internal or external factors, whereby treatments can be evaluated, adapted, accepted, or discarded.

In regards to normal somatic genetics, reading the signals recorded in multiple single cells from a person can inform on the overall medical fitness of that individual with implications for detecting diseases early in their progression. Single-cell sequencing can be applied to detect mutational signatures in non-cancerous cells (sometimes dubbed normal cells), and can inform about mutational processes associated with other diseases, which, once identified, can be treated by pharmacological, radiological, surgical, or lifestyle adjustment techniques.

Generally, the innovative methods can also be applied to a range of other problems in adaptive machine learning, unsupervised machine learning, feature extraction, signal de-mixing, signal decomposition, blind source separation, and non-negative matrix factorization.

The foregoing and other objects, features, and advantages of the disclosed technology will become more apparent from the following detailed description, which proceeds with reference to the accompanying figures.

BRIEF DESCRIPTION OF THE DRAWINGS

FIG. 1B is a diagram depicting an example two-dimensional spatial distribution of three sources and four sensors.

FIG. 1C is a diagram depicting spatial locations of the four sensors of FIG. 1B.

DETAILED DESCRIPTION

I. General Considerations

Figure 1A:
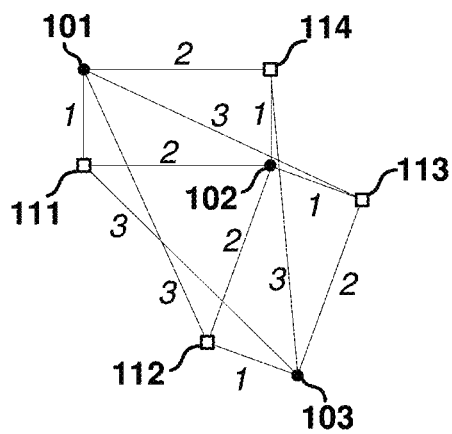
FIG. 1A is a block diagram of a generalized, example system in which certain examples of methods disclosed herein can be performed.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "apply," "estimate," "analyze," and "determine" to describe the disclosed methods. These terms are high-level abstractions of the actual operations that are performed. The actual operations that correspond to these terms will vary depending on the particular implementation and are readily discernible by one of ordinary skill in the art.

One of ordinary skill having benefit of this disclosure will appreciate that optimization refers to a computer-implemented procedure that can be implemented by evaluating a parameter for a plurality of configurations and selecting a configuration and/or parameter value from among the evaluated configurations according to a predetermined criterion. The predetermined criterion can be having a maximum or minimum value of the parameter from among the evaluated configurations, or an optimum value of the parameter according to another criterion, such as closest parameter to a target value. Any number of configurations can be evaluated, even as few as two. In this disclosure, the terms "optimization," "minimization," "maximization," and related terms refer to any procedure that attempts to find configurations of a system that have superior values of a parameter as compared with other configurations of the system. Particularly, optimization requires neither perfection nor an infinite search. Due to discrete data representations and finite computation time, an optimization procedure can successfully terminate without finding an exact extremum.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented using computer-executable instructions stored on one or more computer-readable media (e.g., non-transitory computer-readable media, such as one or more optical media discs, volatile memory components (such as DRAM or SRAM), or nonvolatile memory components (such as flash drives or hard drives)) and executed on a computer (e.g., any commercially available, proprietary, hosted, or dedicated computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable media). The computer-executable instructions can be part of, for example, a dedicated software application, a software library, or a software application that is accessed or downloaded via a web browser or other software application (such as a remote computing application). Such software can be executed, for example, on a single local computer (e.g., as a process executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, Python, Common Lisp, Scheme, Julia, Dylan, Fortran, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technology

FIGS. 1A-1C and FIGS. 2A-2B illustrate an example scenario in which the present innovative methods can be applied.

FIG. 1A is a block diagram of a generalized, example system in which certain examples of methods disclosed herein can be performed. Three sources 101-103 are depicted by solid circles. Each source emits a signal. Four sensors 111-114 are depicted by open squares. Each sensor produces one or more output signal(s) responsive to changes or events detected in the sensor's environment. Examples of suitable sensor types that can be used with the disclosed technology include, but are not limited to, acoustic, biological, chemical, electrical, force, inertial, magnetic, microarray, optical, pressure, radiation, thermal, or other suitable sensor type. In certain examples to which the innovative technologies described herein are applicable, signals propagate through a medium from sources to sensors. In other examples, sources and sensors may not have a spatial relationship. For example, in a genomics application signals may represent mutations of a genome and may be detected by sensors by a process of sampling and analysis. Nevertheless, FIGS. 1A-1C and FIGS. 2A-2B will be described in terms of a spatial relationship existing between sources 101-103 and sensors 111-114. The four sensors are connected to a data acquisition system 120. In various examples of the innovative technologies, connections between sensors and data acquisition system 120 can be made by wired, wireless, or optical connections, or by physical transport of a non-transitory data medium. The sensors detect a composite mixture of the signals generated by the sources. The detected signals are provided to the data acquisition system 120 via the abovementioned connections. Data acquisition system 120 is coupled to computing environment 2100. Computing environment 2100 can include one or more processors, one or more transitory and/or non-transitory storage devices, a non-transitory embodiment of innovative software 2180 that is operable to perform methods described herein, an input subsystem, an output subsystem, a communications port 2170 and one or more other ancillary devices as are known in the art. All or part of the computing environment 2100 may be implemented in one physical location, distributed among several locations, or located in a computing cloud. The computing environment is described further below in context of FIG. 21. The coupling between data acquisition system 120 and the computing environment 2100 can be implemented by one or more of wired, wireless, or optical connections, or by physical transport of a non-transitory data medium. The computing environment 2100 is operable to acquire the mixed signals detected by sensors 111-114 over the coupling from the data acquisition system 120. By execution of the innovative methods described below, the computing environment 2100 is operable to analyze the mixed signals, determine a number of sources that are present, and optionally determine the locations of the sources, the signals emitted by the sources, coupling coefficients between each source and each sensor, and/or transport properties of a medium (if present) through which the signals propagate from sources to sensors. Block 140 indicates a remediation subsystem which can take action on one or more of sources 101-103, or on the physical environment (not shown) in which sources and sensors are situated, responsive to the analysis of mixed signals, source location determination, source parameter determination, and/or signal propagation parameters determined at the computing environment. In some examples, remediation on a source can include removal of a source or reduction of a source's emitted signal. In examples, remediation on the physical environment can include placement of shields or structures to alter the propagation of signals from one or more sources to one or more sensors.

FIG. 1B is a diagram of an example two-dimensional spatial distribution of three sources and four sensors. Sources 101, 102, and 103 are represented by filled circles, while sensors 111, 112, 113, and 114 are represented by open squares. Twelve lines are shown joining each source to each sensor, and the approximate length of each is marked alongside. FIG. 1C is similar to FIG. 1B, but shows only the relative spatial locations of the four sensors 111-114.

Figure 2A:
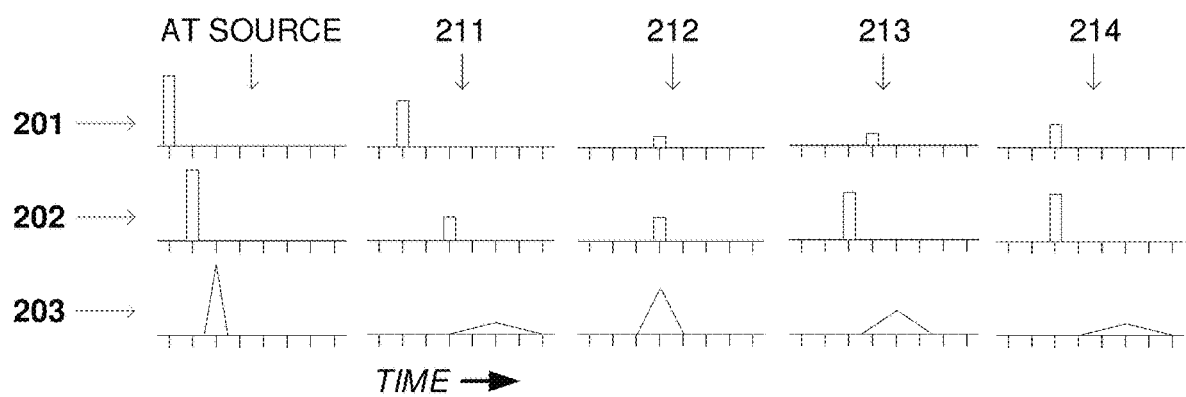
FIG. 2A is a collection of graphs depicting example signals generated by each of three sources and the same signals as seen by each of four sensors.

FIG. 2A is a collection of graphs showing example signals generated by each of the three sources of FIG. 1B, and the same signals as seen by each of the four sensors of FIG. 1B. Each graph has a time axis with time increasing going from left to right. Tick marks indicate regular time intervals; for convenience of discussion the first tick mark is considered to represent time m=1, the second tick mark represents m=2, and so on until the last tick mark in these graphs is an eighth tick mark representing m=8. Of course, one of ordinary skill in the relevant art will recognize that time is continuous and extends infinitely, while signals can be studied over any interval of time. Furthermore, in certain problems the dimension over which signals extend may be other than time, and may be discrete. The vertical axis of each graph represents a signal amplitude, which can represent any suitable physical value or measurement, including but not limited to, volts, power, a chemical concentration, a pressure amplitude, or a probability of mutation.

Each row of graphs in FIG. 2A represents signals from a respective source, so that the top row are signals from a first source 101, and the second and third rows represent signals from a second source 102 and a third source 103, respectively. The leftmost column of graphs represents signals as present at the source, so that the first source 101 can be seen to generate a rectangular pulse at time m=1, the second source 102 generates a rectangular pulse at time m=2, and the third source 103 generates a triangular pulse at time m=3. The successive columns of FIG. 2A show the individual source signals as observed at each one of a plurality of sensors 111-114, respectively. For convenience of discussion, signals are assumed to propagate at approximately one unit of distance in one unit of time, and may be attenuated and/or broadened as described further below.

Turning to source 101 in the top row, a first sensor 111 is at a distance of one unit from this source, and accordingly the pulse emitted at m=1 appears at m=2. Second and third sensors 112 and 113 are at a distance of three units from source 101, and accordingly the pulse emitted at m=1 appears at m=4 (4=1+3). A fourth sensor 114 is at a distance of two units from the first source 101, and accordingly the pulse emitted at m=1 appears at m=3. The signals are also seen to be attenuated relative to the signal at the source. At a distance of one unit from the source, the first sensor 111 observes a slightly attenuated signal. At a distance of three units from the source, the second and third sensors 112 and 113 observe a considerably attenuated signal, while at a distance of two units, the signal seen at the fourth sensor 114 is moderately attenuated.

Referring back to the distances in FIG. 1B, the signals for the second source 102 in the second row can be similarly understood: sensors 111 and 112 are at a distance of two units from source 102, while sensors 113 and 114 are at a distance of one unit from the source.

The signals shown for both of the sources 101 and 102 reflect a model in which signals are shifted due to wave-like propagation and attenuation, but substantially retain their shape. That is, the signals exhibit neither dispersion nor diffusion, and are not broadened. Furthermore, for simplicity, the propagation has been assumed to be isotropic, but that is not a requirement for applicability of the present innovative methods. For the sake of illustration only, the signals from the third source 103 are shown following a different model which includes broadening, as may be expected in a diffusion model. Of course, one of ordinary skill will understand that within a particular problem, signals from different sources will follow similar models, and that the mixing of signal models in this figure is purely for an illustrative purpose. Thus the signal from source 103 experiences broadening as it proceeds away from the source. Diffusion is not instantaneous, so the centroid of a pulse signal seen at a farther distance will occur at a later time than the centroid of a pulse signal seen at distance nearer to the source. For ease of explanation, the centroids of signals from source 103 are assumed to shift one unit of time for every unit of distance. As will be readily understood by one of ordinary skill in the relevant art, in some examples, a diffusion model may be non-linear in various aspects, and may also be anisotropic. The presently disclosed methods are suitable for non-linear and anisotropic problems, and can also accommodate other forms of non-ideal behavior. Turning to the bottom row of FIG. 2A, which shows signals from the third source 103, the sensors 111 and 114 are at a distance of three units from the third source, and the signal emitted at time m=3 is observed to be considerably broadened with a centroid at m=6. The sensor 112 is one unit from the source, has a centroid at m=4 (4=3+1), and is only slightly attenuated, while the sensor 113 is two units from the source, has a centroid at time m=5, and has an intermediate amount of broadening.

Figure 2B:
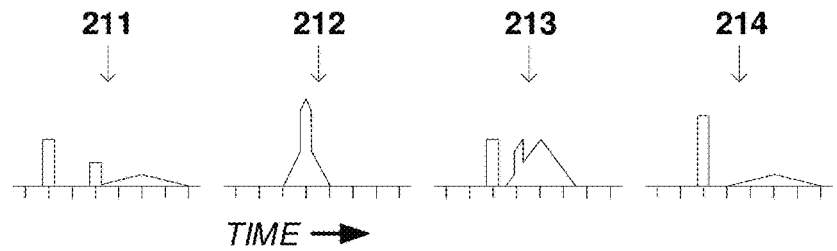
FIG. 2B is a collection of graphs depicting the composite signals received by four sensors.

FIG. 2B is a collection of graphs showing the composite signal received at each of the four sensors 111-114. The composite signal is a result of superposing the signals from the three sources at each sensor, and is obtained by summing the three waveforms in each corresponding column of FIG. 2A. Thus, at sensor 111, the signals from each source are seen to arrive at substantially different times, while at sensor 112 the signals from each source are seen to arrive at substantially the same time m=4. The signals at sensors 113 and 114 have varying behavior as shown in the respective columns of FIG. 2B.

An exemplary problem can be explained in terms of these figures. In the exemplary problem, the four sensors 111-114 and their locations are known, as shown in FIG. 1C. Furthermore, the observed signals at each sensor are also known, as shown in FIG. 2B. Then, given FIGS. 2B and 1C, the source separation problem is to extract the source signals (in the leftmost column of FIG. 2A) and the source locations, as shown in FIG. 1B. Note that neither FIG. 2B nor FIG. 1C contains any information about the number of sources. Certain examples of the disclosed technology described below may be particularly applicable to just such situations where the number of sources is unknown.

One of ordinary skill having the benefit of the present disclosure will readily understand that this and other examples presented herein are illustrative and that the disclosed technology is applicable to a wide range of source separation problems including problems having larger numbers of sources, sensors, and/or environment dimensions—any of which can be in the ranges 1-3, 4-10, 11-100, 101-1000, 1001-1,000,000, or 1,000,000-1,000,000,000, or even more.

Furthermore, in certain examples, the locations of one or more, or all the sensors may be unknown or incomplete. In such examples, it may be sufficient to extract the number of sources and corresponding source signals only.

III. An Example Method of Identifying Unidentified Sources

Figure 3:
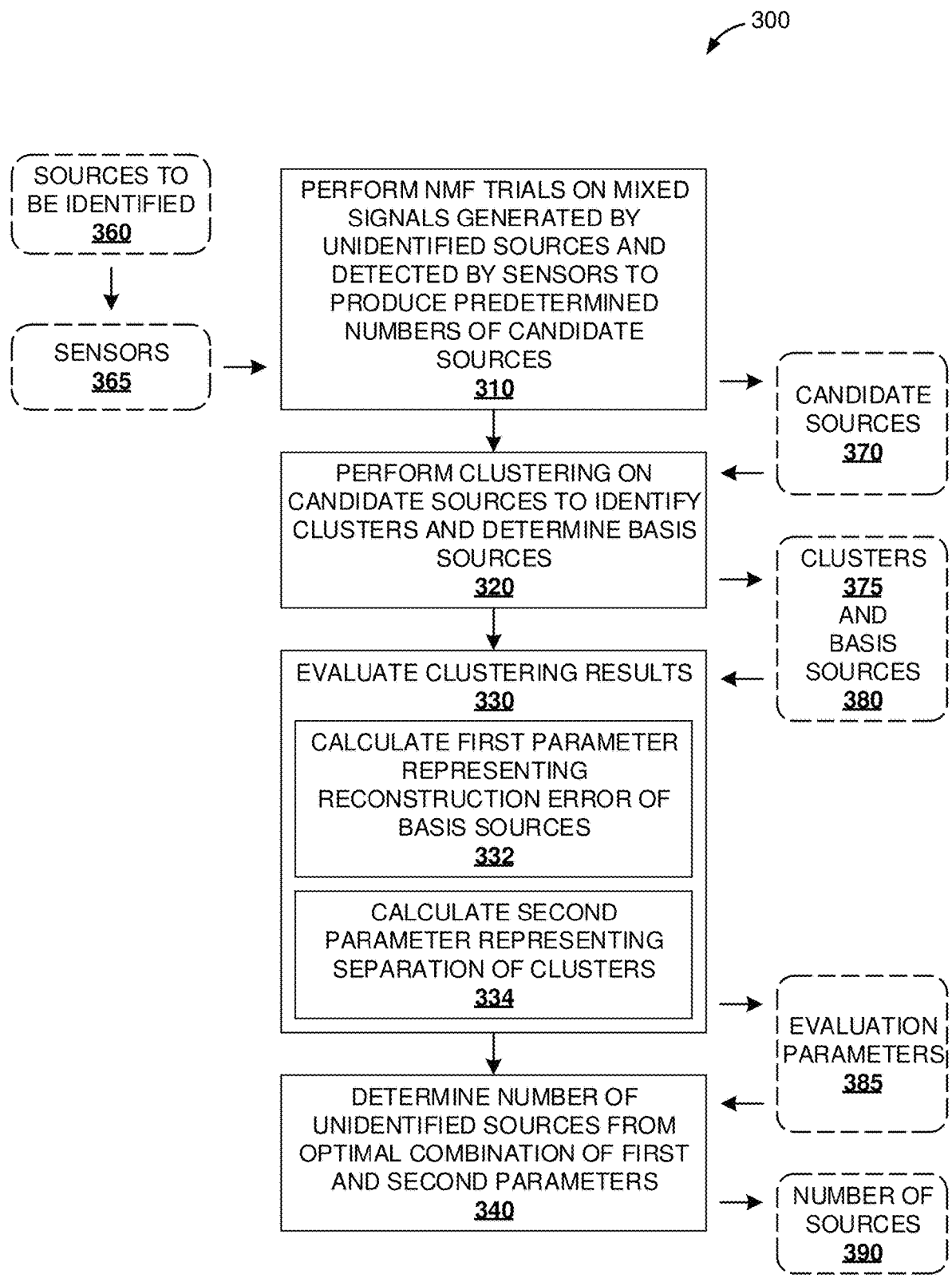
FIG. 3 is a flowchart depicting an example method of identifying unidentified sources according to the disclosed technology.

FIG. 3 is a flowchart 300 depicting an example method of identifying unidentified sources according to the disclosed technology. The method is performed according to process blocks 310-340, although one of ordinary skill will recognize that variations can be made within the scope of disclosed technology according to the requirements of a particular problem. These variations can include a greater or lesser number of actions, variations of particular actions, iterations of one or more actions, or a change in order of any actions. Also shown in FIG. 3 are various items shown in dashed outline representing entities associated with the disclosed method, such as data objects in a computing environment or objects in a physical environment.

The illustrated method pertains to a problem environment having signals emanating from unidentified sources 360 and reaching sensors 365. Each sensor 365 can detect and report a mixed signal having contributions from some or all of the unidentified sources 360. These mixed signals can be communicated to a computing environment at which the illustrated method is performed. The sources 360, sensors 365, and the computing environment, can be similar to those described herein with references to FIGS. 1A-1C.

At process block 310, NMF trials are performed on the aforementioned mixed signals generated by the unidentified sources 360 and detected by sensors 365. Each NMF trial can produce a predetermined number of candidate sources 370. By way of illustration, mixed signals similar to those described in context of FIG. 2B can be factorized (by NMF) to try to find the best possible reconstruction with two sources, or with three sources, or with four sources, or with another positive integer number of sources.

At process block 320, clustering is performed on candidate sources from a plurality of NMF trials. Each determined cluster 375 contains a plurality of candidate sources, which can be one candidate source from each NMF trial, or a lesser number of candidate sources if some candidate sources are rejected during the clustering procedure. For each cluster 375, a basis source 380 is also determined, which can be the centroid of the candidate sources that are members of that cluster 375. In examples, the number of candidate sources per NMF trial equals the number of clusters 375 and also equals the number of basis sources 380. The basis sources 380 can be an optimal set of b sources, where b is the number of identified clusters.

At process block 330, the clustering results are evaluated using clusters 375 and basis sources 380. Particularly, sub-blocks 332 and 334 can be performed. At process sub-block 332 a reconstruction error of the clustering procedure is calculated. The reconstruction error can be obtained as a Frobenius norm, by forward propagating the basis source signals to the sensors 365 according to a signal propagation model and comparing with the observed mixed signals detected at sensors 365. At process block 332 a first parameter representing a reconstruction error is calculated. In some examples, the first parameter is a non-negative number, while in other examples the first parameter can be a data structure, such as a vector, or can be allowed to take on negative values. At sub-block 334, a second parameter representing cluster separation is calculated. In some examples, the second parameter can be a silhouette value. The sub-blocks 332 and 334 can be performed in any sequence, or concurrently; in examples, the performance of one sub-block can be dependent on the result of the other sub-block. The first and second parameters are part of evaluation parameters 385. In examples, further evaluation parameters can be calculated.

At process block 340, the evaluation parameters 385 are used to determine a number of sources for which a combination including the first and second parameters is optimal. For example, the number of sources can be a minimum source number for which the first parameter is below a first threshold and the second parameter is above a second threshold (in other words, small reconstruction error and well-formed distinct clusters).

Further details, variations, and examples of the illustrated method are disclosed herein.

IV. Introduction to the Disclosed Technology—Shift-NMFk

Non-Negative Matrix Factorization (NMF)

Non-negative matrix factorization (NMF) is an unsupervised learning method that can be used for blind source separation of non-negative signals. However, NMF requires the number of the original sources to be known a priori.

NMF is represented mathematically by Equation (1), with the observations being the rows of matrix V.

$$V_{n,m} = \sum_{d} W_{n,d} H_{d,m} + \epsilon. \tag{1}$$

The algorithm returns the decomposition through the mixing matrix W and source matrix H, with $\epsilon$ being the residual noise or other unknown, unbiased error. V is an N×M matrix, with row index n in the range from 1 to N corresponding to an $n^{th}$ sensor, and column index m in the range from 1 to M corresponding to an $m^{th}$ element of a sequence of signal samples. The M signal samples need not be evenly spaced, but can be aligned between sensors; where raw sensor data is not temporally aligned, interpolation pre-processing can be applied so that the observations V are aligned across the sensors. The rows of W and the columns of H likewise represent sources and sampling points respectively. In certain examples, signals are functions of time, and the M columns represent respective sampling times, but this is not a requirement. In alternative embodiments, the sample sequences are formed over a variable other than time. The columns of W and the rows of H represent A sources, with index d in the range 1 to A representing the $d^{th}$ source. Each item in H represents a strength, amplitude, or magnitude of a source signal for a particular value of the index m, and each item in V represents a strength, amplitude, or magnitude of a mixed signal observed at a sensor n for a particular value of the index m.

In certain embodiments, the number of sensors N is greater than the number of sources A. In some examples, the number of sensors N is at least about two times the number of sources A. In certain types of problems, it can be desirable for the number of sensors to be much greater than the number of sources. For NMF to work, the problem must exhibit a non-negativity constraint on the sources H and mixing matrix W. This leads to reconstruction of the observations (the rows of matrix V) as linear combinations of the elements of H and W, which, by the constraint, cannot mutually cancel. A simple NMF algorithm begins with a random guess for H and W. The algorithm then proceeds by minimizing the Frobenius norm O:

$$O = \frac{1}{2}\|V - W*H\|_F^2 = \frac{1}{2}\sum_{n,m}\left(V_{n,m} - \sum_{d} W_{n,d} H_{d,m}\right)^2 \tag{2}$$

during each iteration. Minimizing the Frobenius norm O is equivalent to representing the discrepancies between the observations V and the reconstruction W*H as white noise. In order to minimize O, certain embodiments use an established gradient descent approach with iterative multiplicative updates to W and H. During each iteration of the NMF method, the algorithm first minimizes O by holding W constant and updating H, and then holds H constant while updating W (Equations (3) and (4)). It is proven that the norm is non-increasing under these update rules and invariant when an accurate reconstruction of H is achieved. The update formulae for each element of H and W are given by Equations (3) and (4):

$$H_{d,m} = H_{d,m}\frac{(W^T V)_{d,m}}{(W^T W H)_{d,m} + \epsilon} \tag{3}$$

$$W_{n,d} = W_{n,d}\frac{(V H^T)_{n,d}}{(W H H^T)_{n,d} + \epsilon} \tag{4}$$

where the small constant $\epsilon$ was added to the denominator to avoid division by zero. In some embodiments $\epsilon$ is on the order of $10^{-9}$. In other embodiments, $\epsilon$ may be in the range from $10^{-9}$ to $10^{-22}$. Variations of this minimization procedure can be used, for example in problems having constraints.

Extension NMFk for Unknown Number of Sources

A method dubbed "NMFk" is an extension of NMF that allows estimating the number of the sources. NMFk couples an NMF procedure with a custom semi-supervised clustering procedure. Since NMF requires a priori knowledge of the number of sources (denoted herein as the source number b), these procedures can be run for different source numbers. In some embodiments, the robustness of the resulting solutions can be evaluated and compared to determine the number of sources A. In this context, robustness means that the solutions accurately reproduce the observed signals, are relatively insensitive to initial seeding, and are relatively insensitive to small changes in the input data such as observed signals and sensor locations.

Some examples of NMFk consecutively explore all possible source numbers b in a range from 1 to B (where B is a maximum number of possible sources possible to be determined, and in some embodiments can be one less than the number of sensors, that is B=N−1). Various examples compare varying combinations of accuracy, robustness, and reproducibility of the results for different b, in order to determine the number of sources A. This means that NMFk performs B runs, where each run includes a set of simulations for a particular value of the source number b in the range from 1 to B. In each run, a large number k (from 1,000 to 100,000, or even from 100 to 10,000,000) of NMF trials are performed with independent and random initial conditions. Thus, each run results in a set of solutions $U_b$ containing k solutions, where the $i^{th}$ trial (i in the range 1 to k) results in solution $H_b^i$ for the source matrix and W for the mixing matrix.

$$U_b = \{[H_b^1; W_b^1], [H_b^2; W_b^2], \ldots, [H_b^k; W_b^k]\} \tag{5}$$

Since each source matrix H has b rows, there are a total of k×b candidate sources. Next, NMFk uses a custom semi-supervised clustering to assign each of these k×b candidate sources to one of b clusters. In some examples, this custom semi-supervised method is an adaptation of k-Means clustering with a constraint to keep an equal number (k) of candidate sources in each cluster. For an example case with b=2 and a run of k=1000 trials (performed with random initial conditions), each of two clusters will be constrained to contain 1000 candidate sources. In certain examples, the distance (or, similarity) between sources is measured using a cosine distance. Treating source signals as vectors, the cosine distance between two vectors u and v is $1-u*v/(|u|\cdot|v|)$. A cosine distance of 0 means the vectors are identical, a cosine distance of 1 means the vectors are orthogonal or uncorrelated, and a cosine distance of 2 means that the vectors are opposite to each other.

The results for source number b are evaluated after clustering. In certain embodiments, the separation of the clusters can be used as a measure of how good is a particular choice b for the number of sources. On the under-fitting side, for b less than the actual number of sources, it is expected that the clustering could be good—several of the sources could be combined to produce one "super-cluster" that is well separated from other clusters or super-clusters. (Or, the degree of separation could be poor if the super-clusters have an extent comparable to separation between super-clusters.) However, clustering will deteriorate significantly with over-fitting when b exceeds the true number of sources, since, even if the norm of the solution is small, there is no reason to expect that the solutions will be well clustered (when at least some of the clusters will be artificial, rather than real entities). Thus, if the degree of clustering is determined for solutions with different number of sources b, and plot it as a function of b, a sharp drop is expected as b increases beyond the true number of sources.

Therefore, in certain examples, a silhouette value S is computed after clustering to show how well the solutions are clustered under the assumption of b original sources as follows:

$$S = \text{mean}(S_d) \quad (6)$$

where $$S_d = 1 - (E_d/I_d) \text{ for } E_d \leq I_d, \text{ and}$$

$$S_d = (I_d/E_d) - 1 \text{ for } E_d > I_d. \quad (7)$$

In other words, for any source number b, the overall silhouette value S is the mean of cluster silhouette values $S_d$ for all clusters d from 1 to b, as indicated in Equation (6). As indicated by Equation (7), the cluster silhouette value $S_d$ for the $d^{th}$ cluster is defined in terms of an internal similarity $I_d$ and an external similarity $E_d$. For each cluster, the internal similarity $I_d$ is the mean similarity (defined in some examples as a cosine distance) between source signals within the $d^{th}$ cluster, while the external similarity $E_d$ is the mean similarity (defined in some examples as a cosine distance) between members of the $d^{th}$ cluster and all members of other clusters. In alternative embodiments, other distance measures can be used as a measure of similarity, or other measures can be used to indicate a degree of clustering.

Using these clusters as well as the corresponding clusters of the mixing matrices $W_b$, the average solutions (here, the centroids of these clusters), are computed. The optimal number of sources A is picked by selecting A to be the minimum number of sources that demonstrate both: a) an accurate reconstruction of the observation matrix V and b) a high average silhouette value (e.g., close to one).

Additionally or alternatively, an Akaike Information Criterion (AIC) can be used to select the optimal number of sources A. The AIC balances the quality of a model, based for example on reconstruction error, with the number of free parameters invoked; AIC is improved and lowered by reducing the reconstruction error or by reducing the number of free parameters. Thus, AIC can reward parsimony, which is a different criterion than optimizing a measure of clustering such as a silhouette value. The Kullback Leibler divergence can be incorporated into a modified AIC as an alternative measure of reconstruction error. In examples, an AIC can be used together with silhouette value, or independently.

Extension Shift-NMF Incorporating Signal Shifts

The preceding discussion assumes that the source matrix H can be used directly to reconstruct the observed sensor signals V. That is, it is presumed that the same signal vector Hn of the $n^{th}$ source is seen by all the sensors. However, there are many problems that feature a propagation delay from source to sensor. In this case, signals from a particular source may be shifted in time between various sensors.

Another extension of NMF is to take into account delays of the signals caused by the finite speed of propagation in the medium, the different positions of sources and sensors, and the varying distances from a source to various sensors. Signal delays can be included by using elements of a Shift-NMF procedure described in further detail below. However, the Shift-NMF procedure by itself still requires the number of sources to be known a priori.

One aspect of certain methods described herein is that a Shift-NMF procedure can be incorporated within an NMFk procedure, in place of the NMF procedure described above.

The Shift-NMF procedure is similar in some respects to NMF described above, but features an additional matrix r that maps the correct delays (time shifts) during the multiplication of the W and H matrices. Then, the reconstruction can be written as:

$$V_{n,m} = \sum_d W_{n,d} H_{d,m-\tau_{n,d}} + \epsilon. \quad (8)$$

It is convenient to introduce the following form $$H_{d,m}^{(n)} = H_{d,m'} \text{ for } m' = m - \tau_{n,d} \quad (9)$$

for the time-domain signal source matrix referenced to the $n^{th}$ sensor. That is, m' reflects the change (or, shift) in index or subscript due to signal propagation.

In some examples, the reconstruction is represented in the frequency domain, using Fourier transformed quantities denoted by a tilde (~) and with time subscript m replaced by frequency subscript $f$:

$$\tilde{V}_{n,f} = \sum_d W_{n,d} \tilde{H}_{d,f} e^{-i 2\pi \frac{f-1}{M} \tau_{n,d}} + \tilde{\epsilon}_{n,f} \quad (10)$$

$$\tilde{V}_f = \tilde{W}^{(f)} \tilde{H}_f + \tilde{\epsilon}_f$$

where $\tilde{W}^{(f)} = W_{n,d} \cdot e^{-i 2\pi \frac{f-1}{M} \tau_{n,d}} \quad (11)$ where the symbol · means element-wise multiplication.

Thus, Shift-NMF returns not only the source matrix H and the mixing matrix W, but also returns an additional N×b matrix τ, that contains the delays (as integer numbers) of the signal from each original source d to each sensor n. In some embodiments, a Discrete Fourier Transform (DFT) is used because of computational advantages dealing with shifts in the frequency domain rather than delays in the time domain. Then, Shift-NMF uses a similar strategy of multiplicative updates as NMF, but can jump into the frequency domain and back in each update. In Fourier space, the nonlinear shift mapping becomes a family of DFT transformed H matrices with the shift amount represented by an unknown r matrix.

Thus, the delayed version of the source signal to the $n^{th}$ channel is $$\tilde{H}_{d,f}^{(n)} = \tilde{H}_{d,f} e^{-i2\pi \frac{f-1}{M} \tau_{n,d}}. \quad (12)$$

Here, the superscript (n) indicates that the source signals are referenced to the $n^{th}$ sensor, and are not merely Fourier transforms of the signals $H_{d,m}$ at the sources.

The Frobenius norm O that has to be minimized is then $$O = \frac{1}{2} \sum_{n,m} \left( V_{n,m} - \sum_d W_{n,d} H_{d,m-\tau_{n,d}} \right)^2 = \frac{1}{2M} \| \tilde{V}_f - \tilde{W}^{(f)} \cdot \tilde{H}_f \|_F^2 \quad (13)$$

where the last equality holds because of Parseval's identity. Shift-NMF has to update three matrices, H, W, and τ. The component-wise updates of the mixing matrix W are done in a similar way as for NMF, but incorporating the $H^{(n)}$ matrices, which are referenced to the $n^{th}$ sensor using the T matrix, and are also non-negative.

$$W_{n,d} = W_{n,d} \frac{V_{n,:} H_{d,:}^{(n)T}}{W_{n,:} H^{(n)} H_{d,:}^{(n)T}} \quad (14)$$

Here, the $H^{(n)}$ are the sensor-referenced source signal matrices as defined in Equation (9), and the colon (:) denotes all elements in the corresponding dimension, with vector dot products and/or matrix multiplication implied. That is, in Equation (14), the left-hand side is one component of the W matrix. In the numerator on the right-hand side, $V_{n,:}$ is a 1×M row vector and $H^{(n)}_{d,:}$ is a 1×M row vector. The $T$ operator indicates a transpose, leaving the numerator as a product of a 1×M vector and an M×1 vector, which is a 1×1 scalar quantity. Similarly, the denominator is evaluated as the product of (1×b) (b×M) and (M×1) quantities, which also results in a 1×1 scalar quantity. As before, b is the source number.

The updates of the H matrix are done by utilizing a multiplicative update, given the gradient of the Frobenius norm O in Fourier space, $$\tilde{G}_f = \frac{\partial O}{\partial \tilde{H}_f} = -\frac{1}{M} \tilde{W}^{(f)H} (\tilde{V}_f - \tilde{W}^{(f)} \tilde{H}_f) \quad (15)$$

where the superscript operator H denotes the Hermitian or conjugate transpose.

By separating $\tilde{G}_f$ into its positive part (the W·W·H term in Equation (15)) and negative part (the W·V term in Equation (15)) in the form, $\tilde{G}_f = \tilde{G}_{d,m}^+ + \tilde{G}_{d,m}^-$, then taking the inverse Fourier transform of each term, the corresponding gradient $G_{d,m} = G_{d,m}^+ + G_{d,m}^-$ in the time domain can be derived and used to update H:

$$H_{d,m} = H_{d,m} \left( \frac{G_{d,m}^-}{G_{d,m}^+} \right)^\infty \quad (16)$$

Here the time shift is already incorporated into the matrix W and the gradient, while α is a tunable time-step factor (α→0 means very small steps in the negative gradient direction). In certain examples, the value of α can be 1; in other examples, the values of α can be in the range 0.1 to 1.2 or even $10^{-12}$ to 10. Because the delays are unconstrained, the shift matrix T is estimated by a Newton-Raphson method which simply looks for the minimum of a function with the help of its gradient and Hessian, $$\tau \leftarrow \tau - \eta (\text{Hess } O)^{-1} g \quad (17)$$

where (Hess O) is the Hessian of the Frobenius norm O, g is the gradient of the Frobenius norm O with respect to the matrix τ, and η is a tunable constant that can be changed within the algorithm to ensure faster convergence. In certain examples, the value of η can be 0.1; in other examples, the value of η can be in the range $1.7 \times 10^{-19}$ to 1.2. Within O, the delay is once again folded into the mixing matrix W as shown in Equation (10).

This update procedure is sensitive to local minima. In order to mitigate this sensitivity, in certain examples, τ is only updated during every 20th iteration, using a cross-correlation procedure that is operable to "kick" Shift-NMF out of a local minimum. In alternative examples, τ can be updated more or less often, with updates on average every 20 to 100 iterations, or even every 10 to 1000 iterations.

Extension for Unknown Number of Sources and Signal Shifts

Similar to the description above for NMFk, in order to estimate the unknown number of original sources, B runs can be performed for respective source numbers b, and within each of these runs a large number k of Shift-NMF trials are performed, with independent and random initial conditions and the same source number b. For each run, a set $U_b$ of k solutions is obtained, each having three matrices $H_b^i$, $W_b^i$, and $\tau_b^i$.

$$U_b = \{ [H_b^1; W_b^1; \tau_b^1], [H_b^2; W_b^2; \tau_b^2], \ldots, [H_b^k; W_b^k; \tau_b^k] \} \quad (18)$$

These solutions for source number b can be provided to a semi-supervised clustering procedure in order to extract average solutions for the source signals H and the signal shift matrix τ that represents delays.

Since each source matrix $H_b^i$ has b rows, there are a total of k×b candidate sources. Shift-NMFk uses a custom semi-supervised clustering to assign each of these k×b candidate sources to one of b clusters. In some embodiments, this custom semi-supervised method is an adaptation of k-Means clustering with a constraint to keep an equal number (k) of candidate sources in each cluster. Particularly, the constraint can maintain one candidate source from each of the k trials in each cluster. For an example case with b=2 and a run of k=1000 trials (performed with random initial conditions), each of two clusters will be constrained to contain 1000 candidate sources. In certain embodiments, the distance (or, similarity) between sources is measured using a cosine distance.

Then, the robustness of these solutions can be estimated by calculating a first parameter representing goodness of reconstruction and calculating a second parameter representing a degree of cluster separation. In certain examples, the first parameter can be a Frobenius norm. In certain examples, the second parameter can be a silhouette parameter.

Improving Robustness with Selection Criteria in Shift-NMFk

As described above, poor results were obtained for problems having an unknown number of sources and signal shifts. It was observed that the shift-NMF trials often converged to different (often, very distinctive) solutions while trying to minimize the norm O and frequently stopped before reaching a good reconstruction. This was found to be due to several factors, including (i) particular initial conditions, (ii) the ratio between the number of sources A and the number of sensors N, and/or (iii) the specific shape of the signals and delays, and sometimes other factors. For example, the reconstruction can depend on the level of correlations between the source signals. Thus, in a sizable percent of the Shift-NMF trials for a particular source number b, the Shift-NMF procedure would settle many times into local minima and then exit with a poor reconstruction of the observational matrix V. This could be equivalently described as finding the robustness of the solutions to be poor (because the solutions are unexpectedly sensitive to the initial seeding of the Shift-NMF procedure, and also because the solutions $U_b$ are not well clustered). That is, the goodness of reconstruction could be unexpectedly high and the degree of cluster separation could be unexpectedly low.

Issues such as these can be addressed by applying three selection criteria to the Shift-NMF trials to obtain robust solutions to certain problems of interest. These robust solutions accurately reproduce the observed signals V, are relatively insensitive to initial seeding, and are relatively insensitive to small changes in the input data such as observed signals and sensor locations.

Three criteria have been developed: a) discard outlier solutions that do not provide good reconstruction of the observation matrix V; b) discard solutions that do not satisfy a general physical condition of visibility; that is, all of the source signals should be present in the reconstructed mixed signals; and c) discard solutions that do not satisfy one or more general physical limits on maximum delay; that is, the variations in the time delays corresponding to elements of the signal shift matrix should not exceed the maximum propagation delay across the array of sensors. These selection criteria are described in order.

(a) Outliers:

In some examples, the Shift-NMFk procedure discards Shift-NMF trials for which the Shift-NMF solutions fail to minimize the discrepancy between the observational matrix V and its reconstruction W*H$^{(n)}$—here the superscript (n) is a reminder that for problems with signal shift, the source signals H must be referenced to the sensors in order to reconstruct the observed signals, see Equation (9). The solutions that fail to minimize the norm in Equation (13) below a predetermined threshold are discarded. Specifically, solutions whose ratio of Frobenius (or other) norms $$\frac{\|V - W*H\|_F}{\|V\|_F} \quad (19)$$

is greater than a bad-fit threshold are discarded. In certain examples, the bad-fit threshold can be 0.10 or 10%; in some examples, the bad-fit threshold can be in the range 5% to 10%, or even in the ranges 0.1% to 1%, or 2% to 20%. Thereby Shift-NMFk procedures are able to eliminate Shift-NMF solutions that provide crude representations of the observation matrix V and can be considered as outliers.

(b) Failure to Detect all Source Signals.

In some examples, the Shift-NMFk procedure discards Shift-NMF trials for which the resulting mixing matrix W features only very small values for a given signal. In other words, an entire column of the W matrix has elements that are below a visibility threshold. Such solutions ignore the contribution of an entire signal during reconstruction of observed sensor signals. This can happen, for example, when the correct number of sources in a problem is two, but Shift-NMF is using a source number of three. In some instances, Shift-NMF can find two correct sources, and a third source that has zero weight and is ignored. In some examples, the visibility threshold can be $10^{-4}$; in other examples, the visibility threshold can be in the range $10^{-3}$ to $10^{-10}$, or even $10^{-2}$ to 0.

In some examples, the Shift-NMFk procedure discards Shift-NMF trials for which the W matrix features very small values for a particular element. In other words, an element of the W matrix is below a W-element threshold, in these particular examples. This corresponds to a requirement that all sensors should be able to see all sources. In certain examples, the W-element threshold can be $10^{-4}$; in other examples, the W-element threshold can be in the range $10^{-10}$ to $10^{-3}$, or even 0 to $10^{-2}$.

(c) Non-Physical Delays.

In some examples, the Shift-NMFk procedure discards Shift-NMF trials for which the resulting signal shift matrix corresponds to delays whose maximum variation exceeds the maximum propagation delay between two sensors. In other examples, other delay-based selection criteria can be used.

Delays calculated using such Shift-NMF trials may be too large or may be too small. Also, the results of different trials can give delays that have unreasonably different values, for example up to 5× or 1× variation. As will be readily understood by one of ordinary skill in the relevant art, irregularity in the delays represented by a signal shift matrix can be converted to a corresponding selection criterion to filter out such irregularity.

In certain examples, a delay-based selection criterion can be implemented without having detailed knowledge of the sensor array size and speed of propagation of the signals.

The d$^{th}$ columns of matrices $\tau_b^k$ contain all the k×N delays of the k solutions from the d$^{th}$ source signal to all N sensors. In certain examples, a delay-based selection criterion can be applied to the i$^{th}$ solution by requiring that the standard deviation of the N delays for the i$^{th}$ solution and d$^{th}$ source must not exceed a certain proportion of the average of the N delays for the i$^{th}$ solution and d$^{th}$ source. In some examples, the certain proportion can be 0.8, while in other examples the certain proportion can be in the range 0.1 to 10. In other examples, other criteria can be used.

Semi-Supervised Clustering

Applying the above selection criteria and discarding the shift-NMF solutions that fail to meet one or more selection criteria, a pool of successful trials is finally obtained that can be used in semi-supervised clustering. Clustering is applied to the successful results from a run for source number b. In some examples, clustering is implemented using a k-Means clustering procedure. The clustering results can be evaluated both for goodness of reconstruction (for example, by computing a Frobenius norm) and for cluster separation (for example, by computing a silhouette value). Finally, an optimal number A of original sources can be found by selecting a source number b for which a reasonable reconstruction is achieved for a maximum average silhouette value. In certain examples, a reasonable reconstruction means that the norm is below 0.1; in other examples, the maximum limit for the norm can in a range from 0.001 to 0.2, or even from 0.0001 to 0.3. This limit and other limits may vary considerably depending on particulars of a problem under study.

After determining the number A of signal sources, the clustering results from the run with source number b=A can be used to identify the A sources, their source signals H, and the transfer matrix W between sources and sensors. The $d^{th}$ identified source corresponds to the $d^{th}$ row of the $H_b^i$ matrices associated with the $d^{th}$ cluster, and the source signal can be determined by combining these $d^{th}$ rows, for example by taking their mean. Similarly, the $d^{th}$ column of the $W_b^i$ matrix associated with the $d^{th}$ cluster corresponds to the transfer coefficients from the $d^{th}$ source to all sensors. The mean of these $d^{th}$ columns can provide the final shift vector of transfer or mixing coefficients from the $d^{th}$ source to all sensors. The term centroid is equivalent to mean and is more commonly used for vectors, matrices, and multi-dimensional spaces; other methods such as weighted means can also be used. In general, a parameter associated with the $d^{th}$ source can be obtained by taking the centroid (or, mean or weighted mean) of that parameter for each of the solutions belonging to the $d^{th}$ cluster. By repeating over all clusters, all source signals, transfer coefficients and other parameters can be determined.

As described above, the number A of signal sources is determined directly from comparison of parameters representing reconstruction error, such as a Frobenius norm, and parameters representing clustering, such as a silhouette value, without consideration of parsimony or any Akaike Information Criterion (AIC). In variations of this method, an AIC can be incorporated into the Shift-NMFk procedure, as a parameter representing reconstruction error, to determine the number A of signal sources.

Akaike Information Criterion (AIC)

In examples, an AIC can be used independently or in combination with silhouette values to determine the number A of signal sources. In some examples, a subset of source numbers b is selected on the basis of having silhouette values above a silhouette threshold which can be about 0.7 or can be set to any value between 0.5 and 0.99, or between 0.6 and 0.8; the subset of source numbers b being compared by an AIC. In other examples, the silhouette value is not used and all available source numbers b are compared by an AIC.

For each source number b, an AIC is computed according to $$AIC = 2b(n + M) - 2 \cdot \ln(L) = 2b(N + M) + NM \cdot \ln\left(\frac{O^{(b)}}{NM}\right) \quad (20)$$

where b is the source number, N is the number of sensors, M is the number of signal sequence points, NM is the total number of data points, $O^{(b)}$ is the average reconstruction error for source number b, and likelihood L is defined according to:

$$\ln(L) = -\left(\frac{NM}{2}\right) \cdot \ln\left(\frac{O^{(b)}}{NM}\right) \quad (21)$$

The AIC is driven by consideration of economy of description, or parsimony, which is different from a measure of degree of clustering, such as a silhouette value. In examples, the AIC and the silhouette value can be used together or separately.

Pseudocode

Table 1 presents example pseudocode for a Shift-NMFk procedure.

TABLE 1

| Shift-NMFk Pseudocode |
|---|
| 1 procedure INITIALIZE THE MAX NUMBER OF SOURCES B AND OTHER PARAMETERS |
| 2    procedure GENERATE n SETS OF SOLUTIONS, EACH WITH DIFFERENT NUMBER OF SOURCES |
| 3      loop: FROM b=1 TO MAX NUMBER OF SOURCES B |
| 4        procedure GENERATE k Shift-NMF SOLUTIONS EACH WITH b SOURCES |
| 5          GENERATE RANDOM INITIAL CONDITIONS |
| 6          Shift-NMF MINIMIZATION OF $\frac{1}{2}\|V + W * H\|_F^2$ |
| 7        procedure APPLY ELIMINATION CRITERIA TO Shift-NMF SOLUTIONS WITH b SOURCES |
| 8        procedure PERFORM SEMI-SUPERVISED CLUSTERING |
| 9          CLUSTER THE REDUCED SET $[H_b^i]$ SET OF Shift-NMF SOLUTIONS TO b CLUSTERS |
| 10         GENERATE THE CORRESPONDING b CLUSTERS OF $[W_b^i]$ AND $[\tau_b^i]$ SOLUTIONS |
| 11       procedure CHARACTERIZE THE QUALITY OF THE SOLUTIONS WITH b SOURCES |
| 12         CALCULATE THE CENTROIDS OF THE b CLUSTERS FOR $[H_b^i]$, $[W_b^i]$ AND $[\tau_b^i]$ |
| 13         CALCULATE THE AVERAGE RECONSTRUCTION ERROR FOR MINIMIZATION WITH d SOURCES |
| 14         CALCULATE THE AVERAGE SILHOUETTE PARAMETER OF THE b CLUSTERS |
| 15         CALCULATE AIC METRICS FOR b SOURCES |
| 16      loop end: b ← b+1 |
| 17 procedure FIND THE OPTIMAL NUMBER OF SOURCES, A, BASED ON OPTIMAL CHARACTERIZATION |
| 18 procedure LOCATE THE OPTIMAL NUMBER OF A SOURCES |
| 19 procedure BAYESIAN ANALYSIS OF THE UNCERTAINTIES OF THE A SOURCES |

Verification

In order to test Shift-NMFk procedures with a synthetic example, the elements of the three average (corresponding to the centroids) matrices, $H_A$, $W_A$, and $\tau_A$ of the optimal solution can be respectively compared (via the cosine distance) with the source waveforms, mixing matrices, and signal shift (delays) used to generate the input observational data V. For success, cosine distance should be <0.05, in certain examples. In other examples developed for addressing problems of different nature or different scale or, more generally, different parameters, the cosine distance threshold for verification can be in a range from 0 to 0.2.

Finding Position by Solving Triangulation Problem

After obtaining $H_A$, $W_A$, and $\tau_A$ matrices from the Shift-NMFk algorithm, and knowing the locations of the sensors, there is enough information to determine the locations of the A sources. In certain examples, the delays $\tau_A$ can be used to triangulate each source by figuring out how far away it is from each sensor. This is done by using a minimization procedure to solve a system of equations posed by forming circles; the sensor positions are the centers of the circles and the radii of the circles are derived from $\tau_D$. Indeed, the distance between $n^{th}$ sensor and $d^{th}$ source is the delay $\tau_{n,d}$ between the two multiplied by the propagation speed $\alpha$ of the signals in the medium under consideration, and corrected with a constant $C_d$ that represents the distance from the $d^{th}$ source to the closest sensor of the array. Equation (22) represents such a circle centered at coordinates $x_n^N$ and $y_n^N$ of the $n^{th}$ sensor.

$$(x_d^A - x_n^N)^2 + (y_d^A - y_n^N)^2 = (\alpha \tau_{n,d} + C_d)^2 \tag{22}$$

Here, the superscript A means source, and the superscript N means detector (which is synonymous with sensor).

The constant $C_d$ is needed because Shift-NMF algorithms return only relative delays centered around zero. Equivalently, this indeterminacy can be seen by noting that any solution can be modified by moving one source signal backward by one time-step and increasing all elements in the corresponding column of $\tau$ by 1, to form a new solution that is indistinguishable from the starting solution. Because it is impossible for the procedure to detect how long a signal has traveled before it arrives and is recorded by the closest sensor, it is only possible to unmix delays as the relative differences in time between all the sensors.

Therefore, in order to use the delays to retrieve the radii of the circles in the triangulation equations, the constants $C_d$ are introduced, which represent the distance from each source location to the closest sensors in the observation array. $C_d$ is different for each source. The triangulation procedure proceeds with minimizing the intersection of these circles centered at each sensor and with radii equal to the distances to the sources, that is, by minimization of the norm J, $$J = \Sigma_d \Sigma_n ((x_d^A - x_n^N)^2 + (y_d^A - y_n^N)^2 - (\alpha \tau_{n,d} - C_d)^2)^2. \tag{23}$$

J is minimized in terms of the $x_d^A$ and $y_d^A$ coordinates of each source, the constants $C_j$ and the speed $\alpha$. Using the Julia programming language, this can be done using the NLopt.jl package. In certain examples, constraints are placed on the minimization parameters in terms of their possible minimum and maximum values. The initial conditions for the minimization procedure can be set to fall within these constraints. From the converged result of the minimization procedure, a plot can be generated indicating the region of likelihood for each source and the errors propagated through Shift-NMFk.

In some examples, Bayesian sensitivity analysis (BSA) is used to obtain the probability distribution functions and the uncertainties of the coordinates of the sources. Specifically, the posterior probability density functions (PDFs) of the (x, y) coordinates of the sources are obtained by Markov Chain Monte Carlo (MCMC) sampling, following Bayes' theorem and using a likelihood function defined as $\exp(-\chi^2/2)$ with error values calculated via the variations of the delays obtained by the Shift-NMF simulations. The BSA was performed using a Robust Adaptive MCMC (Markov Chain Monte Carlo) algorithm.

In other examples, weighted least squares minimization can be performed to determine sensor coordinates. With the notation $(x_s, y_s)$ and $(x_d, y_d)$ denoting source coordinates and sensor coordinates respectively, with superscripts d, n denoting source and sensor indices respectively, the distance r between the $d^{th}$ source and the $n^{th}$ detector (sensor) can be written:

$$r_{d,n} = \sqrt{(x_d^A - x_n^N)^2 + (y_d^A - y_n^N)^2}. \tag{24}$$

Then, quantity K represents a sum of squares of delay errors.

$$K = \sum_d^A \sum_{n \neq n^*}^N \left( \frac{(\tau_{d,n^*} - \tau_{d,n}) - \frac{(r_{d,n^*} - r_{d,n})}{v_d}}{\sqrt{\sigma_{d,n^*}^2 + \sigma_{d,n}^2}} \right)^2 \tag{25}$$

where n* denotes the index of the sensor nearest to the $d^{th}$ source. The $\tau$ coefficients represent delays (from a signal shift matrix) between corresponding sources and detectors, and are normally distributed in certain examples, with the $\sigma$ coefficients representing sample standard deviations of the delays to the corresponding detectors, obtained from multiple Shift-NMF trials for source number b=A. A number of minimization trials can be run (with independent and random starting seeds), which can be 1000 trials in certain examples, and can be in the range 100 to 100,000 trials or even 1 to 10,000,000 trials in other examples. In some examples, the results can be sorted according to minimized $O_1$. In some examples, a first fraction of results having lowest $O_1$ can be retained; this first fraction can be 5% in some examples, 0% to 10% in other examples, or in the range from 10% to 80%, or 1% to 99%, or even 0% to 100% in further examples. In some examples, the medians of the remaining results can be used as the likely determined positions of the sources. In some examples, a second fraction of results, which are farthest from the likely determined positions, can be discarded; the second fraction can be 50% in some examples, and can be in the range from 10% to 80%, or 1% to 99%, or even 0% to 100% in other examples. Discarding results improves tight clustering of the remaining results. From the remaining results, averages and standard deviations are computed for each source position. A region of likelihood is defined by a circle having center equal to the computed average and radius equal to the computed standard deviation.

The minimization procedure serves to determine a consistent set of coordinates for the A identified sources that provide the determined delays for all source-sensor pairs, according to the modeled propagation velocity v. A nonlinear optimization package such as the Nlopt.jl Julia optimization package can be used to implement this procedure.

Computations can be performed using any disclosed computing environment, including the LANL MADS computational framework.

In examples, multiple runs can be performed (in some examples on the order of 1,000; in other examples any number from 2-1,000,000, or even just one). From the multiple runs, outliers can be discarded based on the quality of the minimization. In some examples about 50% of the runs can be discarded; in other examples anywhere from 1%-99%, 5%-95%, or 20%-80% of the runs can be discarded. From the remaining runs, median coordinates can be calculated, and further runs discarded based on distance from the median coordinates, according to a Frobenius norm, cosine distance, or other distance measure. The remaining runs can have a tight distribution of source positions; the centroid (mean), median, or other average can be used as the determined source positions. Uncertainties in the source positions can also be computed by a Bayesian analysis.

The above method can be extended to any number of dimensions of the problem environment, for example three dimensions or one dimension, and can be generalized for non-uniform or anisotropic propagation velocity v.

In certain examples, signal attenuation with distance is known for a particular problem, for example it can be known that elements of the mixing matrix W vary as $r^{-0.5}$ where r is the distance from source to sensor. This constraint on the elements of the W matrix can be used to significantly increase the speed and the efficiency of the algorithm for determining the source position. For concreteness, surface waves are considered, but similar reasoning can be used for other types of waves. With an additional assumption that all detectors are identical, then the weight of the $d^{th}$ source at the $n^{th}$ detector $w_{nd}$ equals $w_0/\sqrt{r_{nd}}$, where $w_0$ is a constant which is the same for all detectors, and $r_{nd}$ is the source-detector distance. This general relation can be used to construct upper boundaries for the distances between sources and detectors. By first forming the ratio of the amplitudes of the signals from the same source at two different detectors, say 1 and 2 and using the vector equation $r_{d,n1}=r_{d,n2}+r_{n2,n1}$, where $r_{n2,n1}$ is the vector connecting the two detectors, Equation (26) is obtained:

$$\frac{w_{d,n2}}{w_{d,n1}} = \left(\frac{r_{d,n1}}{r_{d,n2}}\right)^{1/2} = \frac{(r_{d,n2}^2 - 2\cos\theta_{n1,n2} r_{d,n2} r_{n1,n2} + r_{n1,n2}^2)^{1/4}}{r_{d,n2}^{1/2}}. \quad (26)$$

In order to obtain an upper bound on the distance between the source and the detectors, the square root can be expanded, assuming that $r_{n2,n1} \ll r_{d,n2}$ (valid in examples where the distance between the detector array and the source is much larger that the size of the array), which gives $$\frac{w_{d,n2}}{w_{d,n1}} \approx 1 - \left(\frac{r_{n1,n2} \cdot \cos\theta_{n1,n2}}{2 \cdot r_{d,n2}}\right), \quad (27)$$

which leads to $$R_{d,n2} \leq \frac{r_{n1,n2}}{2\left(1 - \frac{w_{d,n2}}{w_{d,n1}}\right)}. \quad (28)$$

Because of certain approximations made in this analysis, the result of Equation (28) can be multiplied by a factor, such as two, to determine a useful upper bound. Thus, an estimate for the upper bound of the distance between the source d and the entire detector array is obtained, provided that $(w_{d,n2}/w_{d,n1})<1$, and is the smallest possible value for the $d^{th}$ signal (in certain examples, this means that the selected detectors n1, n2 should be the two farthest apart along a direction of signal propagation).

In alternative examples, signal attenuation instead of time delay can be used as the principal determinant of position in lieu of Equation (25). Additionally, time delays can be used in place of signal attenuation to set distance bounds, in lieu of Equation (26).

V. Introduction to the Disclosed Technology—Green-NMFk

In some examples of the disclosed technology, contaminant transport in an aquifer is described by an advection-diffusion equation. Hence, the identification of the contamination sources usually relies on the corresponding ill-posed, inverse problem as well as on the available observation data. The main tools for observation of contaminants are various types of sensors that record spatiotemporal samples of the contamination fields. These records then are used to infer properties of the contaminant sources, such as their locations, emission strength, dispersivity, etc., that are essential for a reliable assessment of the contamination hazards and risks. However, the sensors do not measure the real contamination fields, but only mixtures of multiple contamination fields originating from an unknown number of contamination sources in the aquifer, which renders many inverse-problem methods ineffective or unreliable.

One characteristic of such systems is that the signal evolution can be described in terms of Green's functions, and indeed the technologies disclosed herein are generally applicable to a wide class of problems whose solutions can be described in terms of Green's functions, even if the Green's functions are not analytically described in closed form. Another characteristic of diffusion-type systems is that the local signal evolution can be dependent on signal strength or gradient, as compared to wave-like propagation models whose signal evolution can be described or approximated independently of signal amplitude. In addition to diffusion problems, the Green's function technique described herein can solve problems involving wave propagation in dispersive media. Both diffusion and wave-like propagation models can have transport properties that are dependent on a medium through which signals propagate; the medium can include a vacuum.

A hybrid approach dubbed Green-NMFk can address such problems. In some examples, using Green-NMFk includes a) performing decomposition of the observation mixtures based on Non-negative Matrix Factorization method (NMF) for Blind Source Separation, coupled with a custom semi-supervised clustering algorithm, and b) using Green's functions of the advection-diffusion equation. Green-NMFk is capable of identifying the unknown number, locations, and properties of a set of contaminant sources from experimentally measured samples of their mixtures without additional information about the nature of the sources or properties of the medium. In examples, all sources emit a single contaminant species, while in other examples the sources can emit varying combinations of two or more contaminant species, or all different contaminant species. Green-NMFk is not limited to contaminant transport, but can be applied to any problem controlled by a partial-differential parabolic equation where mixtures of an unknown number of physical sources are monitored at multiple locations.

Advective-Dispersion Equation

At equilibrium, a mathematical description of transport of a species, such as a contaminant or a solute, in a medium can be derived by the general principle of conservation of mass by applying the continuity equation. In its general form, this transport is described by linear partial-differential parabolic equation:

$$\frac{\partial C}{\partial t} = \nabla(D \cdot \nabla C) - \nabla \cdot vC + LC + Q. \quad (29)$$

Equation (29) describes the rate of change of the concentration C(x, t) of the solute/contaminant, defined in some (space and time) domains: $x \in \mathbb{R}^d$ for d spatial dimensions, and $t \in [T_{init}, T_{final}]$. The matrix D is the hydrodynamic dispersion, which is a combination of molecular diffusion and mechanical dispersion (in porous media, the latter typically dominates). While the diffusion part of the matrix D is diagonal, the dispersion is generally not. The advection velocity v is caused by the bulk motion of the fluid in the aquifer, and can be a pore velocity representing Darcy groundwater flow velocity divided by medium porosity. Q is the source strength function, representing possible sinks and sources of the contaminant. The term L is called reactionary, and describes possible chemical transformations of the contaminant. Henceforth, it is assumed that L=0. One of ordinary skill in the art will readily understand that this type of equation also describes, for example, the general problem of heat transport in various media (with or without convection), which can be treated in the same way. In examples, the concentration C is a superposition of contributions multiple distinct or separated sources represented by the source strength function Q.

For the sake of the following illustration, a number of assumptions are made. First, a quasi-two-dimensional medium is considered. The medium can be three-dimensional, however transport phenomena of interest can be modeled in two dimensions. Hence, $x \in \mathbb{R}^2$, and a third dimension z is assumed to be constant, $z=z_0$, or that the third dimension is small, or that C is uniformly distributed in the third dimension. It is also assumed that v is uniform (although unknown); in the following discussion, the advection velocity v is taken to be along the x-axis. It is further assumed that D does not depend on the coordinates.

With these simplifying assumptions, Equation (29) leads to Equation (30):

$$\frac{\partial C}{\partial t} = \nabla(D \cdot \nabla C) - \nabla \cdot vC + Q = D_x \frac{\partial^2 C}{\partial x^2} + D_y \frac{\partial^2 C}{\partial y^2} + v_x \frac{\partial C}{\partial x} + Q. \quad (30)$$

Although the molecular diffusion component of D is usually isotropic, satisfying $D_x^{diff} = D_y^{diff}$, in general $D_x \neq D_y$. This is because of the presence of mechanical dispersion and because the advection motion breaks the isotropy of space. Q is assumed to be a collection of point-like sources localized in both space and time, so it can be written as:

$$Q = \Sigma Q_s \delta(x-x_s)\delta(y-y_s)\delta(t-t_s) \quad (31)$$

where the summation is over sources s; $x_s$, $y_s$, and $t_s$ specify the coordinates and emission time of the $s^{th}$ individual source; $Q_s$ is the strength of the $s^{th}$ source at time $t_s$; and $\delta$ represents a delta function. Initial conditions and boundary conditions can be imposed in order to derive a unique solution to Equation (30). Since there was no contamination before the sources started emitting, the initial condition is $C(t<\min(t_s))=0$. The choice of boundary conditions is more complicated. For this illustration, an infinite two-dimensional space is assumed, which can be interpreted in certain examples as having an aquifer large enough so that its boundaries do not affect the distribution of C over timescales of interest; in such examples, either a Dirichlet boundary condition ($C \rightarrow 0$ at infinity) or a Neumann boundary condition ($\nabla C \rightarrow 0$ at infinity) can be used. One of ordinary skill will readily recognize that other boundary conditions (such as a Cauchy boundary condition) can be used with other spatial models according to the particulars of a problem under consideration.

Since Equation (30) is a linear partial differential equation, the principle of superposition is applicable and leads to a solution:

$$C(x,t) = \int d\tau dx' G(x-x', t-\tau)Q(x',\tau), \quad (32)$$

where G(x, t) is the Green's function of the diffusion-advection equation describing solution for a point-like (both in space and time) source of unit strength. The Green's function satisfies $$\frac{\partial G}{\partial t} = D_x \frac{\partial^2 G}{\partial x^2} + D_y \frac{\partial^2 G}{\partial y^2} - v_x \frac{\partial G}{\partial x} + \delta(x)\delta(y)\delta(t) \quad (33)$$

for the appropriate initial condition and boundary conditions.

Combining Equations (31) and (32), the solution C(x,t) can be expressed as:

$$C(x, t) = \sum_{s=1}^{N_s} G(x-x_s, t-t_s)Q_s \quad (34)$$

where Ns is the total number of sources. The Green's function for Equation (33) is:

$$G(x, t) = \frac{1}{4\pi\sqrt{D_x D_y} t} e^{-\frac{(x-v_x t)^2}{4D_x t}} e^{-\left(\frac{y^2}{4D_y t}\right)}, \quad (35)$$

where x and y are the components of the vector x and t>0. G(x, t) trivially satisfies the boundary condition at infinity.

The assumptions discussed above are not essential: examples of the Green-NMFk methods disclosed herein are broadly applicable, for example with different numbers of spatial dimensions, spatially varying v and D, different and finite spatial models with different boundary conditions. Particularly, Green-NMFk methods are applicable to extended sources with more complicated space and time dependencies:

$$Q = \Sigma f^{(s)}(x,t) \quad (36)$$

where the function $f^{(s)}$ represents the space-time dependence of source s. In this case, the solution of Equation (32) can be written as:

$$C(x, t) = \sum_{s=1}^{N_s} \int dx' d\tau G(x - x', t - \tau) f^{(s)}(x', \tau). \quad (37)$$

In certain examples of interest $f^{(s)}(x, t)$ is known, and the integrals in Equation (37) can be evaluated analytically, leading to a closed-form result for $C(x, t)$. In other examples, the integrals in Equation (37) can be evaluated numerically.

The Blind Source Separation (BSS) Problem

A blind source separation problem may be posed in terms of the recorded observational data $V \in M_{N,T}(\mathbb{R})$ at N sensors over time T, which are formed by linear mixing of unknown original signals $H \in M_{A,T}(\mathbb{R})$ from A sources over time T, coupled to the sensors by an unknown mixing matrix $W \in M_{N,A}(\mathbb{R})$. Here, the notation $M_{N,T}(\mathbb{R})$ denotes an N×T matrix over real numbers $\mathbb{R}$.

$$V_n(t_m) = \sum_d W_{n,d} H_d(T_m) + \epsilon \quad (38)$$

where the suffix n from 1 to N represents the $n^{th}$ sensor, the suffix d from 1 to A represents the $d^{th}$ source, and the suffix m from 1 to T denotes the $m^{th}$ sampling time.

The term $\epsilon \in M_{N,T}(\mathbb{R})$ denotes the presence of possible noise or unbiased errors in the measurements, and is also unknown. If the problem is solved in a temporally discretized framework, the goal of a BSS algorithm is to retrieve the A original signals (sources H) that have produced N observation records V, at T discretized moments in time at which the signals are recorded at the sensors. Both factors H and W are unknown, and in certain examples of interest, even the size A of these matrices is unknown, because it is not known how many sources A are present. One difficulty in solving a BSS problem is that it is underdetermined.

Two approaches that can be used to resolve this underdetermination are: Independent Component Analysis (ICA) and Non-negative Matrix Factorization (NMF). ICA presupposes a statistical independence of the original signals and thus aims to maximize non-Gaussian characteristics of the estimated sources H. NMF, on the other hand, is an unsupervised learning method originally developed for parts-based representation of images. In contrast to ICA, NMF does not seek statistical independence or constrain any other statistical properties (NMF allows the original sources to be correlated); instead, NMF enforces a non-negativity constraint on the original signals in H and their mixing components in W. NMF can successfully decompose large sets of non-negative observations V, by a multiplicative update algorithm described above. However, NMF requires a priori knowledge of the number of the original sources. NMFk methods, also described above, allow for the solution of problems where the number of sources is unknown. However, neither of these procedures has been able to solve advection/diffusion problems.

The Hybrid Method Green-NMFk

The issue with advection/diffusion problems lies in the nature of the contaminant transport process. Indeed, while some physical processes (e.g., processes subject to wave equation) permit signals that keep their form undistorted as they travel, diffusion is more complicated: sensors situated at different distances from a single source will record signals differing in shape and time dependence, as can be seen from the varying widths of the exponential terms in Equation (35).

The present hybrid method explicitly incorporates knowledge of the Green's function for the advection-diffusion equation, unlike conventional model-free BSS methods. The present hybrid method also incorporates the robustness-based NMFk approach to handle problems for which number of sources A is unknown. Thereby Green-NMFk permits decomposition of the mixtures of contamination fields recorded by N sensors into constituent fields emanating from an unknown number of sources A.

Nonlinear Minimization Diffuse-NMF

The first phase of the Green-NMFk procedure is a nonlinear minimization denoted as Diffuse-NMF. Based on the Green's function of advection-diffusion equation we know the explicit form of the original signals at times $t_m$, m=1, 2, ... T, and at the locations of each of the N sensors $(x_n, y_n)$, n=1, 2, ... N. These signals originate from b sources, located at the points $(x_d, y_d)$, d=1, 2, ... b, with respective source strengths $Q_d$. Therefore, the NMF equation to be solved can be written:

$$V_n(t_m) = \sum_{d=1}^{b} W_d H_{d,n}(t_m) + \epsilon \quad (39)$$

where $$W_d \equiv Q_d, \quad (40)$$

$$H_{d,n}(t_m) = \frac{1}{4\pi\sqrt{D_x D_y}\, t_m} e^{-\frac{((x_d - x_n) - v_x t_m)^2}{4 D_x t_m}} e^{-\frac{(y_d - y_n)^2}{4 D_y t_m}}, \quad (41)$$

and $\epsilon$ is the Gaussian noise or unbiased errors. It can be seen that the coupling from $d^{th}$ source to the $n^{th}$ sensor has been incorporated into the H matrix, which has three parameters d, n, and m. As explained earlier, the signal at each sensor is a superposition of contributions from all b sources. The coordinates of each of the sensors $(x_n, y_n)$ and the functional form of the Green's function $G_d$, d=1, 2, ... b, are known. The physical parameters, $Q_d$, $x_d$, and $y_d$ characterizing each source, as well as the transport characteristics $D_x$, $D_y$, and $v_x$, which characterize the advection/diffusion model are unknowns. During the phase of nonlinear minimization, physical parameters and transport characteristics are determined which can accurately reconstruct the observational data. In certain examples, the nonlinear minimization can be performed by a nonlinear least-squares method (NLS) applied to a cost function. An example NLS method is Levenberg-Marquardt. In certain examples, the cost function is $$O = \sum_{n=1}^{N} \sum_{m=1}^{T} \left( V_{n,m} - \sum_{d=1}^{b} W_d H_{d,n,m} \right)^2 = \|V - W * H\|_{NLS}. \quad (42)$$

Equation (42) is an example of an L2 cost, minimization of which tries to minimize each of the N×T summand terms individually. The minimization of this cost function assumes that each measurement $V_{n,m}$ is an independent Gaussian-distributed random variable, which corresponds to the white noise $\epsilon$, offset by the constant terms $\Sigma WH$.

However, the above NLS-norm minimization requires knowledge of the number of unknown sources, and cannot determine the number of contamination sources when this number is unknown. To extract the unknown number of the contaminant sources, an NMFk procedure can be used.

Green-NMFk Combines Diffuse-NMF with NMFk

In some cases, Diffuse-NMF is sufficient to solve examples in which the number of sources is known. However, in many examples of interest, the number of sources is unknown. One of ordinary skill in the art might contemplate trying Diffuse-NMF with different numbers of sources and simply picking the solution offering the best reconstruction of the observational data. However, such a simplistic approach is flawed, as increasing the number of sources will generally lead to solutions with better reconstruction (albeit with reduced robustness), irrespective of the true number of sources. Thus, merely looking at the accuracy of reconstruction (measured, for example, by a Frobenius norm) is not enough.

Diffuse-NMF can be combined with the NMFk technique described above, in which semi-supervised clustering is applied to an ensemble of NMF solutions (in this case, Diffuse-NMF solutions) and a measure of degree of cluster separation is used to aid in determination of the true number of sources A.

Specifically, NMFk explores a range of numbers of original sources and then estimates the accuracy and robustness of the solutions with different number of sources. The number of sources in a single trial of Diffuse-NMF is denoted the source number b. In some examples, values of b are explored consecutively from 1 to a predetermined maximum B. In other examples, a different range of b can be used, or the set of source numbers b can be adjusted dynamically during the Green-NMFk procedure.

Thus, NMFk performs up to B runs, for source numbers b from 1 to B. Each run comprises M trials, each with independent and random initial seeding. Thus, each run produces a set $U_b$ containing M solutions, where each solution includes two matrices, $H_b^j / W_b^j$ (the latter representing the strength of each source, per Equation (40)) for b sources and j=1, 2, . . . M.

$$U_b = \{[H_b^1; W_b^1], [H_b^2; W_b^2], \ldots, [H_b^M; W_b^M]\} \quad (43)$$

Thus $U_b$ contains a total of b×M candidate sources.

Subsequently, NMFk applies a custom, semi-supervised clustering to assign each of these b×M solutions to one of b specific clusters, and is similar to the NMFk procedure previously described. In some examples, this custom semi-supervised method is based on k-Means clustering, with a constraint that keeps the number of candidate solutions in each cluster equal. For example, for a case with b=2 and 1000 solutions, each of two clusters will contain 1000 candidate sources. In some examples, the clustering procedure is applied iteratively, with elimination of outliers at each stage, until the degree of clustering has converged. During clustering, the similarity ρ between two candidate sources $H_{d1}$ and $H_{d2}$ is measured using cosine distance, such as $$\rho(H_{d1}, H_{d2}) = 1 - \frac{\sum_{n=1}^{N} \sum_{m=1}^{T} H_{d1,n,m} H_{d2,n,m}}{\sqrt{\sum_{n=1}^{N} \sum_{m=1}^{T} (H_{d1,n,m})^2} \sqrt{\sum_{n=1}^{N} \sum_{m=1}^{T} (H_{d2,n,m})^2}}. \quad (44)$$

As described above, the number of sources is estimated based on comparison of two parameters over varying source number b. A first parameter may be a correlation coefficient, a Frobenius norm, an Akaike Information Criterion or another measure representing the goodness of reconstruction. A second parameter may be a silhouette value or another measure representing degree of separation of the determined clustering.

Figure 21:
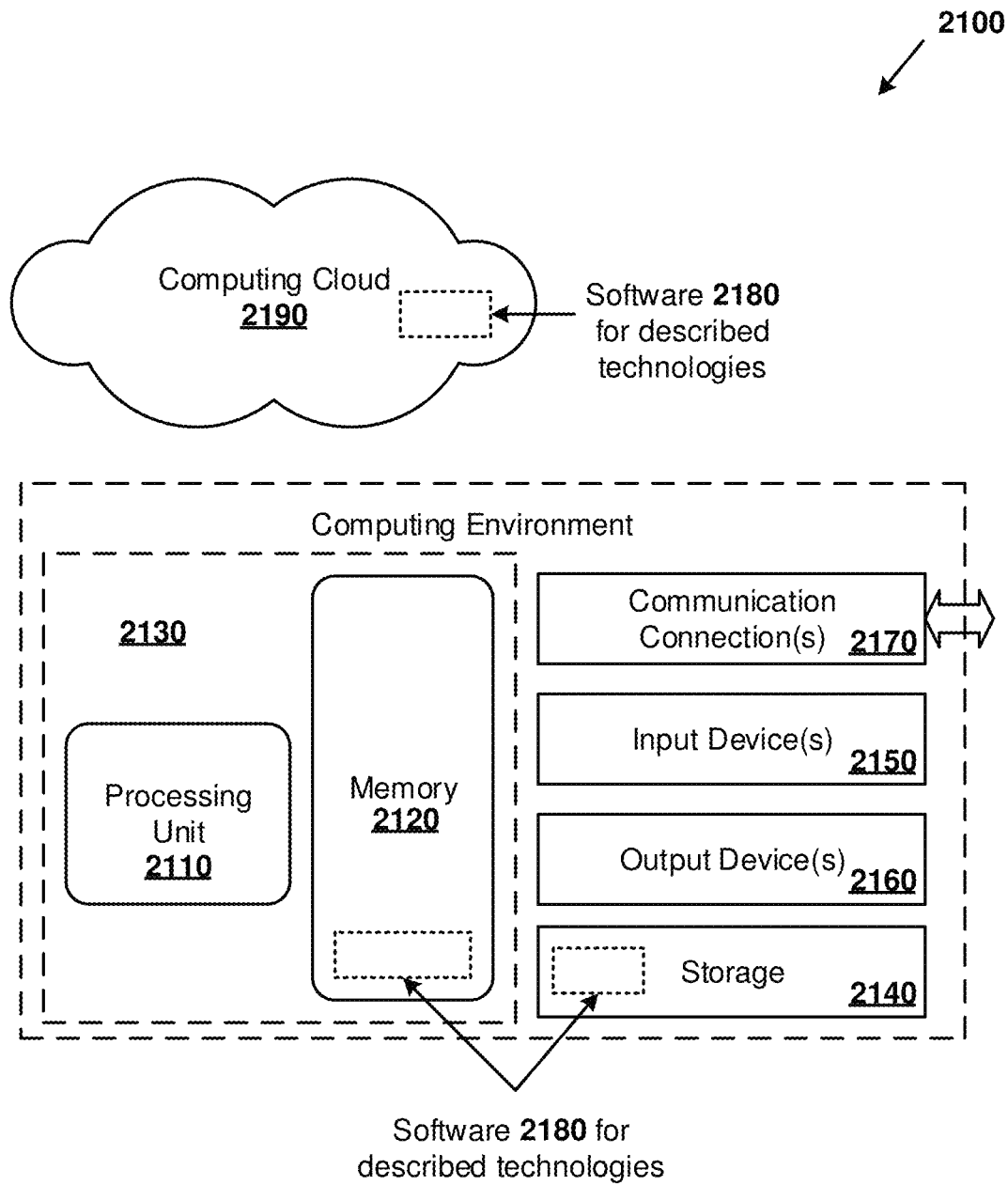
FIG. 21 illustrates a generalized example of a suitable computing environment in which described embodiments, techniques, and technologies, including generating and analyzing measurement data, can be implemented.

In certain examples, the number of sources A is selected to be equal to the minimum source number b that accurately reconstructs the observations (i.e., the NLS reconstruction error is less than or equal to an accuracy threshold) and the clusters of solutions are sufficiently stable (e.g., the average silhouette value is close to 1, greater than or equal to a separation threshold). In certain examples, the accuracy threshold is 0.1%, while in other examples the accuracy threshold can be in the range 0.01% to 1%. In certain examples, the separation threshold is less than or equal to 0.9, while in other examples the separation threshold can be in the range 0.6 to 1. In certain examples, the Green-NMFk algorithm can be coded in the Julia language and can be run in computer environments as shown in FIGS. 1A and 21. Green-NMFk computation can be performed using any disclosed computing environment, including the LANL MADS computational framework.

After determining the number A of signal sources, the clustering results from the run with source number b=A can be used to identify the A sources, their source strengths Q=W, the source coordinate locations $x_i$, $y_i$, and other model parameters such as dispersivity components $D_x$, $D_y$, and the advection velocity v. The $d^{th}$ component of the $W_b^i$ vector associated with the $d^{th}$ cluster corresponds to the source strength $Q_d$ of the $d^{th}$ source. The mean of these $d^{th}$ components can be the determined source strength of the $d^{th}$ source. Similarly, the means of $D_x$, $D_y$, and v for each candidate solution can be the determined corresponding model parameters. In general, a parameter associated with the $d^{th}$ source can be obtained by taking the centroid (or, mean or weighted mean) of that parameter for each of the solutions belonging to the $d^{th}$ cluster. In general, a parameter associated with the model (and not specifically with the $d^{th}$ source) can be obtained by taking the mean (or, centroid or weighted mean) of that parameter for each of the candidate solutions retained in the Green-NMFk procedure.

By combining Green's function inverse problem analysis with model-free blind source separation, the Green-NMFk procedure is capable of identifying all of these source and model parameters without any additional information besides the mixed signals and the sensor coordinates. One of ordinary skill will readily understand that the diffusion/advection example is provided as an illustration and that the Green-NMFk procedure is applicable to any signal evolution model that is amenable to treatment using one or more Green's functions, which can include parabolic partial-differential equations, the Laplace equation, the Helmholtz equation, or phenomena such as anomalous (non-Fickian) dispersion or wave propagation in dispersive media. Besides groundwater contamination, application areas include heat flow, infectious disease transmission, population dynamics, or atmospheric spread of chemical or biological substances. The Green's functions need not be analytic but can be any numerically computable functions. The model is also readily extendable to distributed continuous sources which can be modeled as sums or integrals over point sources, to time-varying sources, to any number of physical dimensions (particularly including one and three).

Certain instances of the Green-NMFk procedure can be summarized as follows:

i) Write the form of the mixtures of the contamination fields for b sources at each of the N sensors, using the expression of the Green's function in Equation (35).

ii) For each source number b, perform M Diffuse-NMF trials using NLS minimization, with random initial values, to obtain a set $U_b$ of M solutions, and a total of b×M candidate sources. In some examples, a computational strategy can be used to reduce computational cost. In some examples, $M_1$ trials are run initially, with a goal of obtaining a target number $M_0$ of trials satisfying an accuracy threshold (as described above). In some examples, $M_0$ may be 30, while in other examples $M_0$ may be in the range 10 to 1000. In some examples, $M_1$ may be 1000, while in other examples $M_1$ may be in the range 10 to 1,000,000. If $M_0$ accurate trials are obtained, then at least $M_0$ accurate trials are kept; in some examples, up to $M-M_0$ can be discarded. If $M_0$ accurate trials are not obtained, the $M_1$ initial trials can be extended to a total of $M_2$ trials. In some examples, $M_2$ may be 10,000, while in other examples $M_2$ may be in the range 100 to 1,000,000,000. With such a computational strategy, either a subset $M_0 \leq M \leq M_1$ of accurate solutions can be obtained, or $M=M_2$ solutions can be obtained. In other examples, other computational strategies can be employed, or no computational strategy can be employed.

iii) For each b, keep a subset of solutions by discarding a proportion of the solutions providing inferior reconstruction (as determined by the relative norms of respective reconstructions), cluster the remaining solutions to determine provisional clusters, and compute the average silhouette value. In examples where $M_0 \leq M \leq M_1$ accurate solutions have been obtained, it is not necessary to discard any solutions, and furthermore the iteration at (iv) below may be omitted. In other examples, such as $M=M_2$ solutions, a proportion $P_1$ of the solutions can be discarded at the outset, and a proportion $P_2$ of the remaining solutions can be discarded on subsequent iterations of this process block. In some examples, $P_1$ can be 80%, while in other examples $P_1$ can be in the range 20% to 99%. In some examples $P_2$ can be 10%, while in other examples $P_2$ can be in the range 1% to 90%. In examples, the reconstruction error can be calculated as a Frobenius norm using differences between measured concentrations or signals at the sensors and concentrations or signals calculated at the sensor locations from the determined sources according to the determined model parameters.

iv) Repeat the previous step until the average silhouette value is not increasing, or the average silhouette value is above a separation threshold, or until further iterations will reduce the number of remaining candidate sources in each cluster below a predetermined number threshold. In certain examples, the separation threshold can be 0.95, while in other examples the separation threshold can be in the range 0.6 to 1. In some examples, the number threshold can be 20, while in other examples the number threshold can be in the range 5 to 1000. The provisional clusters of a final clustering iteration can be used as the determined clusters for an instant value of source number b.

v) Compare the average silhouette values, and the reconstruction norm (for example, as shown in Equation (42)) for each b to find the optimal number A of original sources. Particularly, if a significant drop in silhouette value occurs between $b=b_1$ and $b_1+1$, and the reconstruction error is below a threshold value at $b=b_1$, then the number of sources can be determined as $A=b_1$.

vi) Once A is fixed, extract the parameters for each source. In some examples, some or all of the parameters can be obtained by taking centroids of the respective parameters for each cluster obtained at the end of the clustering (or, iterative clustering) procedure for b=A. In other examples or for other parameters, other averaging measures can be used.

vii) In some examples, the Green-NMFk procedure can be validated. A first validation method is to reconstruct signals at each sensor and compare with the original sensor signals, for example using a correlation coefficient such as a Pearson correlation coefficient. A second validation method is to evaluate the contribution of each source at each sensor. If any source contribution is below a contribution threshold, that may be a suggestion that the procedure has over-fitted and found a number of sources A that is higher than the true number of sources. The contribution threshold can vary considerably according to the problem particulars, such as relative distances between various source-sensor pairs, the number of sources, or the relative strengths of the sources. In certain examples the contribution threshold can be 10%, while in other examples the contribution threshold can be in the range 1% to 15%, or even 0.01% to 25%. In certain examples, the contribution threshold can be the same for all source-sensor pairs, while in other examples, the contribution threshold can vary. In certain examples, it can be desirable to employ both the first and second validation methods, while in other examples, one of these validation methods can be applied independently or in conjunction with yet another validation method.

Akaike Information Criterion (AIC)

The example above used the reconstruction error and the silhouette value to determine the number of sources A. In examples, the reconstruction error can be incorporated into an AIC which can be used independently or in combination with silhouette values to determine the number A of signal sources. In some examples, a subset of source numbers b is selected on the basis of having silhouette values above a silhouette threshold which can be about 0.7 or can be set to any value between 0.5 and 0.99, or between 0.6 and 0.8; the subset of source numbers b being compared by an AIC. In other examples, the silhouette value is not used and all available source numbers b are compared by an AIC.

For each source number b, an AIC is computed according to $$AIC = 2P - 2 \cdot \ln(L) = 2b \cdot (N+3) + NM \cdot \ln\left(\frac{O^{(b)}}{NM}\right) + C, \quad (45)$$

where P is the number of free parameters, b is the source number, N is the number of sensors, M is the number of signal sequence points, N·M is the total number of data points, $O^{(b)}$ is the average reconstruction error, and C is an arbitrary constant which can include free parameters that are not dependent on b. In this example, there are N+3 free parameters for each source (N mixing coefficients, 2 spatial positions, and one source strength), hence P=b (N+3), and L is defined according to:

$$\ln(L) = -\left(\frac{NM}{2}\right) \cdot \ln\left(\frac{O^{(b)}}{NM}\right). \quad (46)$$

The AIC is driven by consideration of economy of description, or parsimony, which is different from a measure of degree of clustering, such as a silhouette value. In examples, the AIC and the silhouette value can be used together or separately.

VI. Example Method of Performing Shift-NMFk

Figure 4:
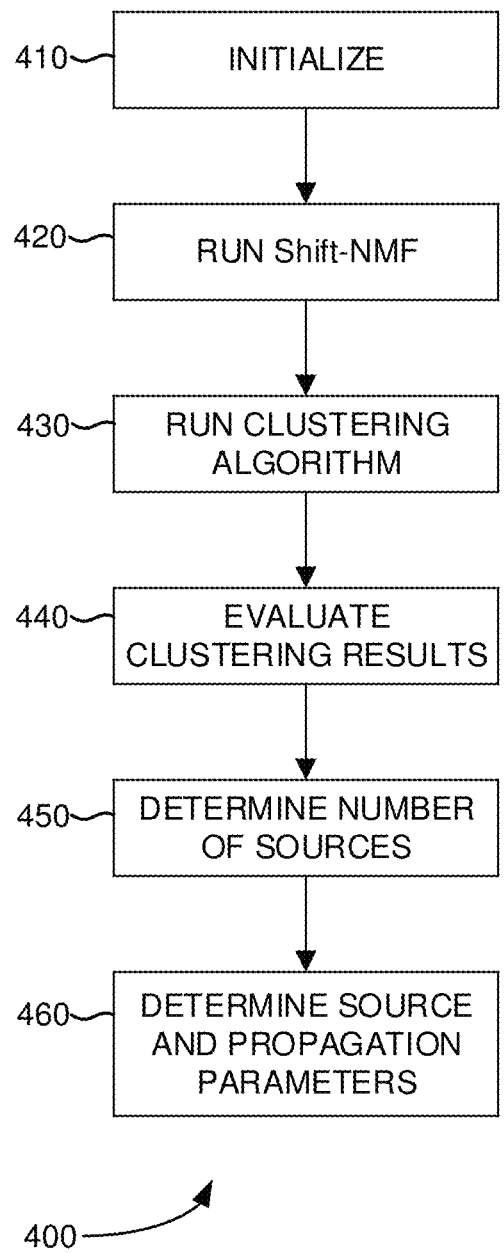
FIG. 4 is a flowchart outlining an example method of determining a number of sources, source parameters, and propagation parameters from observed sensor data, for a problem incorporating signal shifts, as can be used in certain examples of the disclosed technology.

FIG. 4 is a flowchart 400 that outlines an example Shift-NMFk procedure, as can be performed in certain examples of the disclosed technology. For example, the system described above/below at FIGS. 1A and 21 can be used in performing the depicted method.

At process block 410, the computational problem is initialized. The initialization block includes defining the problem parameters such as number of sensors and number of data samples at each sensor, providing the observed sensor data, defining a propagation and/or attenuation model, and configuring control parameters for program execution. These control parameters can include, for example, the range for possible number of sources, the number of trials to be conducted, parameters controlling the seeding of each trial, convergence criteria, selection criteria and their associated thresholds, parameters controlling updates and iterations, parameters controlling recovery of source positions, and computing parameters for features such as parallelization, optional outputs to be generated, and exception handling. Different subsets of these control parameters can be implemented in different examples. Additional initialization procedures can be used, in certain examples.

The observed sensor data corresponds to a problem of interest in which one or more sensors generate signals which are received by multiple sensors. Signals may vary on the way from source to sensor, for example by a propagation model incorporating propagation delays and possibly attenuation. In some examples, sources and sensors have spatial locations, and propagation occurs with an isotropic or anisotropic propagation velocity from each source to each sensor, but this is not a necessary feature for the disclosed innovations. In alternative examples, the separation between sources and sensors may be non-spatial, or an abstract quantity. Each sensor receives a signal that is a composite, or mixture, of individual signals from each source. An example of signal propagation and composition has been described above with regard to FIGS. 1A-1D.

At process block 420, a plurality of non-negative matrix factorization trials is performed on mixed signals detected by a plurality of sensors, according to a Shift-NMF algorithm. In some examples, the Shift-NMF algorithm performs an iterative optimization procedure to find a predetermined number of candidate sources that can represent the mixed signals. The predetermined number is denoted as the source number, and can be any positive integer. In some examples, the source number is restricted to be less than the number of sensors. A computing system can be configured to execute instructions to run multiple trials of the Shift-NMF algorithm for each of a plurality of source numbers. For example, if the maximum possible number of sources is ten, the Shift-NMF algorithm can be run for one source (e.g., a source number of 1), then for two sources, and so on, finally for ten sources. The found sources are denoted as candidate sources. For each source number, a plurality of trials is run, resulting in a large collection of candidate sources. For example, if the source number is 3 and 10,000 trials are run, each trial will generate 3 candidate sources, for a total collection of 30,000 candidate sources. In certain examples, selection criteria are applied. If a trial satisfies the selection criteria, it is deemed successful and the resulting candidate sources are added to the collection. If a trial fails any one or more of the selection criteria, the results of the trial are discarded. Trials continue until a predetermined number of candidate sources have been collected from successful trials.

The Shift-NMF algorithm can also find a candidate signal shift matrix and a candidate transfer matrix. The elements of the candidate signal shift matrix represent a temporal or frequency-domain shift from each candidate source to each sensor. The elements of the candidate transfer matrix represent a coupling or attenuation factor between each candidate source and each sensor.

At process block 430, a clustering algorithm is run for each source number. In some examples, the clustering algorithm is an adaptation of k-Means. This adaptation can be a constraint requiring equipartitioning of the candidate sources among the clusters. In the above example, with 30,000 candidate sources, and a source number of 3, the clustering algorithm will be run with 3 clusters, with the constraint that at each iteration, each cluster shall contain 10,000 candidate sources. The clusters are mutually exclusive. Because of such a constraint, the clustering algorithm is considered to be semi-supervised. The results of the clustering algorithm are clusters (3 clusters of 10,000 candidate sources each) and a representative source for each cluster. In some examples in which the clustering algorithm is a k-Means algorithm, the representative source of a cluster will be a mean of all the candidate sources belonging to that cluster. These representative sources form a basis, as every candidate source can be identified with one or the other of the representative sources.

The result of the clustering algorithm is evaluated at process block 440. A first parameter is computed that represents deviation of the candidate sources from their associated basis sources, and a second parameter is computed that represents separation of the resulting clusters from each other. In some examples, the first parameter can be a Frobenius norm. In some examples, the second parameter can be a silhouette value. These parameters are individually computed for each source number.

At process block 450, the number of sources is determined from results of the clustering algorithm. Results, such as the first and second parameters, are compared for each source number. The number of sources can be determined as the source number for which the first and second parameters are optimized together. In some examples a figure of merit can be calculated from the first and second parameters, and the number of sources is determined as the source number for which the figure of merit is maximized.

At process block 460, source and propagation parameters are determined. The signals associated with each source are readily obtained as the basis sources from the clustering algorithm for source number equal to the number of sources. A signal shift matrix and a transfer matrix are also obtained. The elements of the signal shift matrix are coefficients, each of which represents the signal shift from a particular source to a particular sensor. A column of shift matrix coefficients can be regarded as a shift vector for the corresponding source. The elements of the transfer matrix are coefficients representing the relative amplitude of a particular source as seen by a particular sensor. In examples in which a signal propagation model combines time delays (e.g., due to velocity of propagation) and attenuation (e.g., related to a conservation principle and/or absorption), the time delay will be represented in the signal shift matrix, while the attenuation will be represented in the transfer matrix. In some examples, the signal shift matrix is represented in a Fourier transform domain, such as a frequency domain. In some examples, the signal shift matrix can be transformed between a transform domain and the domain over which the signals are recorded during the Shift-NMFk procedure. In some examples, signals can be recorded in the time domain, a frequency domain can be used during Shift-NMF trials, and signal shift results can be presented and stored in the time domain. In some examples, a source parameter or propagation parameter can be determined by taking the mean of the corresponding candidate quantities for the clusters identified from the clustering algorithm for source number equal to the number of sources.

Finally, in examples having a spatial model for sources and sensors, the source coordinates can be obtained by solving a set of triangulation equations, for example by an error minimization procedure.

In certain examples, one or more of the source and propagation parameters may be determined, while determination of other source or transport parameters may be omitted.

VII. Example Method of Performing Shift-NMFk

Figure 5:
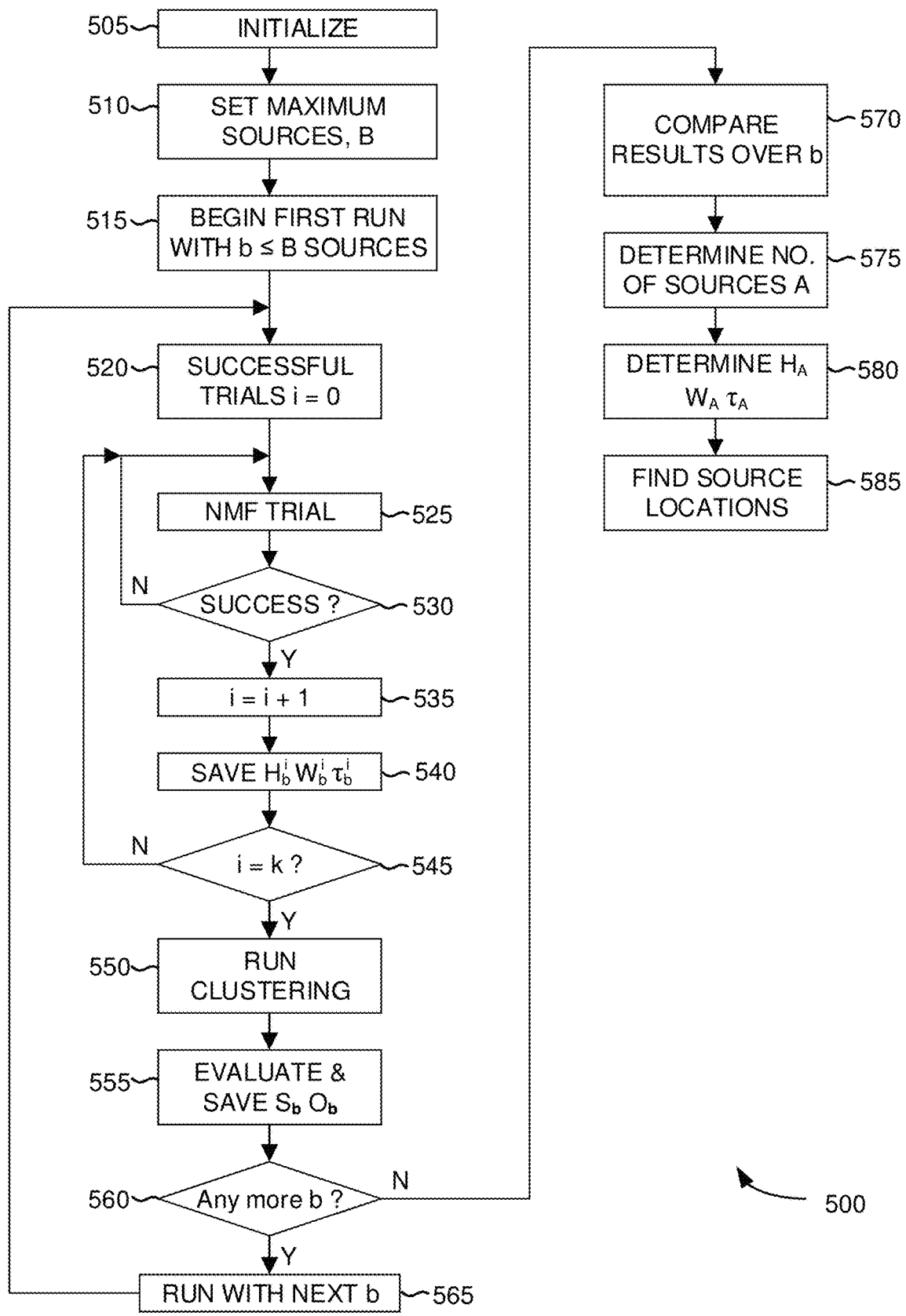
FIG. 5 is a flowchart outlining an example method of determining a number of sources, source locations, and other parameters from observed sensor data, for a problem incorporating signal shifts, as can be used in certain examples of the disclosed technology.

FIG. 5 is a flowchart 500 that outlines an example Shift-NMFk method, as can be performed in certain examples of the disclosed technology. For example, the system described above/below at FIG. 21 can be used in performing the depicted method.

At process block 505, the computational problem is initialized. The initialization block includes defining the problem parameters such as number of sensors and number of data samples at each sensor, providing the observed sensor data, defining a propagation and/or attenuation model, and configuring control parameters for program execution. This initialization includes performing functions that are similar to process block 410 described above, as adapted to a particular computational problem. In certain examples, the observed sensor data V can be organized as an N×M matrix, where N is the number of sensors and M is the number of sample points for each sensor. That is, each row represents a sensor and each column represents a sampling point such as a time point. Thus, the matrix element at row n and column m represents the signal observed at the $n^{th}$ sensor and the $m^{th}$ sample point. In other examples, the sensor data can be organized otherwise. At process block 510, an integer value B is defined, which represents the maximum number of sources that will be searched by the Shift-NMFk procedure. In certain examples, the value of B is less than the number of sensors N. Although shown as a separate process block, in some examples this block may be concurrent or part of process block 505. The Shift-NMFk procedure will search for different numbers of sources in the range 1 to B by conducting multiple trials of a non-negative matrix factorization procedure (NMF). Each NMF trial attempts to resolve the observed sensor signals into a predetermined number of sources b, which is denoted as the source number for that NMF trial. The procedures implemented by the Shift-NMFk procedure for a particular source number are denoted as a run. In certain examples, the Shift-NMFk procedure searches all values of source numbers b from 1 to B. In other examples, the search range of B is a proper subset of the range from 1 to B. For example, it may be known a priori that there are at least three sources, in which case it is not necessary to search for b≤2. As another example, the Shift-NMFk procedure may be related to an earlier study in which the number of sources was determined to be seven. In such a case, there may be an a priori expectation that the number of sources will not have changed greatly. Then the Shift-NMFk procedure may be run with b from 5 to 9, or from 7 to 10, or from 5 to 7, or according to some other restricted range according to the nature of the problem and the expectation of how the number of sources may have changed. In other examples, the search set for b may be determined dynamically, by starting with an initial range, and extending that range according to results obtained from that initial range.

At process block 515, a first run is begun with a source number b, such that 1≤b≤B, within a search range. At process block 520, a counter i is initialized to zero. The counter i represents the number of successful trials for this run. At process block 525, an NMF trial is performed. The NMF trial performs a non-negative matrix factorization procedure to resolve the observed sensor data into b candidate sources. The NMF trial incorporates signal shifts, as described above. In certain examples, the signal shifts may be incorporated in the time domain. In other examples, the signal shifts may be incorporated in a transform domain. An example of a transform domain is a Fourier transform domain. For time-dependent signals, the Fourier transform domain can be a frequency domain. In other examples, the signal shift may be present in an abstract domain, such as a cell-division or mutational generation, and may be represented in that domain or in a transform domain. In further examples, the signal shift itself can be in a transform domain, such as for Doppler-shifts of spectral signals.

The example NMF trial concludes with a determination of b candidate sources. The candidate sources may be represented as a b×M matrix H. That is, each row represents a candidate source d and each column represents a sample point m. In certain examples, sample points are time points. Thus, the matrix element at row d and column m represents the signal amplitude of source d at sample point m. In other examples, the candidate sources can be organized otherwise.

In certain examples, the NMF trial also produces a candidate signal shift matrix z. The candidate signal shift matrix can be organized as an N×b matrix, where N is the number of sensors and b is the number of candidate sources. In other words, each row represents a sensor and each column represents a candidate source. Thus, the matrix element at row n and column d represents the signal shift from the $d^{th}$ candidate source to the $n^{th}$ sensor. In other examples, the candidate signal shift matrix can be organized otherwise. In certain examples, the NMF trial also produces a candidate transfer matrix W. The candidate transfer matrix can be organized as an N×b matrix, where N is the number of sensors and b is the number of candidate sources. That is, each row represents a sensor and each column represents a candidate source. Thus, the matrix element at row n and column d represents a mixing coefficient representing coupling and/or attenuation from the $d^{th}$ candidate source to the $n^{th}$ sensor. In other examples, the candidate transfer matrix can be organized otherwise.

At process block 530, a determination is made whether the NMF trial was successful. In certain examples, one or more selection criteria are applied to results of the NMF trial. A first selection criterion is goodness of reconstruction. In certain examples, the observed sensor data is compared with reconstructed data to determine a goodness of reconstruction. In certain examples, a ratio is calculated between (a) the Frobenius norm of the difference between the observed sensor data and the reconstructed data at the sensors, and (b) the Frobenius norm of the observed sensor data. If this ratio exceeds a predetermined threshold, which in certain examples can be 0.1, then the first selection criterion is not met. Otherwise, the first selection criterion is met. A second selection criterion is visibility, which is based on a notion that every sensor should be able to see every source. Thus, a candidate transfer matrix coefficient from source d to sensor n that is below a second threshold indicates that sensor n cannot see source d. In certain examples, if any coefficient in the candidate transfer matrix is below the second threshold, then the second selection criterion is not met. Otherwise, the second selection criterion is met. In other examples, a figure of merit can be calculated based on an entire row (that is, all the coefficients for a sensor), an entire column (that is, all the coefficients for a source), and/or the entire candidate transfer matrix. If the figure of merit is below the second threshold, then the second criterion is not met. Otherwise, the second selection criterion is met. A third selection criterion is a maximum delay limit. In examples relating to propagation delay, a third limit is calculated based on the maximum delay possible between sensors. If the difference between two coefficients of the candidate signal shift matrix exceeds the third limit, then the NMF trial solution is considered to be non-physical, and the third criterion is not met. Otherwise, the third selection criterion is met. In certain examples where the candidate signal shift matrix is implemented in a frequency domain, the third limit can be applied to a second matrix of candidate signal shifts referred back to the time domain. Similar considerations apply to examples concerned with signals that are not time-dependent, but may be based on another quantity such as cell division or mutation generation. In such examples also, a third limit can be implemented representing the maximum signal shift considered to be possible between two sensors. In certain examples, fewer or more than all of these selection criteria can be applied.

In certain examples, a trial is successful if all selection criteria are met. In certain examples, a trial is successful if a predetermined subset of the selection criteria is met. In certain examples a trial is successful if any of the selection criteria are met. If the trial is not successful, the N branch from process block 530 is taken, returning to process block 525 for another trial.

If the trial is successful, the Y branch from process block 530 is taken, and the method proceeds to process branch 535. The count of successful trials is incremented, and at process branch 540, the candidate results are saved. In certain examples, the candidate results may include a matrix of candidate sources, designated as $H_b^i$. Here, the subscript b indicates that this result is for a trial having source number equal to b, and the superscript i indicates that this result is the $i^{th}$ result for this run. In certain examples this matrix can be a b×M matrix as described above. In certain examples, the candidate results may include a candidate transfer matrix $W_b^i$ and/or a candidate signal shift matrix $\tau_b^i$. Once again, the subscript b indicates that this result is for a trial having source number equal to b, and the superscript i indicates that this result is the $i^{th}$ result for this run. In certain examples these matrices can be an N×b matrices as described above.

At process block 545, the number of successful trials is compared with a predetermined number of desired trials k. If i has reached k, then no more trials are required in this run, and control proceeds along the Y branch to process block 550. Otherwise, the N branch from process block 545 is taken, returning to process block 525 for another NMF trial.

The description above applies selection criteria and performs the selection at process block 530, after completion of one trial and before the next trial. In alternative examples, the selection criteria can be applied after a batch of trials have been performed, or even after all trials have been performed. Regardless of when in the Shift-NMFk procedure the selection is performed, the goal is to obtain a suitable number of successful trials k to proceed with process block 550.

At process block 550, clustering is performed on the candidate results for the present run $\{H_b^1, H_b^2, H_b^3, \ldots, H_b^k\}$ to obtain b sources representing b clusters. Each of the k candidates source matrices contain b candidate source vectors, each vector being a sequence of signal values such as a time series. Thus the clustering operates on a total of b×k candidate sources. In certain examples exclusive clustering is used, meaning that one candidate source can belong to only one cluster. In certain examples the clustering procedure is performed using a k-Means algorithm, but this is not an essential requirement of the disclosed innovations. In certain examples, a constraint is applied in the clustering process to maintain exactly k candidate sources within each cluster. In alternative examples, outliers can be discarded during the clustering procedure, meaning that the total number of candidate sources will be reduced, and requiring an adaptation of the equipartitioning constraint.

At process block 555, results of the clustering procedure are evaluated. A first parameter $O_b$ is calculated to compare the reconstructed sensor signal to the original sensor data and indicate goodness of reconstruction. This parameter can be a Frobenius norm, $O_b=\|V-W_b H_b'\|_F$ where the "'" symbol indicates that the source signals $H_b$ have been referenced to the sensors on a row-wise basis using the corresponding signal shifts. In alternative examples different measures can be used to calculate $O_b$, such as an AIC. A second parameter $S_b$ is calculated as a measure of the degree of clustering. In certain examples, this parameter can be determined by comparing (a) average separation between a particular candidate source and other candidate sources in the same cluster with (b) average separation between the particular candidate source and candidate sources in other clusters. For perfect or near-perfect clustering, the expression (a) is vanishingly small compared to expression (b). In certain examples, the second parameter is a silhouette parameter, and ranges from a value of 1 for perfect clustering to 0 for indistinguishable clusters. In alternative examples, different measures can be used to calculate $S_b$.

While the primary result of process block 555 is a source matrix $H_b$, in certain examples transfer matrix $W_b$ and signal shift matrix $\tau_b$ are also calculated. In examples where H is represented as a b×M matrix, the $d^{th}$ row represents the $d^{th}$ source and corresponds to the $d^{th}$ cluster of k candidate sources. Each of the k candidate sources can be associated with a candidate transfer matrix and a candidate signal shift matrix saved at process block 540 as described above. Thus, the $d^{th}$ row of the H matrix corresponds to the $d^{th}$ row of each of k associated candidate transfer matrices. In certain examples, the $d^{th}$ row of the transfer matrix can be obtained by taking a mean of the corresponding rows of the associated candidate transfer matrix. In alternative examples, a median, a harmonic mean, or another generalized average can be used. The other rows of the transfer matrix can likewise be obtained from the corresponding rows of the candidate transfer matrices of the corresponding cluster. In certain instances, the clusters will contain one candidate source from each trial, and a row-wise mean of the candidate transfer matrices is indistinguishable from an overall mean of the candidate transfer matrices $\{W_b^1, W_b^2, W_b^3, \ldots, W_b^k\}$. Accordingly, in some examples, rather than perform row-wise means cluster by cluster, the transfer matrix can be obtained by taking the mean (or other average) of the candidate transfer matrices directly. The signal shift matrix can be calculated similarly from the candidate signal shift matrices. In certain examples, the signal shift matrix can be obtained by taking averages in the same domain as the sequence of signal observations, typically a time domain, while in alternative examples the signal shift matrix can be obtained by taking averages in a transfer domain such as a frequency domain. In alternative examples, instead of, or in addition to, computing an average, one or both of the transfer matrix and the signal shift matrix can be computed by a second optimization procedure. Thus, $W_b$ and/or $\tau_b$ are determined to minimize the reconstruction error between the solved $H_b$ and the sensor observations V, for example, by minimizing the Frobenius norm $\|V-W_bH_b'\|$ where the "'" symbol indicates that the source signals $H_b$ have been referenced to the sensors on a row-wise basis using the corresponding signal shifts. A software library such as NLopt can be used to determine a minimum reconstruction error.

At process block 560, the run for the present source number b is complete, and a determination is made whether any more runs are to be performed. As described above, the termination condition can vary between examples. In certain examples, runs are complete when runs for all b in the range from 1 to B have been performed. In alternative examples, runs are complete when runs for a predetermined subset of this range have been performed. In further examples, the termination condition can be determined dynamically, for example based on the first parameter $O_b$ and second parameter $S_b$ of completed runs. If no more runs are to be performed, the N branch is taken and control proceeds to block 570. Otherwise, the Y branch is taken, and a next value of source number b is determined at process block 565, whence control returns to process block 525 for the next run.

At process blocks 570 and 575, results are compared over source number b to select an answer A for the number of sources. In certain examples, the first parameter $O_b$ can have a generally decreasing trend as b is increased. Thus, with an increasing number of sources, it is often possible to more closely match the observed sensor data. In certain examples, the second parameter can have a generally decreasing trend as b is increased. For b=1 there is just one source and one cluster, which is by definition perfectly clustered. Whereas, for large b, clusters will merge into each other and become indistinguishable. In certain examples, a figure of merit is calculated individually for each b, and the number of sources A is chosen as the value of b for which the figure of merit is maximized. For example, the ratio $S_b/O_b$ can be used as a figure of merit. In certain examples, the sequence of $S_b$ is analyzed to determine a knee, and the values of $O_b$ are compared for values of b below the knee, and the number of sources A is chosen as the value of b below the knee for which $O_b$ is minimized. In alternative examples a threshold condition is set for either $O_b$ or $S_b$. For example, a threshold of $S_b$=0.8 can be used, and the number of sources A can be chosen as the value of b for which $S_b$ is greater than its threshold and $O_b$ is minimized. This technique can be used in examples where an AIC is used for $O_b$. For another example, a threshold of $O_b$=0.2 can be used, and the number of sources A can be chosen as the value of b for which $O_b$ is below its threshold and $S_b$ is maximized. Other techniques can be used.

In other examples, a difference-based procedure can be used. Forward differences $\Delta O_b=|O_{b+1}-O_b|$ and $\Delta S_b=|S_{b+1}-S_b|$ are calculated. In still other examples, $\Delta O_b=O_b-O_{b+1}$ and/or $\Delta S_b=S_b-S_{b+1}$ can be used. As a first criterion, b is chosen to maximize $\Delta S_b$ (in some examples, this can correspond to finding the knee of the silhouette function). If the largest $\Delta S_b$ values are nearly the same, to within an equality threshold, then, as a second criterion, b is chosen to minimize $\Delta O_{b+1}$ among those b having the largest $\Delta S_b$. In other examples, the second criterion can be to minimize $\Delta O_b$. In some examples the equality threshold can be 0.05, while in other examples, the equality threshold can be in the range 0.01 to 0.2.

At process block 580, the final answers are determined for the source matrix $H_A$, the transfer matrix $W_A$, and the signal shift matrix $\tau_A$ respectively. In certain examples, this step may be performed as simply as selecting the corresponding $H_b$, $W_b$, $\tau_b$ for b=A. In alternative examples, some of the procedures described above at process block 550 may be performed or repeated at this process block. Certain examples may omit one or more of these final answers. For example, in certain problems it may be sufficient to determine merely the source signals $H_A$. For example, in certain problems it may be sufficient to determine merely the source positions, in which case only $\tau_D$ is needed.

At process block 585, the locations of the sources are determined. In certain examples, these locations correspond to spatial locations. In certain examples, these locations are abstract quantities having meaning in the context of the signal shifts embodied in the problem being studied. Whether spatial or abstract, the locations can have any number of dimensions, including one dimension, two dimensions, and three dimensions. The signal shift matrix provides a measure of distance between every source and every sensor. With the sensor positions being known, the source location problem can be solved by finding a set of locations that best fits the calculated signal shifts. The best fit problem can be solved as an error minimization problem. In certain examples, the best fit problem can be solved by least squares minimization using NLopt, Matlab™ Optimization Toolbox, or other suitable libraries. In certain examples, this process block can be omitted.

VIII. Example Method of Performing Shift-NMFk

Figure 1A:
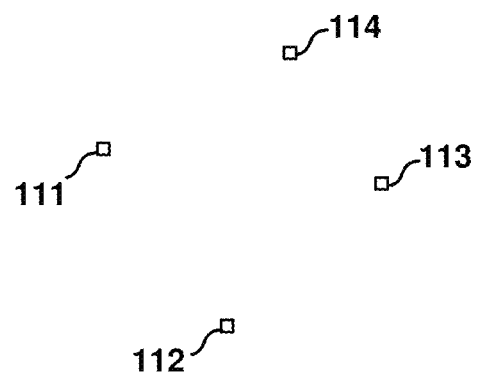
Figure 1A:
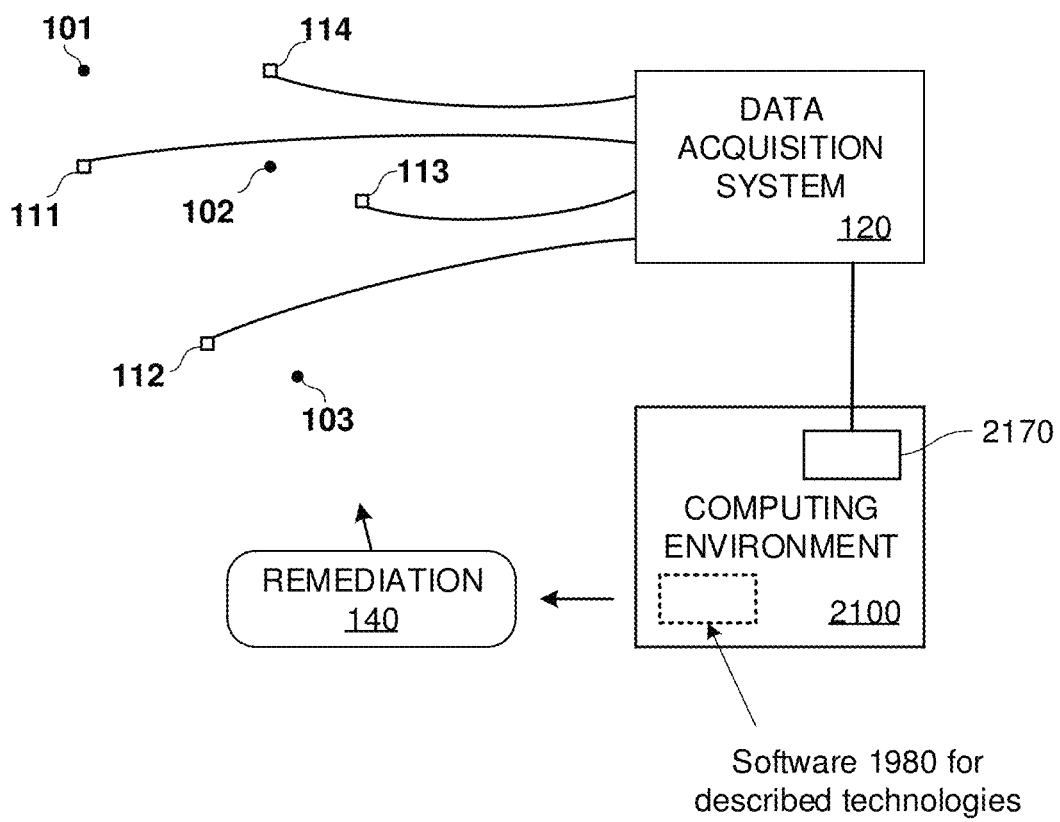
Figure 6:
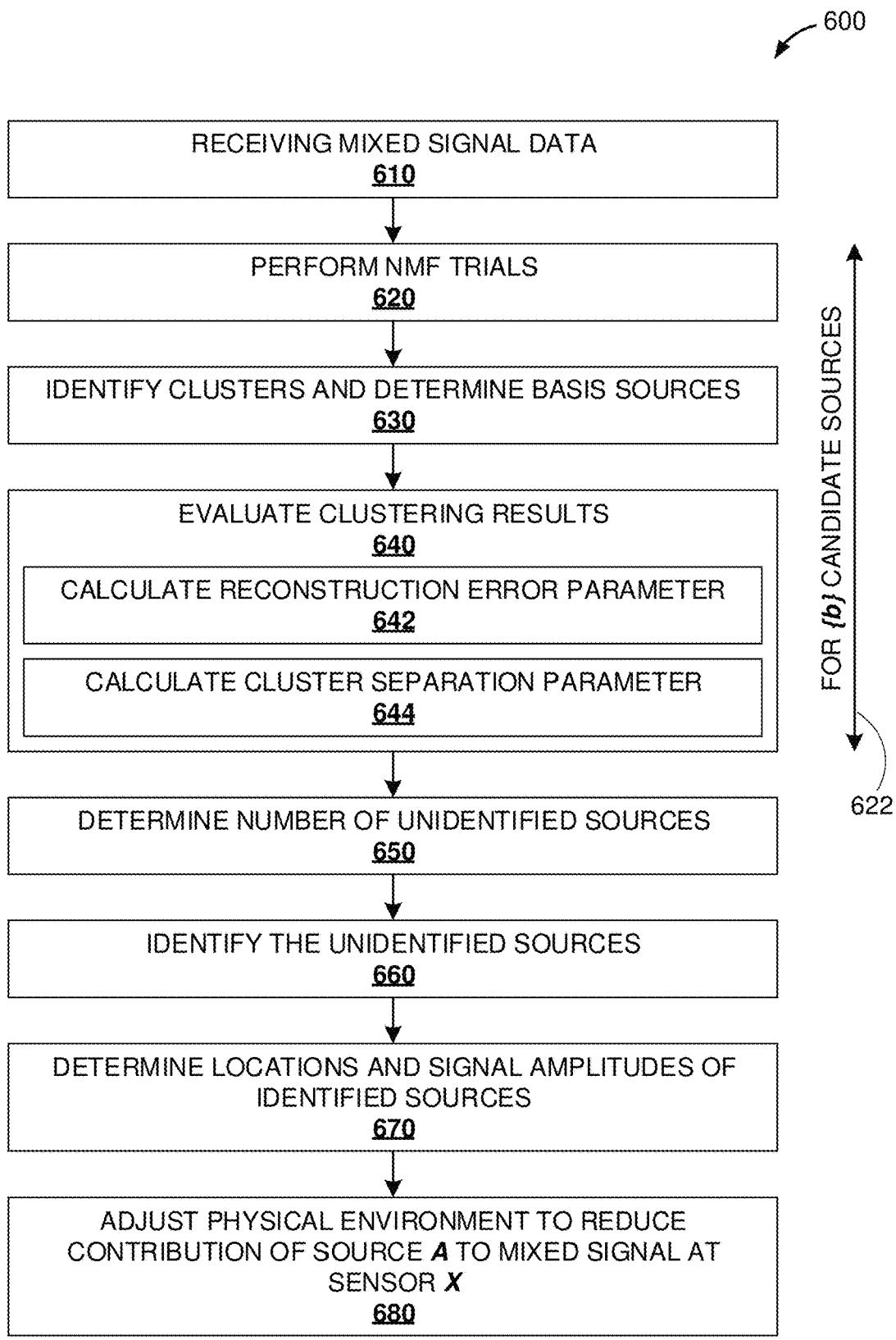
FIG. 6 is a flowchart outlining an example method of identifying a number of sources and source parameters, and performing remediation on at least one of the identified sources, according to disclosed technology.

FIG. 6 is a flowchart 600 outlining an example method of identifying a number of sources and source parameters, and performing remediation on at least one of the identified sources, according to disclosed technology. The method can be performed in a computing environment associated with unidentified sources and sensors similar to those described in context of FIGS. 1 and 2.

At process block 610, mixed signal data is received at a computer. The mixed signals can be detected at a plurality of sensors and can correspond to respective combinations of signals generated by one or more unidentified sources.

At process block 620, multiple NMF trials are performed on the mixed signal data, with each NMF trial producing a predetermined source number b of candidate sources. A signal propagation model links the candidate source signals with the source contributions observed at the sensors. At process block 630, clustering is performed on the candidate sources from the multiple trials to identify clusters of candidate sources and determine basis sources associated with respective clusters. A semi-supervised clustering procedure can be used, and the clustering can be constrained to retain equal numbers of candidate sources within each cluster.

At process block 640, the clustering results are evaluated, which includes process sub-blocks 642 and 644. At sub-block 642, a first parameter is calculated, representing the reconstruction error of the basis sources. The basis source signals can be propagated forward to the sensors according to the signal propagation model (sometimes described as referring or referencing the sources signals to the sensors). For each sensor, the forward propagated signals from the basis sources can be combined to form reconstructed signals, and the reconstructed signals can be compared with the observed sensor signals to determine the reconstruction error parameter, which can be a Frobenius norm. Alternatively, the reconstruction error can be incorporated into an Akaike Information Criterion (AIC). At sub-block 644, a second parameter is calculated representing separation of the identified clusters; the second parameter can be a silhouette value.

In examples, and as indicated by arrow 622, process blocks 620-640 can be performed for multiple source numbers b, which can be predetermined or dynamically determined. In varying examples, the process blocks can be performed in parallel or sequentially, and different source numbers b can be processed sequentially, interleaved, or in batches.

With clustering evaluation for different source numbers b in hand, the number A of unidentified sources is determined at process block 650. In examples, source numbers b<A can have high reconstruction error, and source numbers b>A can have low reconstruction error but also low cluster separation. The optimal source number b can have low reconstruction error (or AIC) and high cluster separation and is selected as the determined number of unidentified sources A. At process block 660, the basis sources for b=A are used to identify the unidentified sources. At process block 670, the clustering results are further used to determine the source signal waveforms, strengths, or amplitudes, mixing coefficients between sources and sensors, and/or also the source locations. Parameters of the signal propagation model can also be determined, and can be used as part of the location determining procedure.

With sources, source locations, and/or other source parameters identified, remediation is performed at process block 680. The physical environment, in which sources and sensors are located, is adjusted to reduce the contribution of a selected source U to at least one sensor R. In varying examples, this remediation can include removal of the source, shielding of the source, or placing an impediment to signal propagation in the physical environment, between the source U and sensor R. In the former remediations, the source signal amplitude can be reduced, while in the last case, the source signal amplitude can remain unchanged. In examples, the source U can be attenuated for a group of sensors or all sensors. In examples, all sources can be attenuated for at least sensor R.

IX. Example Method of Performing Green-NMFk

Figure 7:
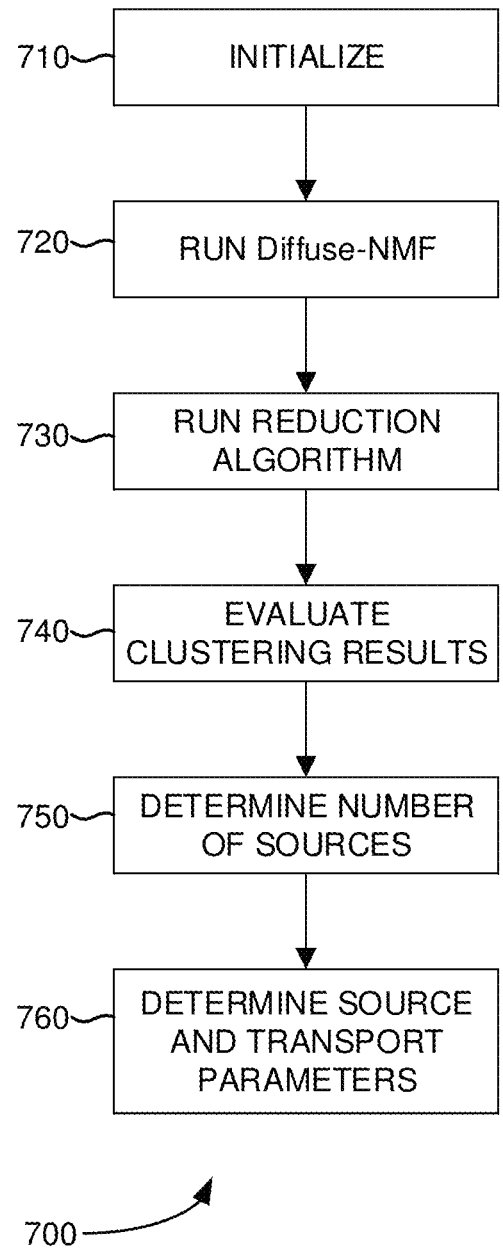
FIG. 7 is a flowchart outlining an example method of determining a number of sources, source parameters, and transport parameters from observed sensor data, for a problem incorporating diffusion, as can be used in certain examples of the disclosed technology.

FIG. 7 is a flowchart 700 that outlines an example Green-NMFk method, as can be performed in certain examples of the disclosed technology. For example, the system described herein with reference to FIG. 21 can be used in performing the depicted method.

At process block 710, the computational problem is initialized. This block is largely similar to block 410, and details are applicable as described for block 410 above. However, in certain examples block 710 includes defining a diffusion and/or advection model, and in certain examples block 710 excludes defining a wave-like propagation and/or attenuation model.

At process block 720, a plurality of non-negative matrix factorization (NMF) trials are performed on mixed signals detected by a plurality of sensors, according to a Diffuse-NMF algorithm. In some examples, the Diffuse-NMF algorithm performs an iterative optimization procedure to find a predetermined number of sources that can represent the mixed signals. The predetermined number is denoted as the source number, and can be any positive integer. In some examples, the source number is restricted to be less than the number of sensors. A computing system can be configured to execute instructions to run multiple trials of the Diffuse-NMF algorithm for each of a plurality of source numbers. For example, if the maximum possible number of sources is ten, the Diffuse-NMF algorithm can be run for one source (i.e. source number of 1), then for two sources, and so on, finally for ten sources. The found sources are denoted as candidate sources. For each source number, a plurality of trials is run, resulting in a large collection of candidate sources. For example, if the source number is 9 and 1,000 trials are run, each trial will generate 9 candidate sources, for a total collection of 9,000 candidate sources. For each trial, the trial results are used to reconstruct signals that would be obtained at the sensors, and a deviation parameter is calculated that represents how well the reconstructed signal match the mixed signals recorded at the sensors and used as input to the computational problem. In some examples, the deviation parameter is a Frobenius norm.

The Diffuse-NMF algorithm can also find a candidate amplitude vector, candidate source coordinates, and candidate transport parameters. In certain examples, these quantities are obtained as outputs of a non-linear optimization procedure invoked within the Diffuse-NMF algorithm. The elements of the candidate amplitude vector represent an amplitude of each candidate source. For problems having a spatial model for sources and sensors, the candidate source coordinates represent a spatial location of each source. The candidate transport parameters represent properties of a medium through which diffusion and/or advection occurs.

At process block 730, an iterative reduction algorithm is run for each source number. In certain examples, an iteration of the reduction algorithm includes the phases (P1), (P2), and (P3): (P1) Trials having a high deviation parameter are discarded, (P2) a clustering algorithm is run on candidate sources from the remaining trials, and (P3) a cluster separation parameter is calculated. The cluster separation parameter represents the separation between the clusters identified by the clustering algorithm. In some examples, the clustering parameter is a silhouette coefficient. In some examples, the clustering algorithm is an adaptation of k-Means. This adaptation can be a constraint requiring equipartitioning of the candidate sources among the clusters. By way of example, with 1,000 trials, procedure (P1) could discard the 200 worst trials, whereby procedure (P2) performs clustering on 7200 candidate sources from 800 trials, to identify 9 clusters having 800 candidate sources each. The procedures (P1)-(P2)-(P3) are iterated until a termination condition is reached. In some examples, a termination condition is reached when the number of candidate sources remaining has decreased to a predetermined limit. In some examples, a termination condition is reached based on diminishing increases to the clustering parameter. In some examples, there are multiple termination conditions, and the iterations terminate when any one of the termination conditions is satisfied. After termination of iterations, clusters are identified based on the final (P2) procedure, and representative sources for each cluster are determined for each cluster. In some examples in which the clustering algorithm is a k-Means algorithm, the representative source of a cluster will be a mean of all the candidate sources belonging to that cluster. The clusters are mutually exclusive. These representative sources form a basis, as every candidate source can be identified with one or the other of the representative sources.

The result of the clustering within the reduction algorithm is also evaluated at process block 740. A first parameter is computed that represents deviation of the remaining candidate sources from their associated basis sources, and a second parameter is the final value of the cluster separation parameter computed at (P3). In some examples, the first parameter can be a Frobenius norm. These parameters are individually computed for each source number.

At process block 750, the number of sources is determined from results of the clustering algorithm. This block is largely similar to block 440, and details are applicable as described for block 440 above.

At process block 760, source and transport parameters are determined. The signals associated with each source are readily obtained as the basis sources from the reduction algorithm for source number equal to the number of sources. These basis sources already include the effects of diffusion and/or advection as the signal varies going from the source to each sensor. In some examples, the basis sources also include amplitude information of each source. In other examples, the amplitude information is contained in a separate amplitude vector, which can be determined from the candidate amplitude vectors from the remaining Diffuse-NMF trials for source number b equal to the number of sources A. The source coordinates can be determined from the candidate source coordinates from the remaining Diffuse-NMF trials for source number b equal to the number of sources A.

The transport parameters determined at block 760 can represent quantities such as advection velocity, and diffusion coefficients within a medium through which signals propagate from sources to sensors. The transport parameters can be determined from the candidate transport parameters from the remaining Diffuse-NMF trials for source number b equal to the number of sources A. In some examples, a source or transport parameter can be determined by taking the mean of the candidate source or transport parameters from the remaining Diffuse-NMF trials. In certain examples, one or more of the source and transport parameters can be determined, while determination of other source or transport parameters can be omitted.

X. Example Method of Performing Green-NMFk

Figure 8:
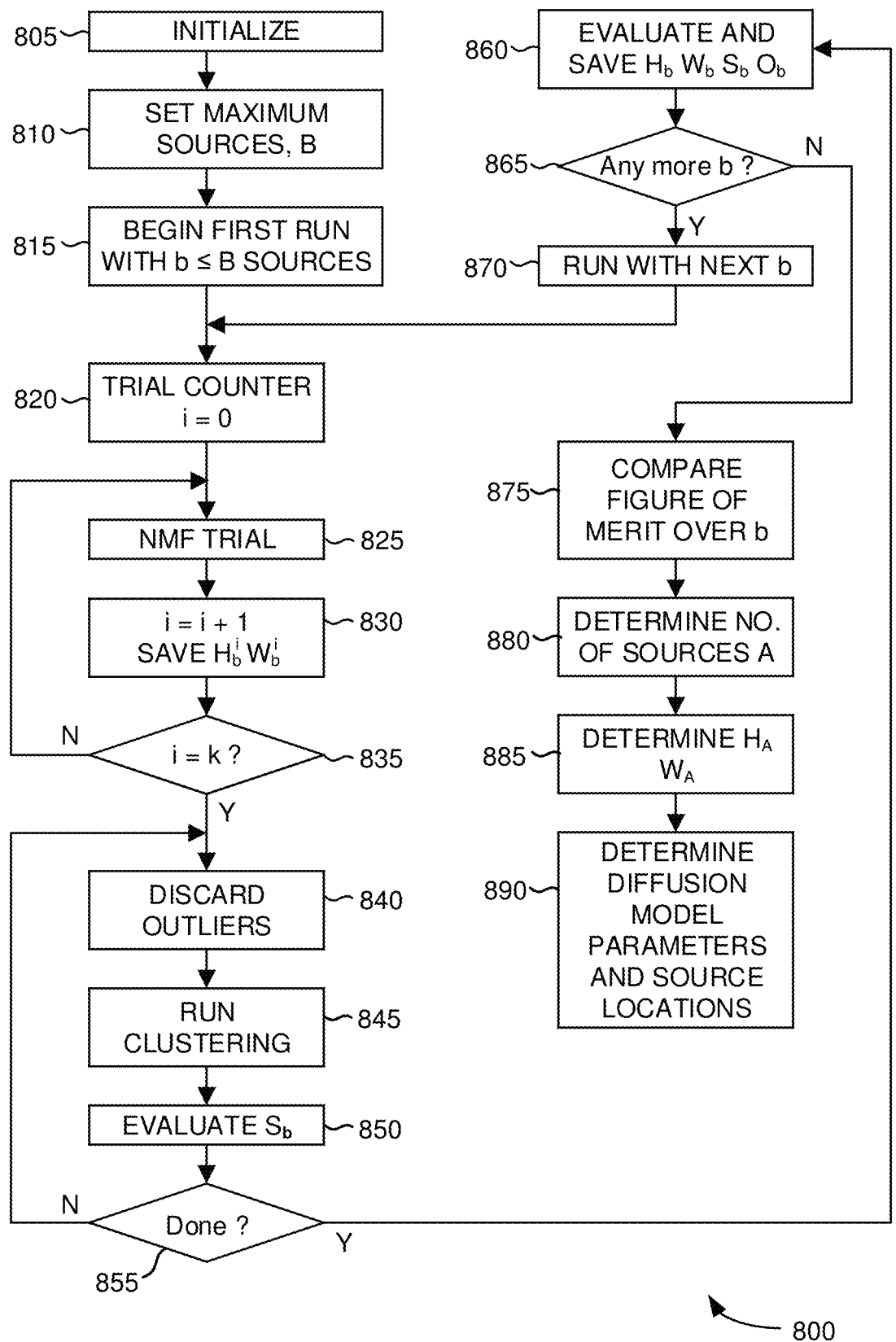
FIG. 8 is a flowchart outlining an example method of determining a number of sources and other parameters from observed sensor data, for a problem incorporating diffusion, as can be used in certain examples of the disclosed technology.

FIG. 8 is a flowchart 800 that outlines an example Green-NMFk procedure, as can be performed in certain examples of the disclosed technology. For example, the system described above/below at FIG. 21 can be used in performing the depicted method.

At process block 805, the computational problem is initialized. The initialization block includes defining the problem parameters such as number of sensors and number of data samples at each sensor, providing the observed sensor data, defining a signal variation model incorporating diffusion and/or advection, and configuring control parameters for program execution. This process block performs functions that are similar to process block 710 described above. In certain examples, the observed sensor data V can be organized as an N×M matrix, where N is the number of sensors and M is the number of sample points for each sensor. That is, each row represents a sensor and each column represents a sampling point such as a time point. Thus, the matrix element at row n and column m represents the signal observed at the $n^{th}$ sensor and the $m^{th}$ sample point. In other examples, the sensor data can be organized otherwise. At process block 810, an integer value B is defined, which represents the maximum number of sources that will be searched by the Green-NMFk procedure. In certain examples, the value of B is less than the number of sensors N. Although shown as a separate process block, in some examples this block can be concurrent with or part of process block 805. The Green-NMFk procedure will search for different numbers of sources in the range 1 to B by conducting multiple trials of a non-negative matrix factorization procedure (NMF). Each NMF trial attempts to resolve the observed sensor signals into a predetermined number of sources b, which is denoted as the source number for that NMF trial. The procedures implemented by the Green-NMFk procedure for a particular source number b are denoted as a run. In certain examples, the Green-NMFk procedure searches all values of source numbers b from 1 to B. In other examples, the search range of B is a proper subset of the range from 1 to B. For example, it could be known a priori that there are at least three sources, in which case it is not necessary to search for b≤2. As another example, the Green-NMFk procedure could be related to an earlier study in which the number of sources was determined to be seven. In such a case, there could be an a priori expectation that the number of sources will not have changed greatly. Then the Green-NMFk procedure could be run with b from 4 to 10, or from 7 to 9, or from 3 to 7, or some other restricted range according to the nature of the problem and the expectation of how the number of sources could have changed. In other examples, the search set for b can be determined dynamically, by starting with an initial range, and extending or curtailing that range according to results obtained from that initial range.

At process block 815, a first run is begun with a source number b, such that 1≤b≤B, within a search range. At process block 820, a counter i is initialized to zero. The counter i represents the number of successful trials for this run. At process block 825, an NMF trial is performed. The NMF trial performs a non-negative matrix factorization procedure to resolve the observed sensor data into b candidate sources. The NMF trial procedure incorporates signal diffusion, as described above. In certain examples, the NMF trial procedure at process block 825 incorporates non-linear least square minimization of a cost function that incorporates a Green's function of known form for the signal variation model. In certain examples, the signal diffusion can be incorporated in the time domain. In other examples, the signal diffusion can be present in a non-temporal or an abstract domain.

The NMF trial concludes with a determination of b candidate sources. The candidate sources can be represented as a b×(N×T) matrix H. That is, each row represents a candidate source d (from 1 to b) and each column represents a sensor n (from 1 to N) and sample point m (from 1 to T). In certain examples, sample points are time points. Thus, the matrix element at row d and column c represents the signal amplitude of source d at sensor n=1+⌊(c−1)/T⌋ sample point m=1+((c−1) mod T). In other examples, the candidate sources can be organized otherwise.

In certain examples, the NMF trial also produces a candidate transfer matrix W. The candidate transfer matrix can be organized as an N×b matrix, where N is the number of sensors and b is the number of candidate sources. That is, each row represents a sensor and each column represents a candidate source. Thus, the matrix element at row n and column d represents a mixing coefficient representing coupling and/or attenuation from the $d^{th}$ candidate source to the $n^{th}$ sensor. In other examples, the candidate transfer matrix can be organized otherwise.

At process block 830, the count of successful trials is incremented, and the candidate results for the present trial are saved. In certain examples, the candidate results can include a matrix of candidate sources, designated as $H_b^i$. Here, the subscript b indicates that this result is for trial for source number equal to b, and the superscript i indicates that this result is for the $i^{th}$ trial for this run. In certain examples this matrix can be a b×(N×T) matrix as described above. In certain examples, the candidate results can include a candidate transfer matrix $W_b^i$. Once again, the subscript b indicates that this result is for trial for source number equal to b, and the superscript i indicates that this result is the $i^{th}$ result for this run. In certain examples this matrix can be an N×b matrix as described above.

At process block 835, the number of completed trials is compared with a predetermined number of desired trials k. If i has reached k, then no more trials are required in this run, and control proceeds along the Y branch to process block 840. Otherwise, the N branch from process block 835 is taken, returning to process block 825 for another NMF trial.

Process blocks 840-855 constitute an iterative clustering procedure that is performed on the candidate results for the present run $\{H_b^1, H_b^2, H_b^3, \ldots, H_b^k\}$ to obtain b sources representing b clusters. Each of the k candidates source matrices contain b candidate source vectors, each vector being a sequence of signal values such as a time series. Thus the iterative clustering operates commences with a total of b×k candidate sources.

At process block 840, outliers among the candidate sources are discarded. In certain examples, each candidate source is used to reconstruct sensor signals, and, for each sensor, a norm is computed between a combination of reconstructed sensor signals (from the various candidate sources) and the observed sensor signal. Those candidate sources having high norms are discarded. In certain examples, the number of sources discarded is constrained to be a multiple of the source number b. This allows equipartition of the remaining candidate sources among b clusters. In certain examples, approximately 10 percent of the candidate sources are discarded; in alternative examples, the percentage of candidate sources discarded can range from 0.1% to 30%. In certain examples, the proportion of outliers discarded remains fixed on successive iterations through process block 840, while in alternative examples, this proportion can vary. In some examples, a constraint can be applied to prevent the number of remaining candidate sources from decreasing beneath a predetermined floor. Over the iterative clustering procedure as a whole, from 10% to 99% of candidate sources (or even from 1% to 99.9%) can be discarded.

At process block 845, a clustering procedure is performed on the remaining candidate sources. In certain examples exclusive clustering is used, meaning that one candidate source can belong to only one cluster. In certain examples the clustering procedure is performed using a k-Means algorithm, but this is not an essential requirement of the disclosed innovations. In certain examples, a constraint is applied in the clustering process to maintain an equal number of candidate sources within each cluster.

Following the clustering, a second parameter $S_b$ (b denoting the present source number) indicating a degree of cluster separation is evaluated at process block 850. In certain examples, $S_b$ is obtained by comparing (a) average separation between a particular candidate source and other candidate sources in the same cluster with (b) average separation between the particular candidate source and candidate sources in other clusters. For perfect clustering, the expression (a) is vanishingly small compared to expression (b). In certain examples, the second parameter is an average silhouette value over all the clusters, and ranges from a value of 1 for perfect clustering to 0 for indistinguishable clusters. In alternative examples, different measures can be used to calculate $S_b$.

At process block 855, a determination is made whether the iterative clustering procedure can be terminated. In certain examples, the termination decision is based on the number of candidate sources remaining. In certain examples, the termination decision is based on a convergence test applied to the sequence of second parameters obtained on successive iterations of the clustering procedure. In certain examples, the iterative clustering procedure can be terminated when $S_b$ has stopped increasing, that is, when the most recent $S_b$ is less than or equal to the immediately preceding value of $S_b$. If the decision is made to terminate, control passes to process block 860. Otherwise, control returns to process block 840 for another iteration of the iterative clustering procedure.

At process block 860, results of the iterative clustering procedure 840-855 are evaluated.

While the primary result of the iterative clustering procedure 840-855 is a source matrix $H_b$, in certain examples transfer matrix $W_b$ is also calculated. In examples where H is represented as a b×(N×T) matrix, the $d^{th}$ row represents the $d^{th}$ source and corresponds to the $d^{th}$ cluster of k candidate sources. Each of the remaining candidate sources can be associated with a candidate transfer matrix saved at process block 830 as described above. Thus the $d^{th}$ row of the H matrix corresponds to the $d^{th}$ row of each of k associated candidate transfer matrix. In certain examples, the $d^{th}$ row of the transfer matrix can be obtained by taking a mean of the corresponding rows of the associated candidate transfer matrix. In alternative examples, a median, a harmonic mean, or another generalized average can be used. The other rows of the transfer matrix can likewise be obtained from the corresponding rows of the candidate transfer matrices of the corresponding cluster. In certain instances, the clusters will contain one candidate source from each trial, and a row-wise mean of the candidate transfer matrices is indistinguishable from an overall mean of the candidate transfer matrices $\{W_b^1, W_b^2, W_b^3, \ldots, W_b^k\}$. Accordingly, in some examples, rather than calculate the row-wise average cluster by cluster, the transfer matrix can be obtained by taking the mean (or other average) of the remaining candidate transfer matrices directly. In alternative examples, instead of, or in addition to, computing an average, the transfer matrix can be computed by a second optimization procedure. That is $W_b$ is determined to minimize the reconstruction error between the solved $H_b$ and the sensor observations V, for example by minimizing the Frobenius norm $\|V - W_b H_b\|_F$, where the $H_b$ signals already referenced to all the sensors as a consequence of the formulation of the NMF problem. A library such as NLopt can be used.

Further, a first parameter $O_b$ is calculated to compare the reconstructed sensor signal to the original sensor data and indicate goodness of reconstruction. This parameter can be a Frobenius norm, $O_b = \|V - W_b H_b\|_F$. In alternative examples different measures can be used to calculate $O_b$, such as an AIC. The second parameter $S_b$ is simply taken from the final iteration of process block 850, and is a measure of the degree of clustering. These parameters and the other results of the iterative clustering procedure are saved.

At process block 865, the run for the present source number b is complete, and a determination is made whether any more runs are to be performed. As described above, the termination condition can vary between examples. In certain examples, runs are complete when runs for all b in the range from 1 to B have been performed. In alternative examples, runs are complete when runs for a predetermined subset of this range have been performed. In further examples, the termination condition can be determined dynamically, for example based on the first parameter $O_b$ and second parameter $S_b$ of completed runs. If no more runs are to be performed, the N branch is taken and control proceeds to process block 875. Otherwise, the Y branch is taken, and a next value of source number b is determined at process block 870, whence control returns to process block 820 for the next run.

At process blocks 875 and 880, results are compared over source number b to select an answer A for the number of sources. In certain examples, the first parameter $O_b$ can have a generally decreasing trend as b is increased. That is, with an increasing number of sources, it is often possible to more closely match the observed sensor data. In certain examples, the second parameter can have a generally decreasing trend as b is increased. That is, for b=1 there is just one source and one cluster, which is by definition perfectly clustered. Whereas, for large b, clusters will merge into each other and become indistinguishable. In certain examples, a figure of merit is calculated individually for each b, and the number of sources A is chosen as the value of b for which the figure of merit is maximized. For example, the ratio $S_b/O_b$ can be used as a figure of merit. In certain examples, the sequence of $S_b$ is analyzed to determine a knee, and the values of $O_b$ are compared for values of b below the knee, and the number of sources A is chosen as the value of b below the knee for which $O_b$ is minimized. In alternative examples a threshold condition is set for either $O_b$ or $S_b$. For example, a threshold of $S_b$=0.8 can be used, and the number of sources A can be chosen as the value of b for which $S_b$ is greater than its threshold and $O_b$ is minimized. For another example, a threshold of $O_b$=0.2 can be used, and the number of sources A can be chosen as the value of b for which $O_b$ is greater than its threshold and $S_b$ is maximized.

At process block 885, the final answers are determined for the source matrix $H_A$ and the transfer matrix $W_A$. In certain examples, this act can be performed as simply as selecting the corresponding $H_b$, $W_b$ for b=A. In alternative examples, some of the procedures described above at process block 860 can be performed or repeated at this process block. In some examples, one or more of these final answers can be omitted. For example, in certain problems it could be sufficient to determine merely the source signals $H_A$.

At process block 890, the locations of the sources and parameters of the signal diffusion model can be determined. In certain examples, values of these parameters are computed as part of the NMF procedure at process block 825, and can be saved at process block 830. Then, the source locations and/or the model parameters can be retrieved and averaged at process block 860 and selected at process block 890. In alternative examples, these source locations and model parameters can be extracted from the final $H_A$ matrix, in which they are embedded. In certain examples, the source locations are spatial locations. In alternative examples, the source locations are abstract quantities having meaning in the context of the signal model embodied in the problem being studied. Whether spatial or abstract, the locations can have any number of dimensions, including one dimension, two dimensions, or three dimensions. In certain examples, process block 890 can be omitted.

XI. Example Results—Shift-NMFk

Synthetic datasets were constructed by generating, in a semi-random manner, various observation matrices V. In the following examples, two, three, or four basic waveforms were used for original signals H, and were mixed and shifted by randomly generated the mixing matrix W and the delay matrix τ, in order to obtain mixed signals for varying numbers of sensors. Thus, for each combination of the original sources H, the mixing matrix W, and the delay matrix τ, a different observation matrix V was obtained. The operation of the Shift-NMFk was validated by comparing outputs of the Shift-NMFk with the corresponding inputs for a large number of verification sets, some of which are presented below.

It is desirable to estimate the optimal number of iterations j required in each Shift-NMF trial to efficiently obtain a reasonable reconstruction error. After a certain number jmax of iterations, further iterations were not found to lead to any improvement of the final results. In some examples, the Shift-NMF procedure terminated because of its internal convergence criteria, before reaching the jmax iterations. In some examples, jmax=50,000 is suitable, while in other examples, jmax can range from 30,000 to 100,000, from 1,000 to 10,000,000, or even from 30 to 1,000,000,000.

The Shift-NMFk procedure, combining Shift-NMF trials with an NMFk type of procedure to determine the number of sources and three selection criteria to improve robustness of the results, was found to successfully recover the number of sources and other parameters in several synthetic examples constructed as described above.

Example 1: Three Original Sources and 18 Sensors

Three pre-determined waveforms were mixed and delayed randomly to produce a test case with 18 observation sensors. Selection criteria were applied. FIGS. 9A-9D are a collection of graphs and plots showing results and comparisons generated for this synthetic example problem.

Figure 9A:
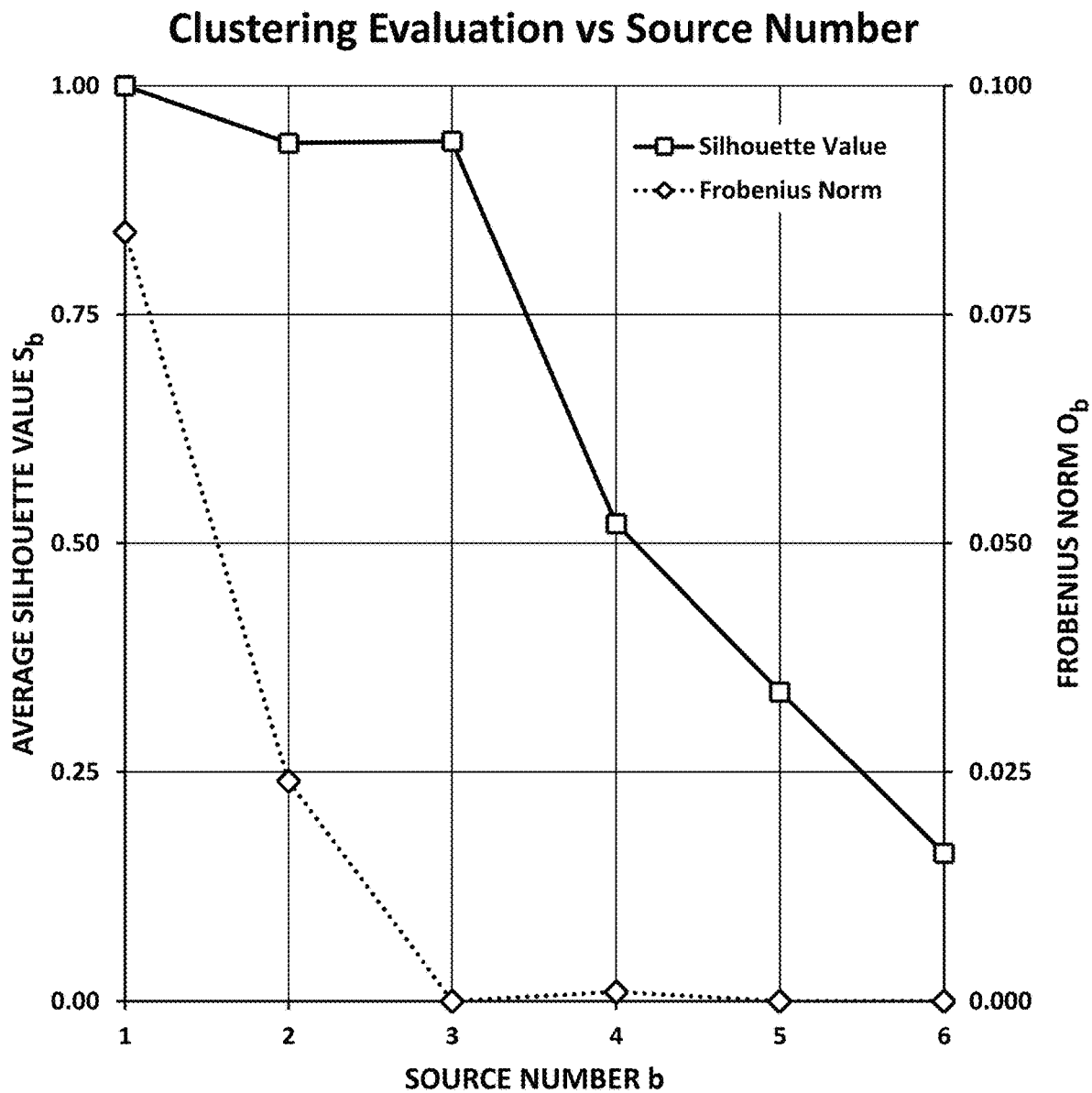
FIGS. 9A-9D are a collection of graphs and plots showing results and comparisons generated for a synthetic example problem having 3 sources, 18 sensors, and a signal shift model according to an example of the disclosed technology.

FIG. 9A shows the clustering evaluation parameters as a function of source number b. The left-hand axis and the open squares indicate the silhouette value $S_b$, while the right-hand axis and the open diamonds show the Frobenius norm $O_b$. It is apparent that the degree of cluster separation is high for b≤3, while the goodness of reconstruction is significantly better at b=3 than at either b=1 or b=2. Consequently, the clustering results are best for b=3, and this is the answer determined by the Shift-NMFk procedure.

Figure 9B:
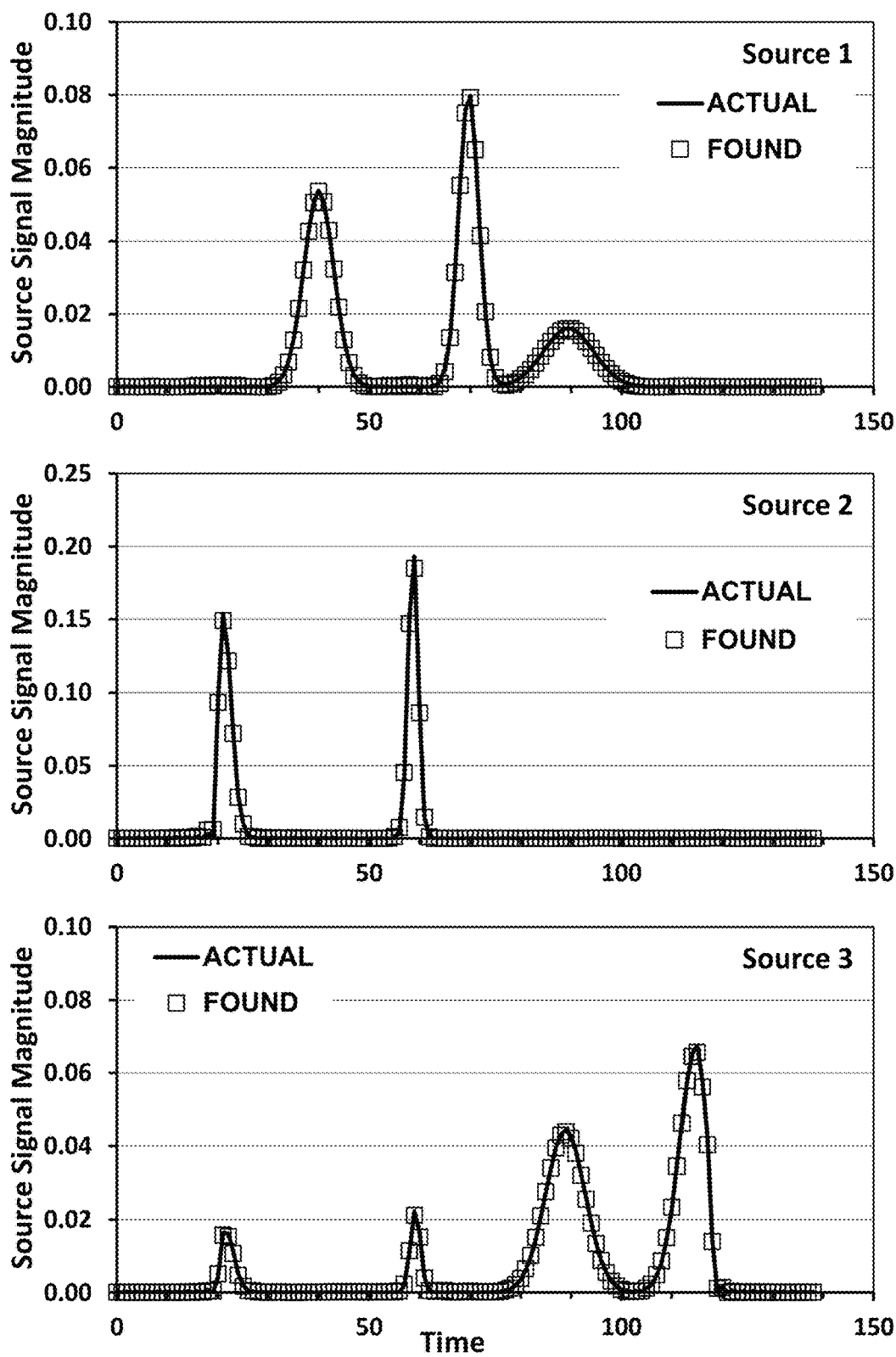
Figure 9C:
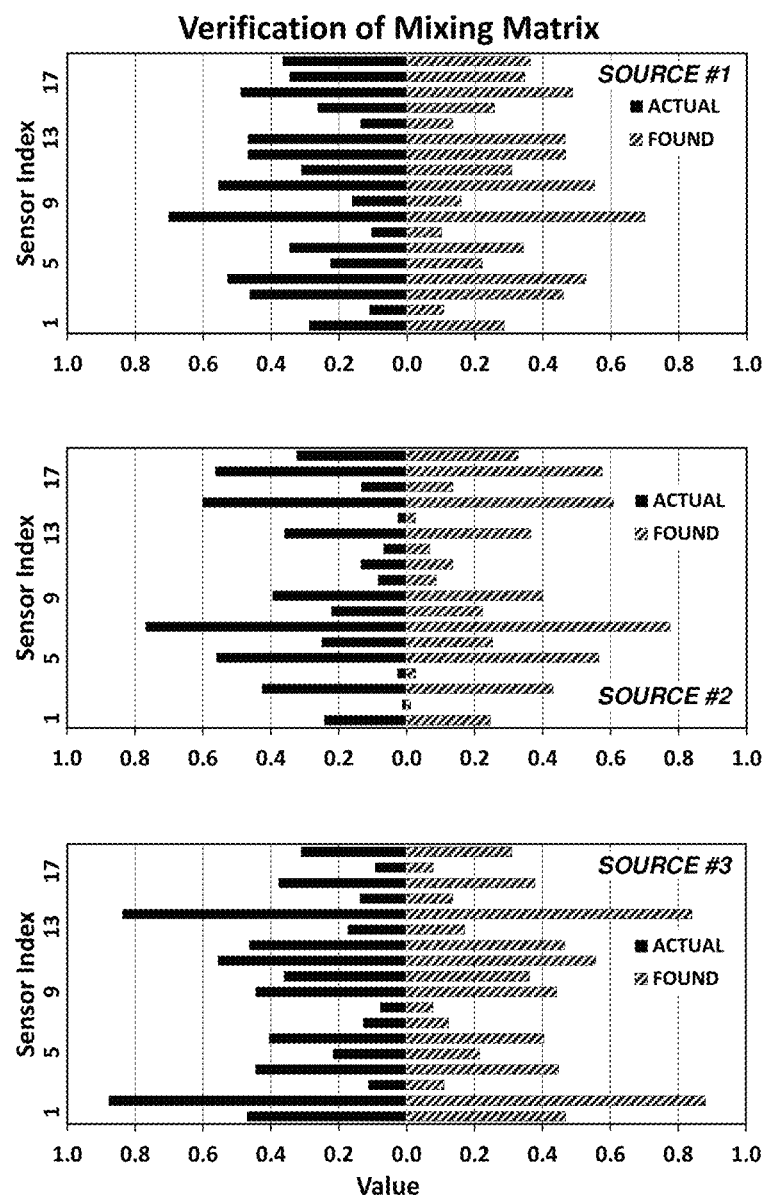
Figure 9D:
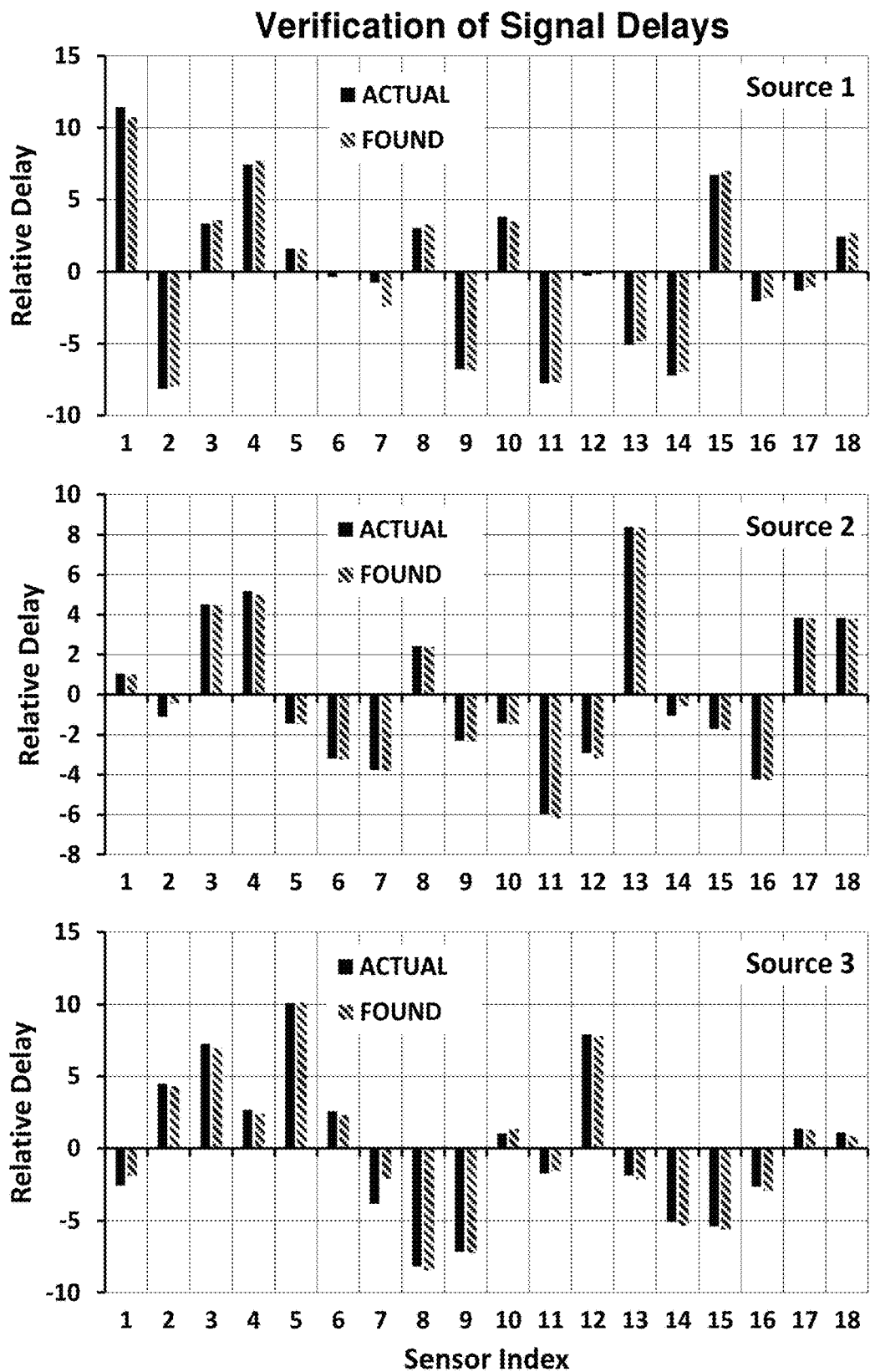

FIG. 9B shows the comparison between the computed source signals $H_3$ (open squares) and the input source signals (solid line). FIG. 9C shows the comparison between the computed mixing matrices (right-hand side) and the input mixing matrices (left-hand side). FIG. 9D shows the comparison between the computed delays from each source to all sensors (hatched bars) and the input delays (solid bars). The correspondence between the results of the Shift-NMFk procedure and the input data demonstrates the quality and confirms the robustness of the Shift-NMFk procedure.

Example 2: Four Original Sources and 24 Sensors

In this example, Shift-NMF trials were combined with an NMFk type of procedure to determine the number of sources, but no selection criteria were applied.

Figure 10A:
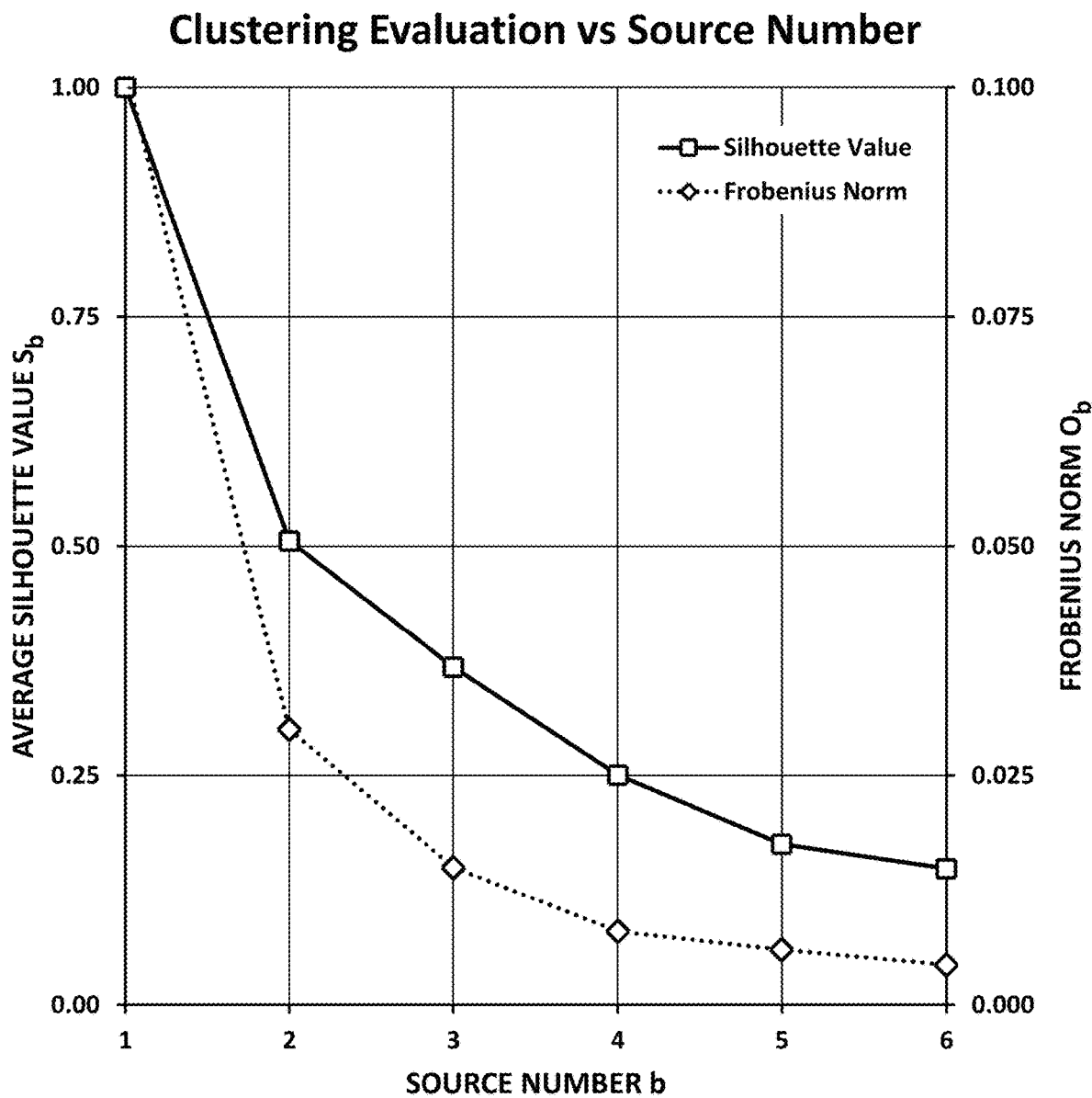
FIGS. 10A-10D are a collection of graphs and plots showing results and comparisons generated for a synthetic example problem having 4 sources, 24 sensors, and a signal shift model, for a procedure that omits selection constraints according to an example of the disclosed technology.

FIG. 10A shows the clustering evaluation parameters as a function of source number b. The open squares show the silhouette value $S_b$, while the open diamonds show the Frobenius norm $O_b$. The silhouette value drops sharply for b>1, demonstrating the absence of well-delineated clusters and suggesting the presence of many unsuccessful trials scattered throughout the space of candidate source solutions. The graph of the norm does show a minimum for b=4, however the norm for b=4 is only slightly lower than the norm for b=3, suggesting that the four sources (for b=4) are not being as accurately determined as in some other examples.

Figure 10B:
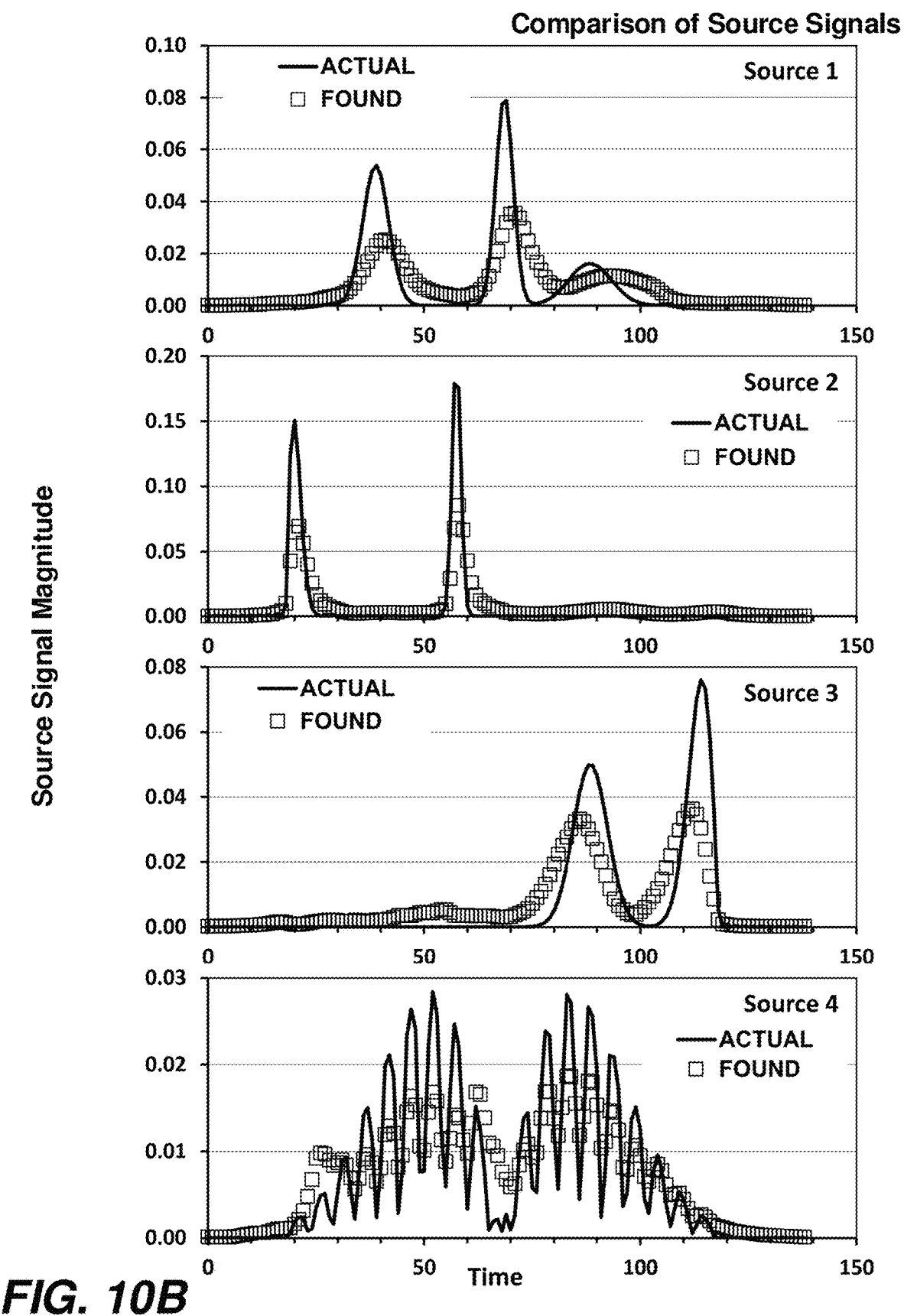
Figure 10C:
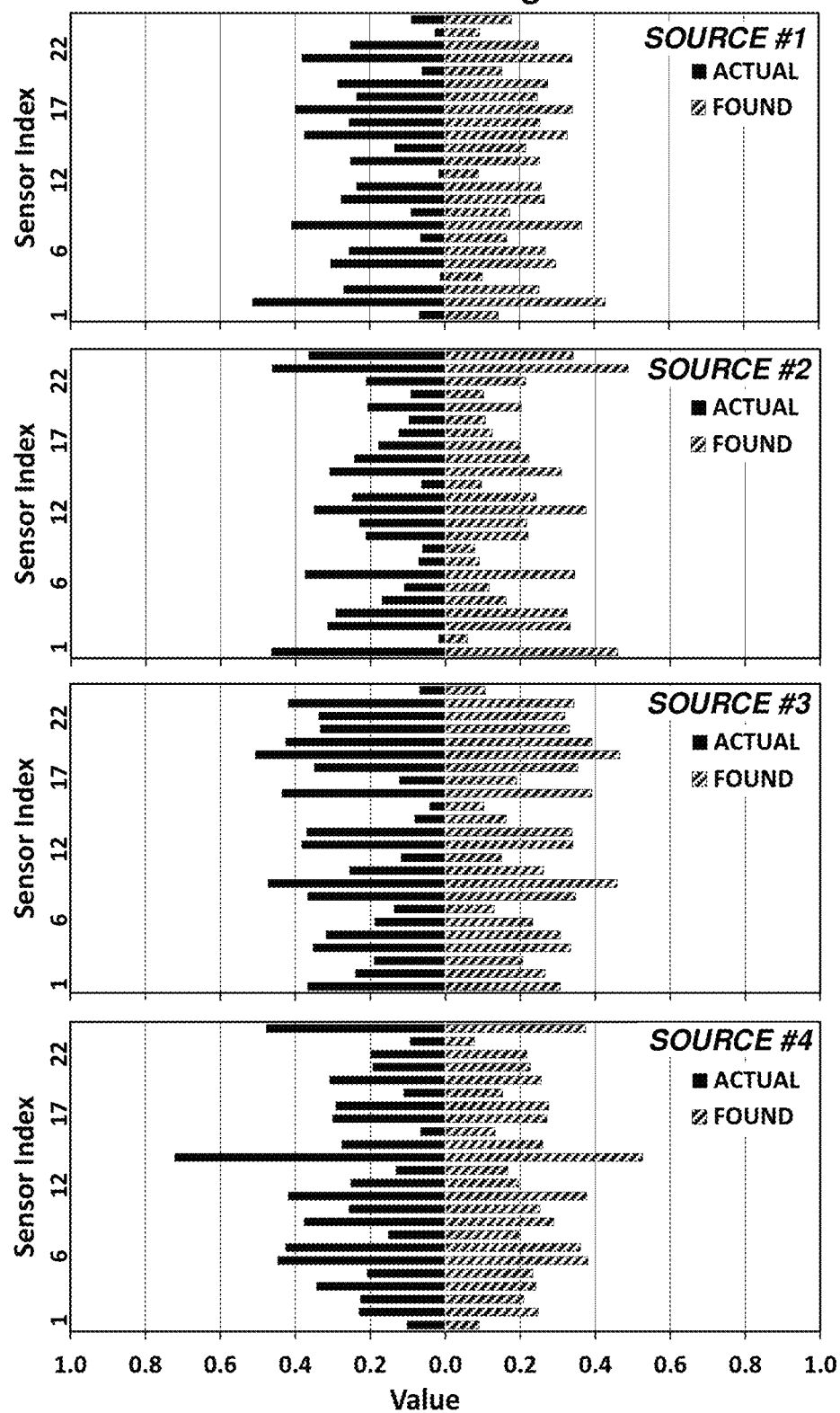
Figure 10D:
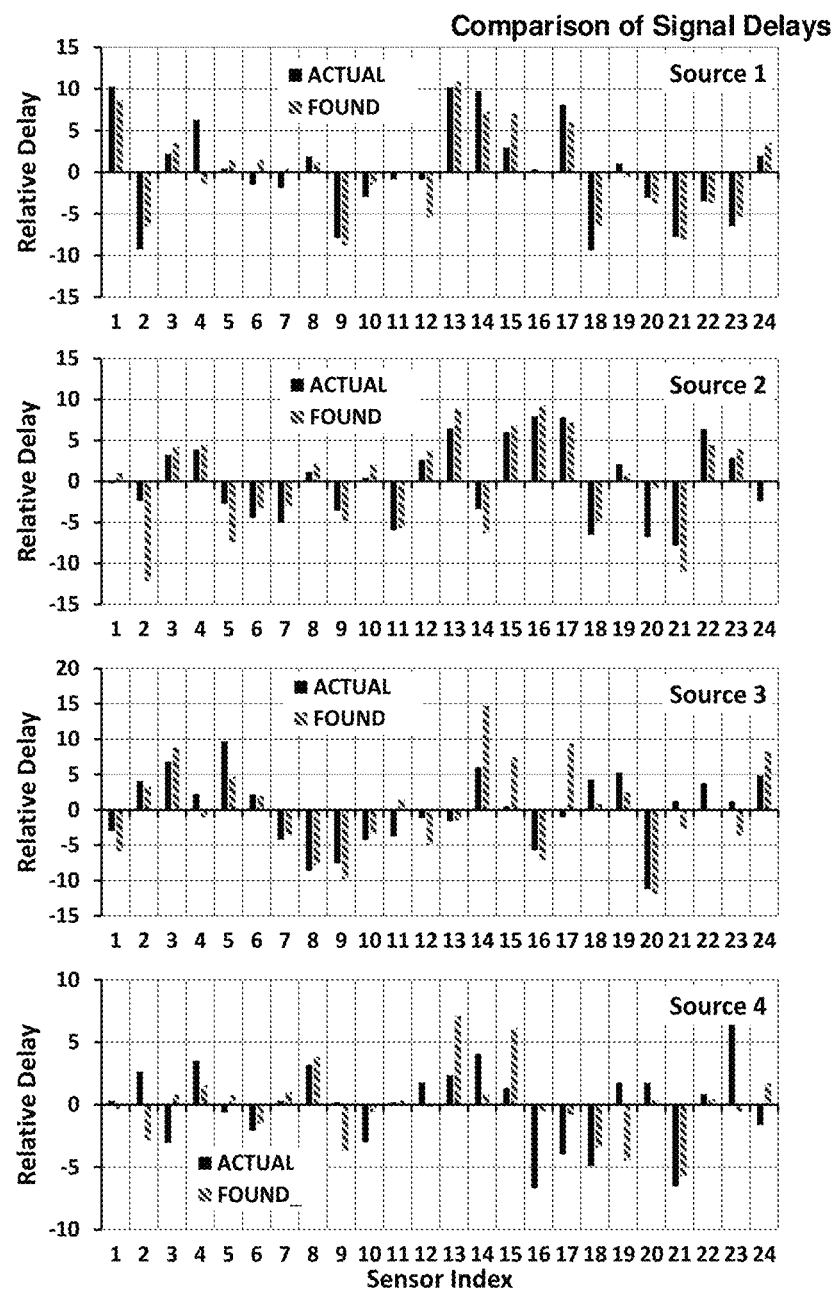

FIG. 10B shows the comparison between the computed source signals $H_4$ (open squares) and the input source signals (solid line). FIG. 10C shows the comparison between the computed mixing matrices (right-hand side) and the input mixing matrices (left-hand side). FIG. 10D shows the comparison between the computed delays from each source to all sensors (hatched bars) and the input delays (solid bars). Similarities and deviations between the computed quantities and the corresponding input quantities are noticeable in these figures.

Example 3: Four Original Sources and 24 Sensors

This example is similar to Example 2, however selection criteria were applied. Four pre-determined waveforms were mixed and delayed randomly to produce a test case with 24 observation sensors. FIGS. 11A-11D are a collection of graphs and plots showing results and comparisons generated for this synthetic example problem.

Figure 11A:
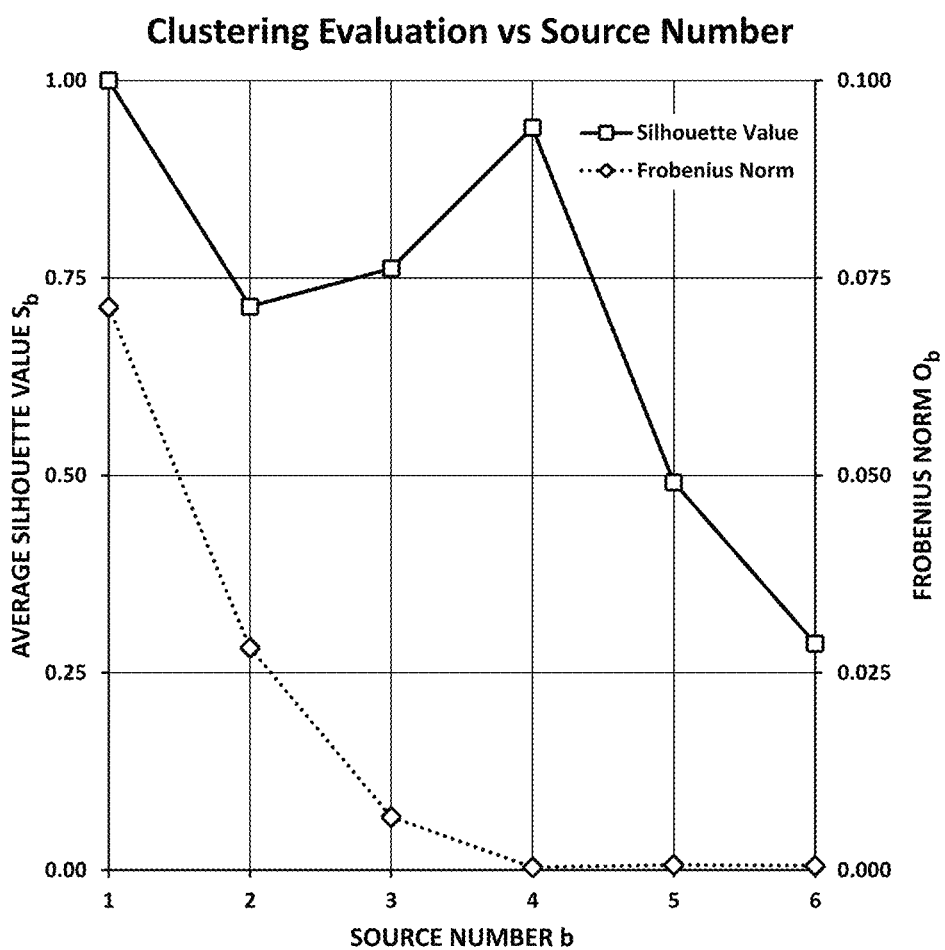
FIGS. 11A-11D are a collection of graphs and plots showing results and comparisons generated for a synthetic example problem having 4 sources, 24 sensors, and a signal shift model, for a procedure that includes selection constraints according to an example of the disclosed technology.

FIG. 11A shows the clustering evaluation parameters as a function of source number b. The left-hand axis and the open squares show the silhouette value $S_b$, while the right-hand axis and the open diamonds show the Frobenius norm $O_b$. The degree of cluster separation is high for b=4, and the goodness of reconstruction is significantly better at b=4 than at other values. Consequently, the clustering results are best for b=4, and this is the answer determined by the Shift-NMFk procedure.

Figure 11B:
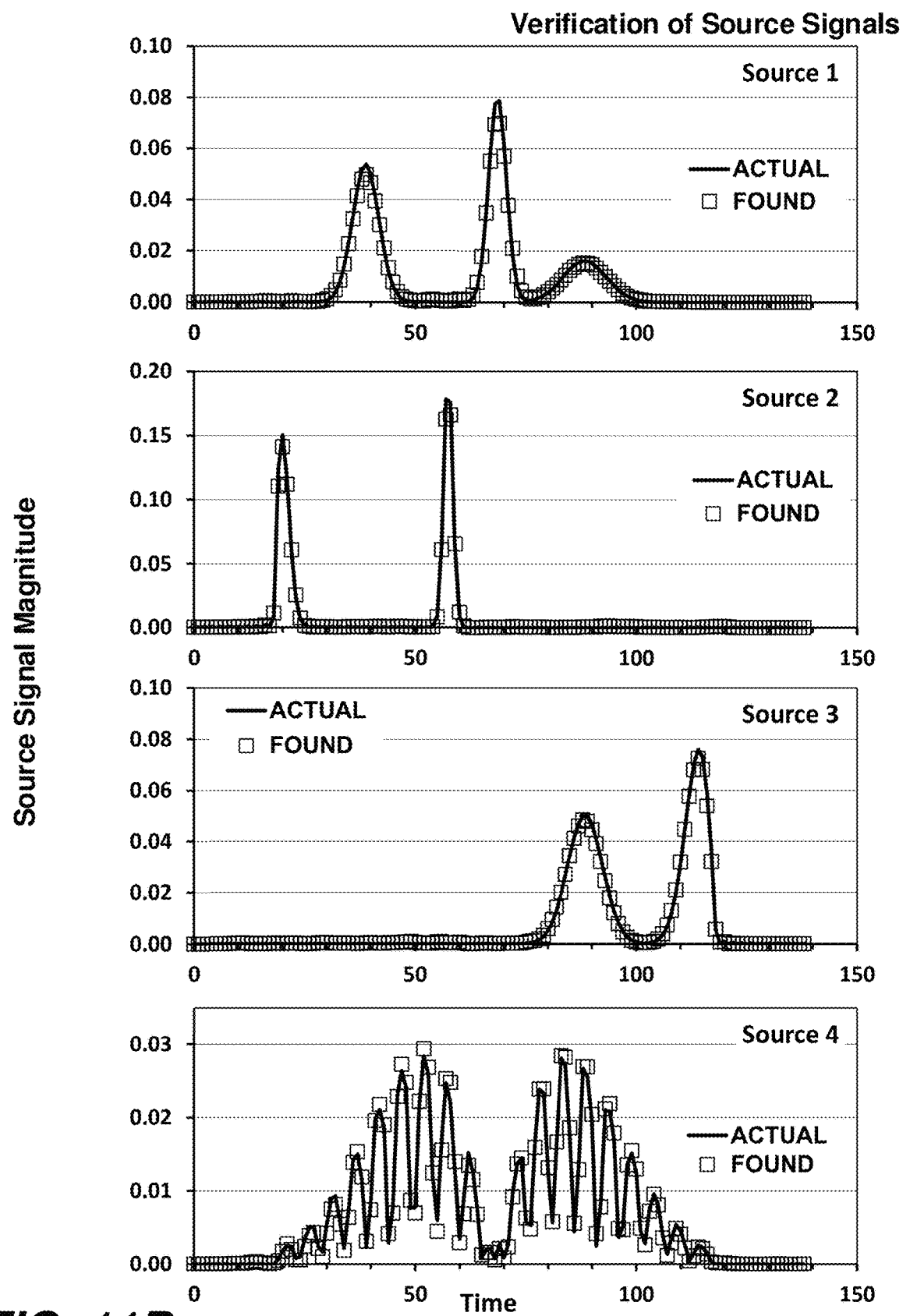
Figure 11C:
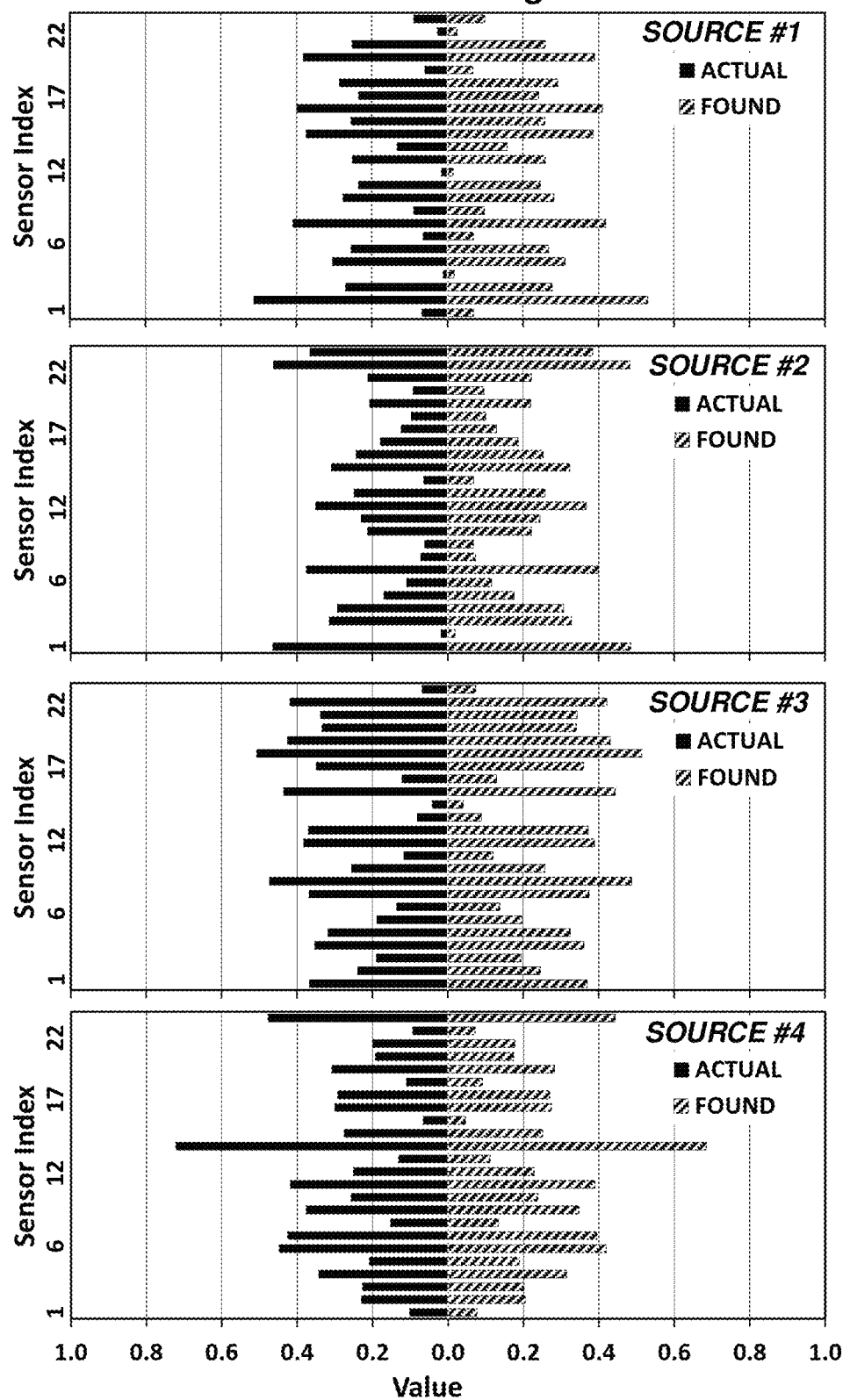
Figure 11D:
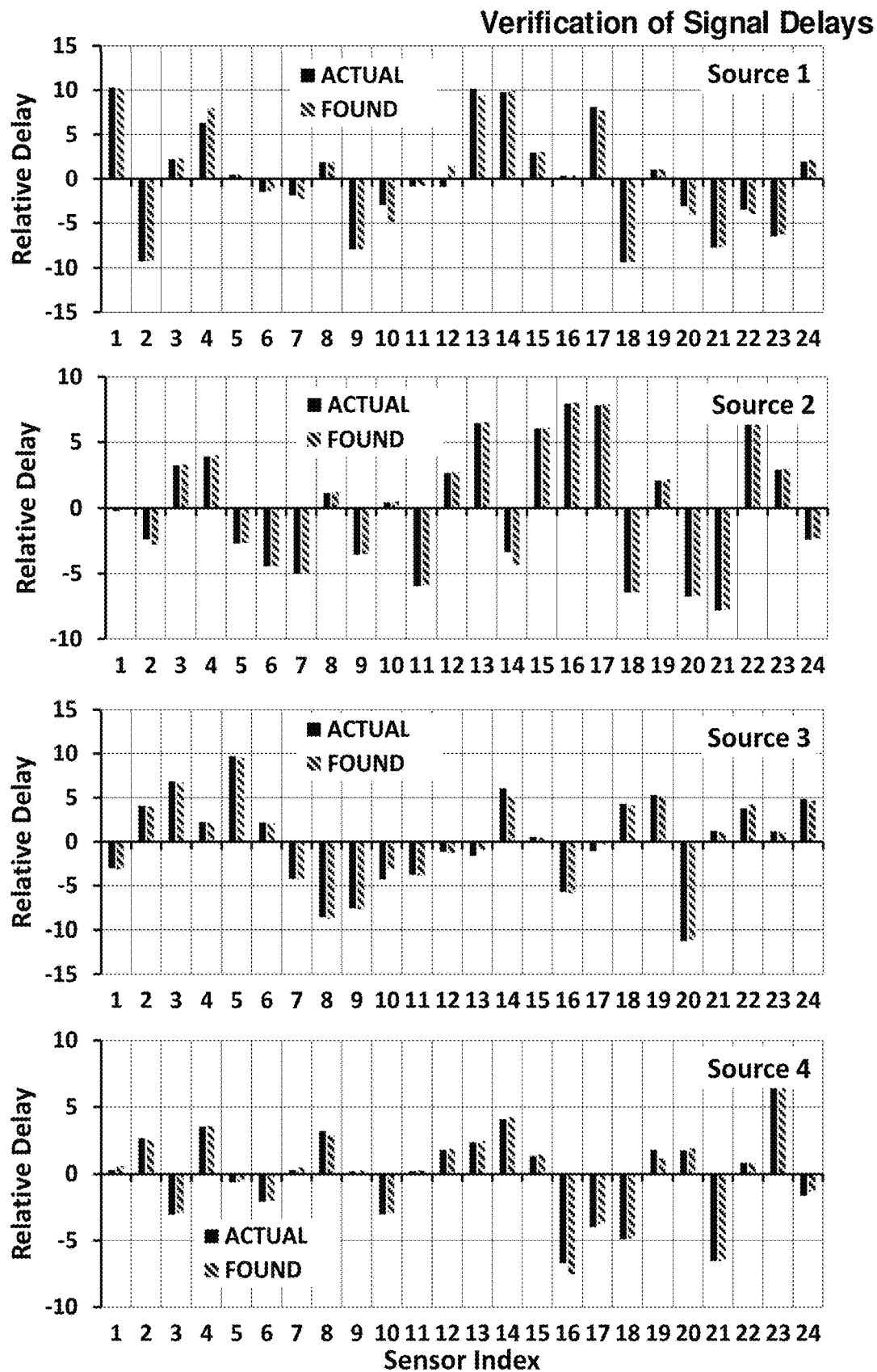

FIG. 11B shows the comparison between the computed source signals $H_4$ (open squares) and the input source signals (solid line). FIG. 11C shows the comparison between the computed mixing matrices (right-hand side) and the input mixing matrices (left-hand side). FIG. 11D shows the comparison between the computed delays from each source to all sensors (hatched bars) and the input delays (solid bars). The correspondence between the results of the Shift-NMFk procedure and the input data demonstrates the quality and confirms the robustness of the Shift-NMFk procedure (incorporating selection criteria).

Example 4: Three Sources and Nine Sensors

Figure 12A:
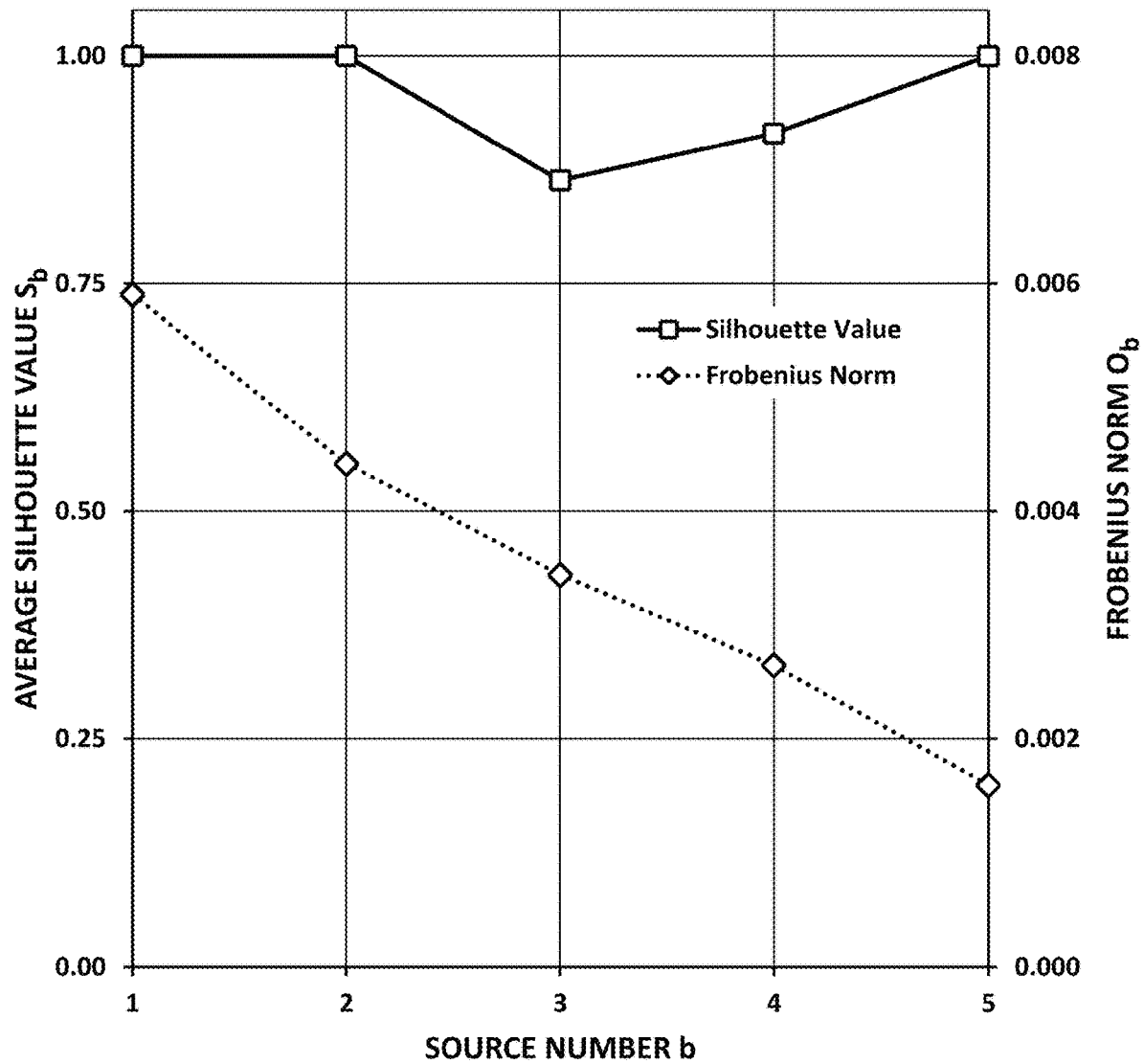
FIGS. 12A-12B are graphs showing results and comparisons generated for a synthetic example problem having 3 sources and 16 sensors, for a procedure that omits signal shifts according to an example of the disclosed technology.
Figure 12B:
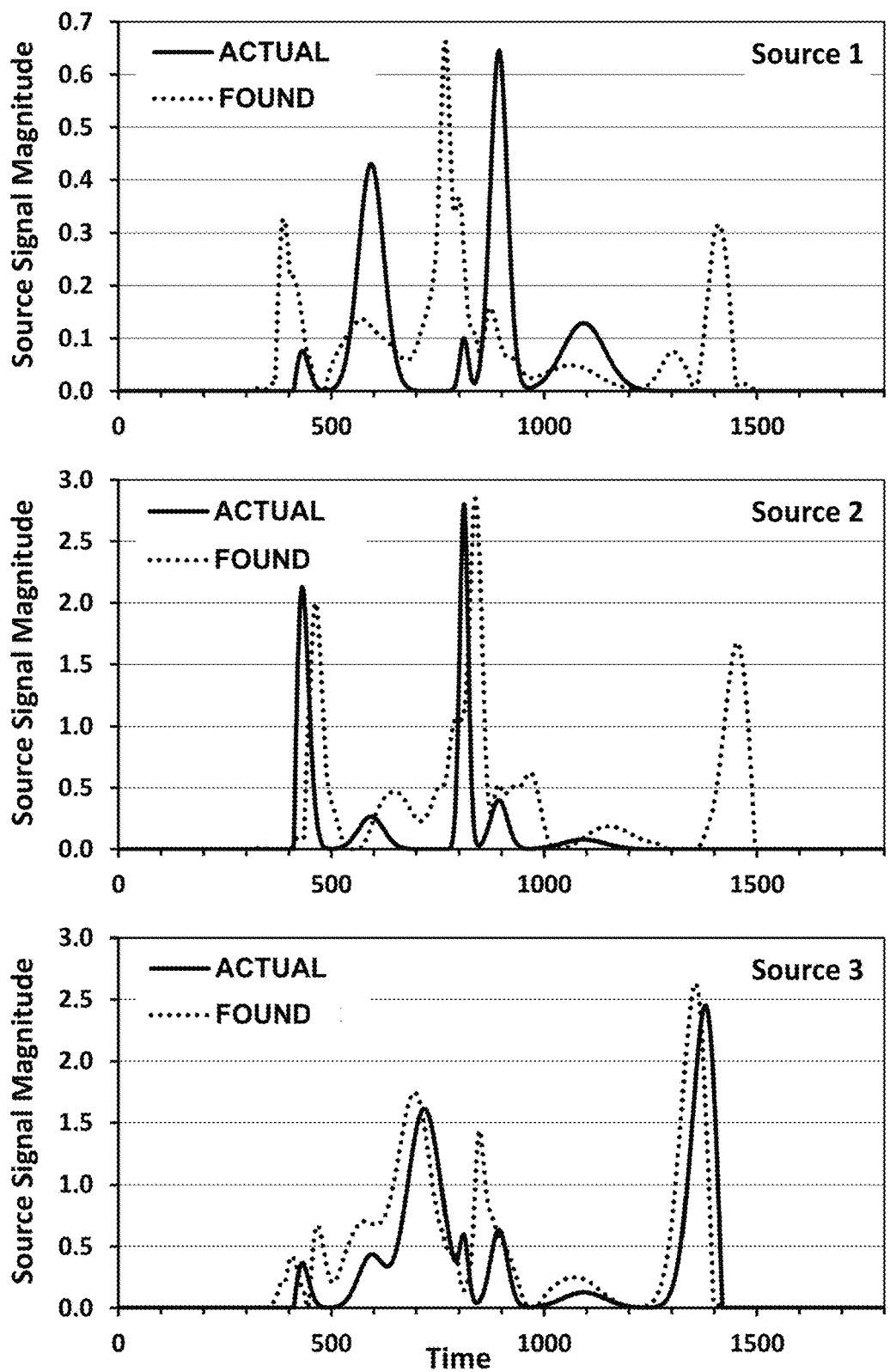

This example is similar to Example 1, however no delay was incorporated into the model. Three pre-determined waveforms were mixed to produce a test case with nine observation sensors. Selection criteria were applied. FIGS. 12A-12B are a collection of graphs and plots showing results and comparisons generated for this synthetic example problem.

FIG. 12A shows the clustering evaluation parameters as a function of source number b. The open squares show the silhouette value $S_b$, while the open diamonds show the Frobenius norm $O_b$. The silhouette value is high for b=5, and the norm is lower than for other values of b. Thus, the procedure applied returns an answer of 5 for the number of sources. FIG. 12B shows the comparison between the computed source signals $H_3$ (open squares) and the input source signals (solid line). The substantial inaccuracies of these results demonstrates the importance of incorporating delays into a model for blind source separation. In some examples, even a delay as little as 1% of the measured duration of signals has been found to require that delays be accounted for in an NMF-based procedure.

Examples 5 and 6: Three Sources and 16 Sensors

In these examples, three pre-determined waveforms were mixed and delayed to produce test cases with 16 observation sensors arranged in a 4×4 grid. In example 5, the sources were randomly located inside the perimeter of the grid, while in example 6, the sources were randomly positioned outside the grid. The sources were configured to have weak correlation. The mixing weight matrix W and delay matrix τ were calculated based on the geometry of sources and sensors, with a propagation speed of 1 and an inverse-power attenuation following $r^{-0.5}$ as a function of separation distance r. In other examples, other attenuation rates can be used, such as $1/r$ and $r^{-2}$.

The Shift-NMFk procedure was applied in both examples, including both delays and selection criteria. FIGS. 13A-13D and FIGS. 14A-14D are a collection of graphs and plots showing results and comparisons generated for examples 5 and 6 respectively.

Figure 13A:
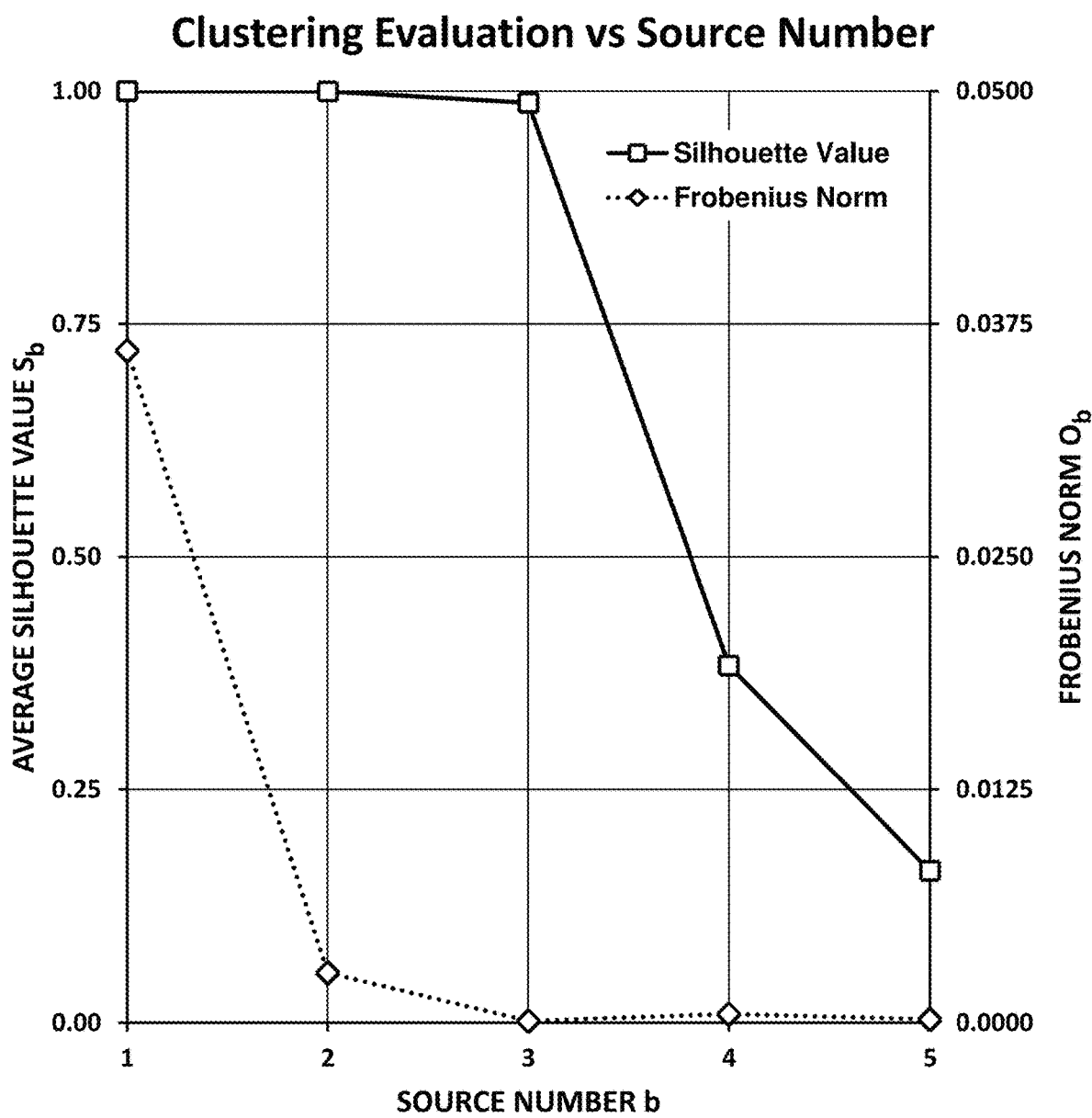
FIGS. 13A-13D are a collection of graphs and plots showing results and comparisons generated for a synthetic example problem having a grid of 16 sensors, 3 sources inside the grid, and a signal shift model according to an example of the disclosed technology.
Figure 14A:
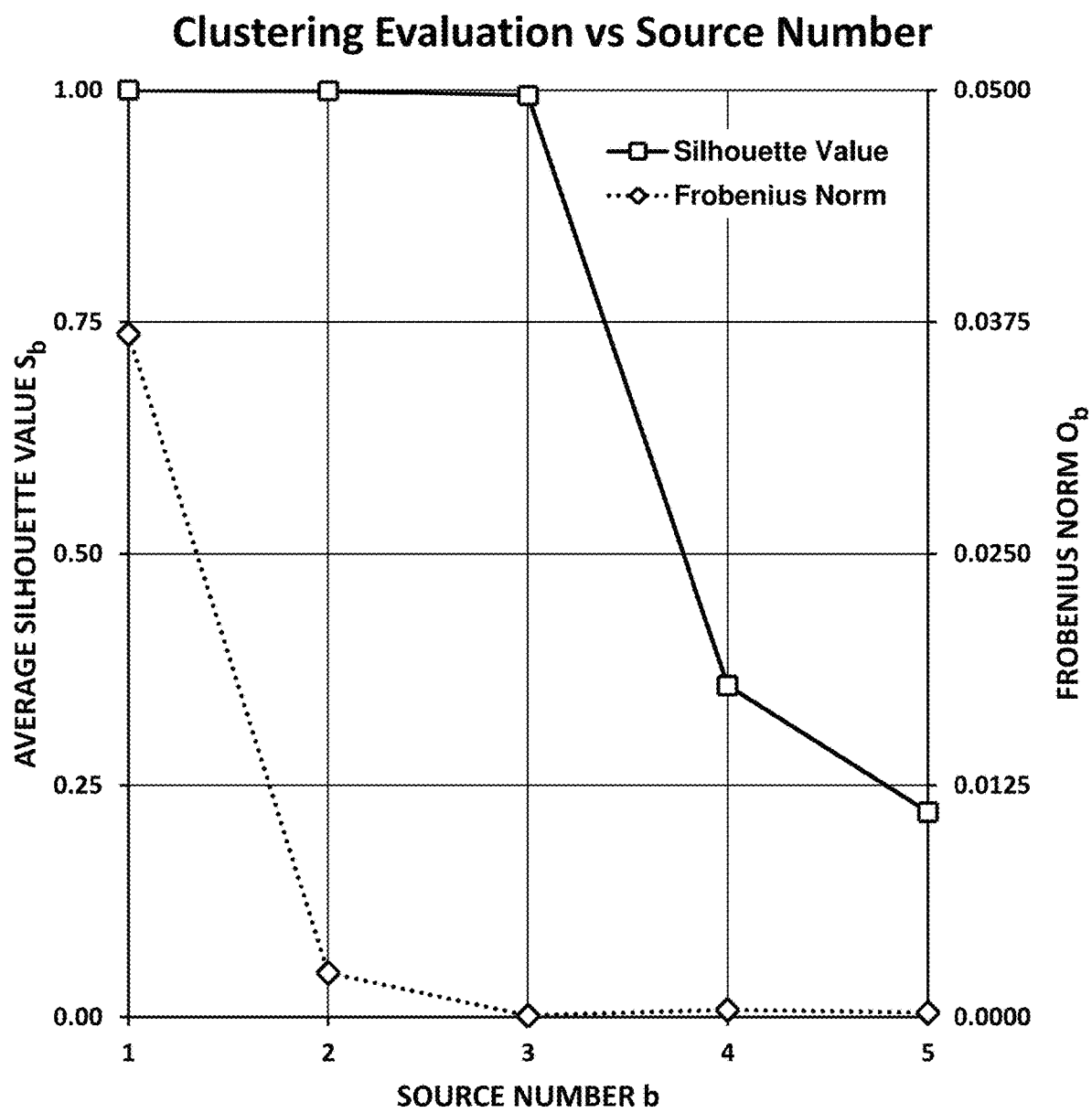
FIGS. 14A-14D are a collection of graphs and plots showing results and comparisons generated for a synthetic example problem having a grid of 16 sensors, 3 sources outside the grid, and a signal shift model according to an example of the disclosed technology.

FIGS. 13A and 14A show the clustering evaluation parameters as a function of source number b. In each graph, the left-hand axis and the open squares show the silhouette value $S_b$, while the right-hand axis and the open diamonds show the Frobenius norm $O_b$. The degree of cluster separation is high for b≤3, falling off sharply thereafter, and the goodness of reconstruction is better for b=3 than for other values. Consequently, the Shift-NMFk procedure returns an answer of 3 for number of clusters.

Figure 13B:
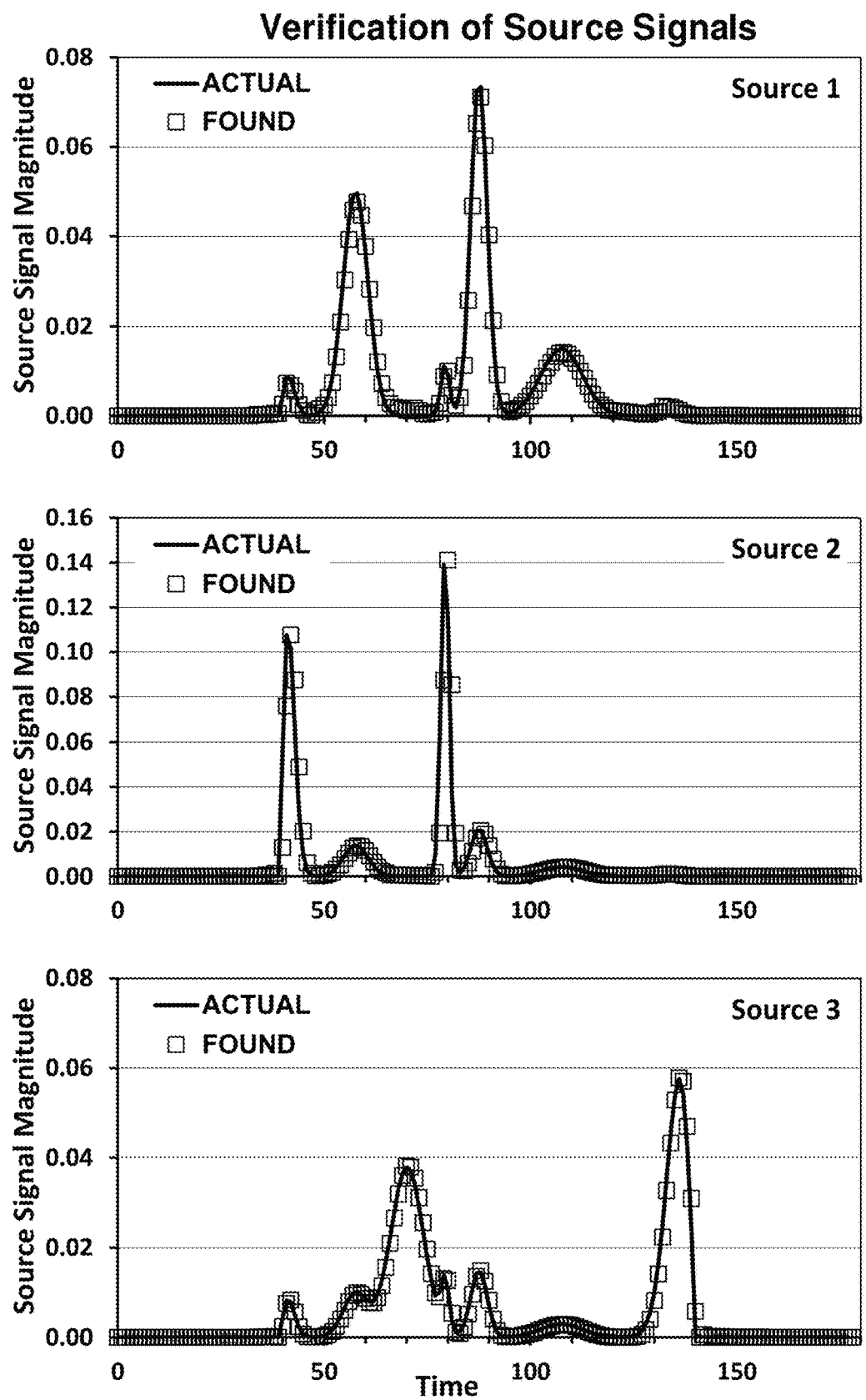
Figure 13C:
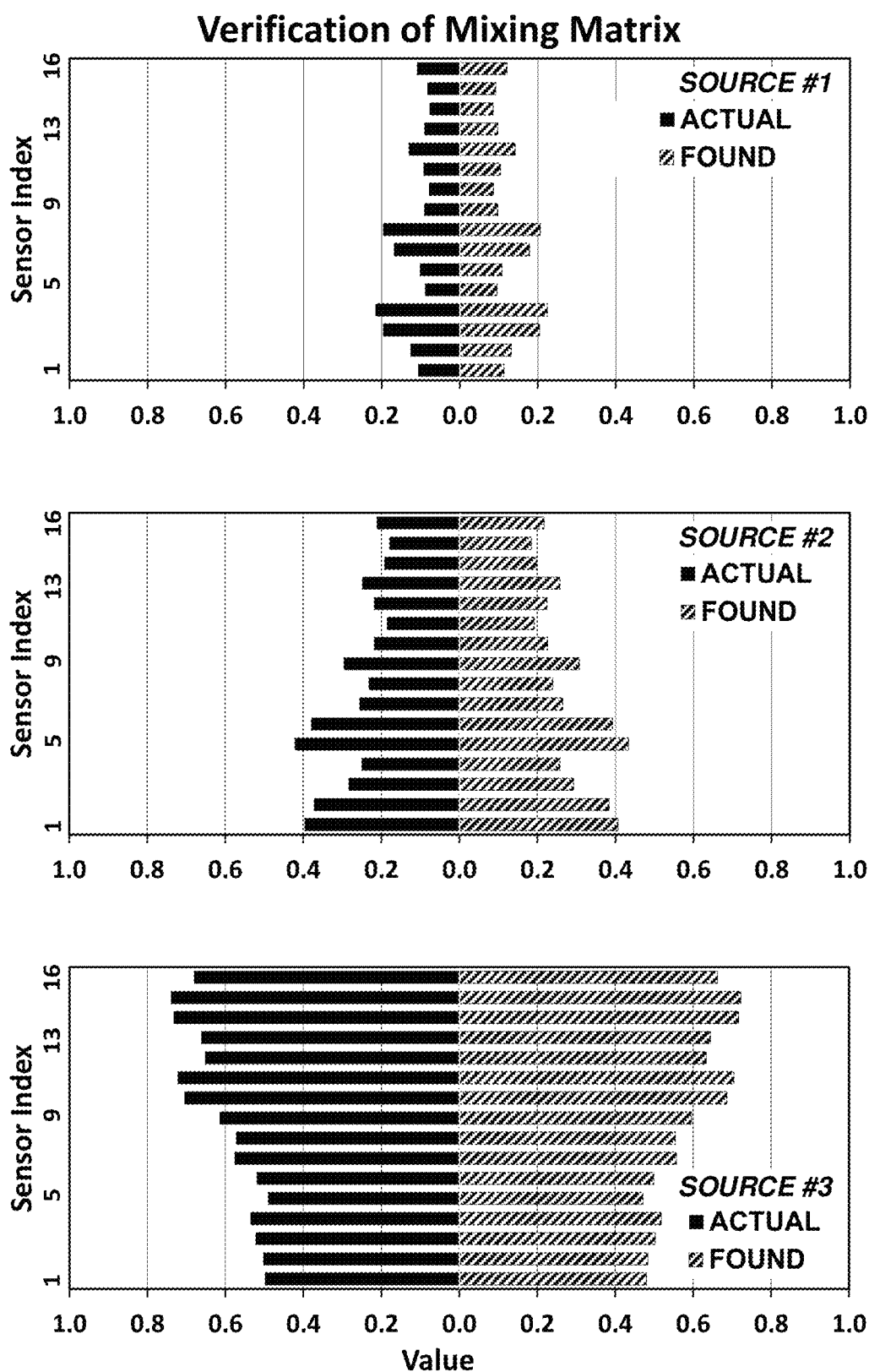
Figure 13D:
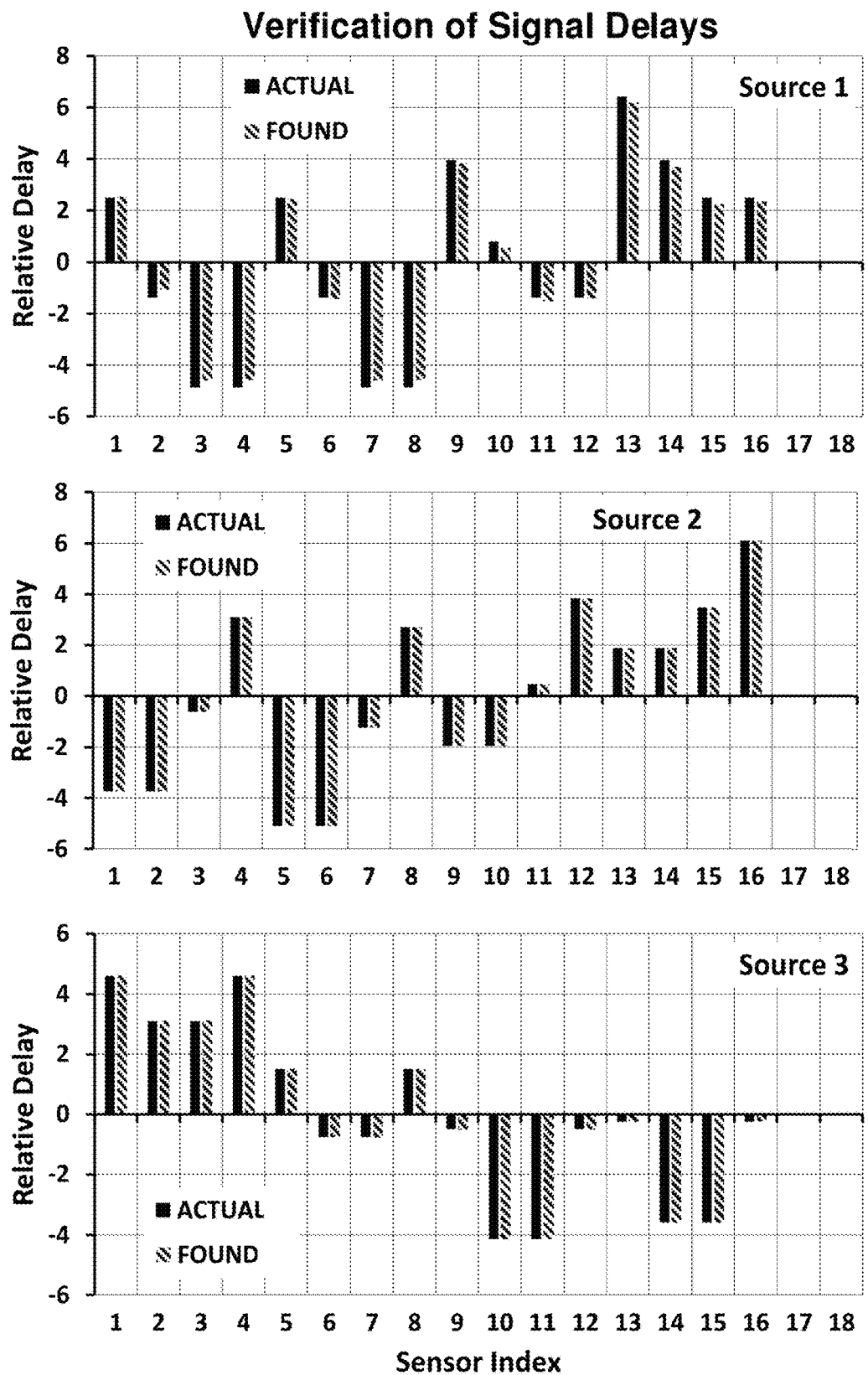
Figure 14B:
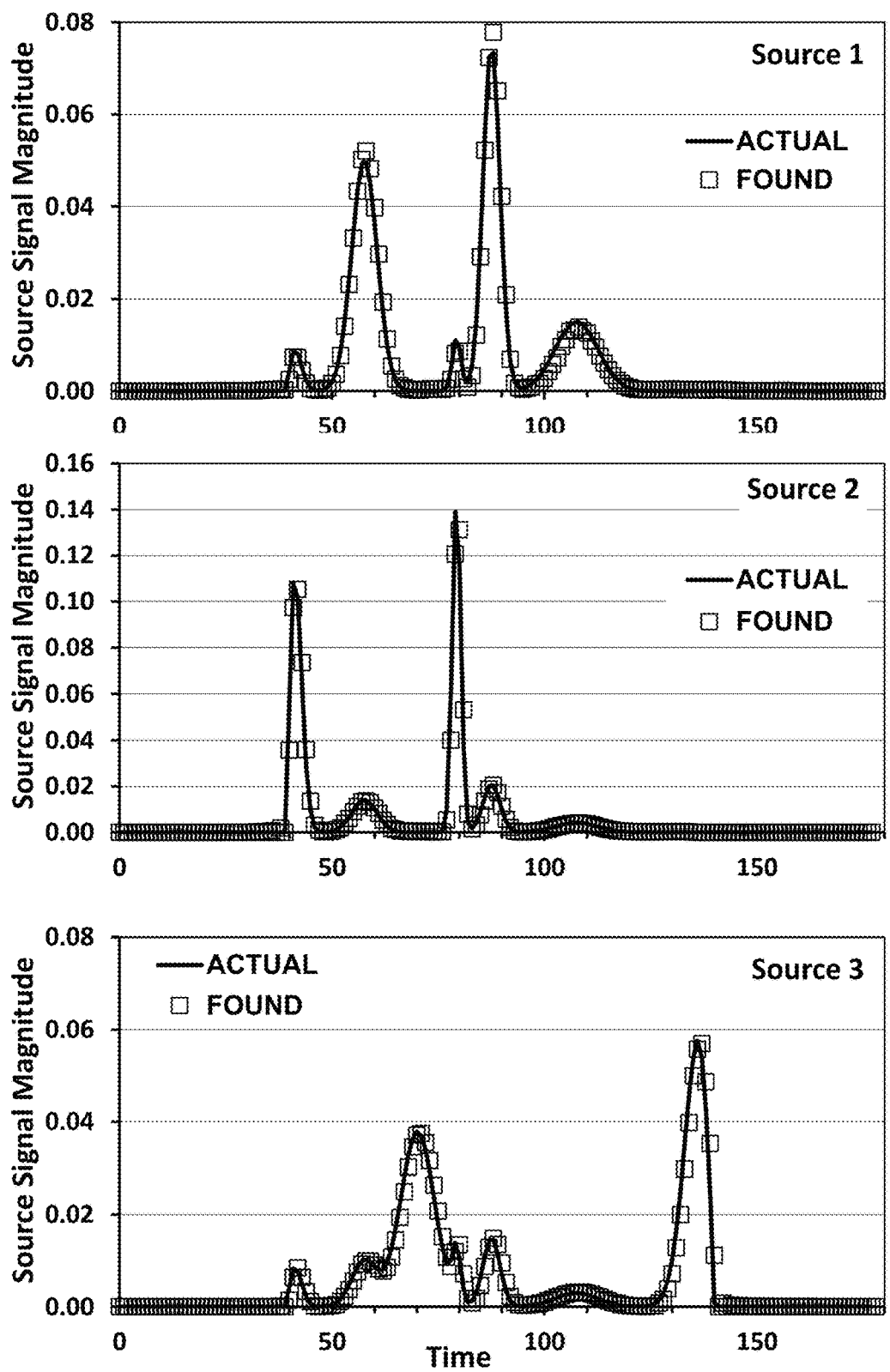
Figure 14C:
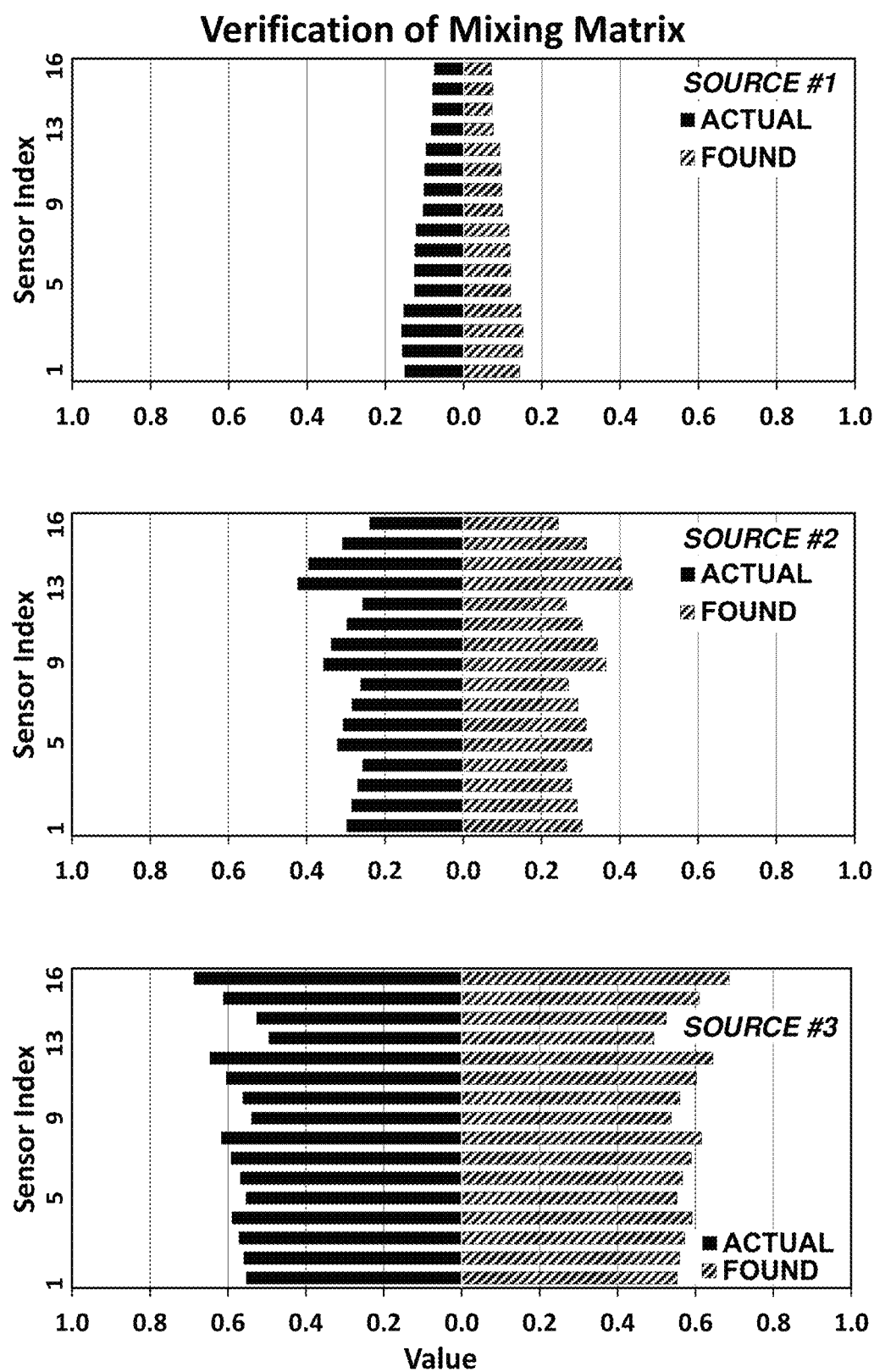
Figure 14D:
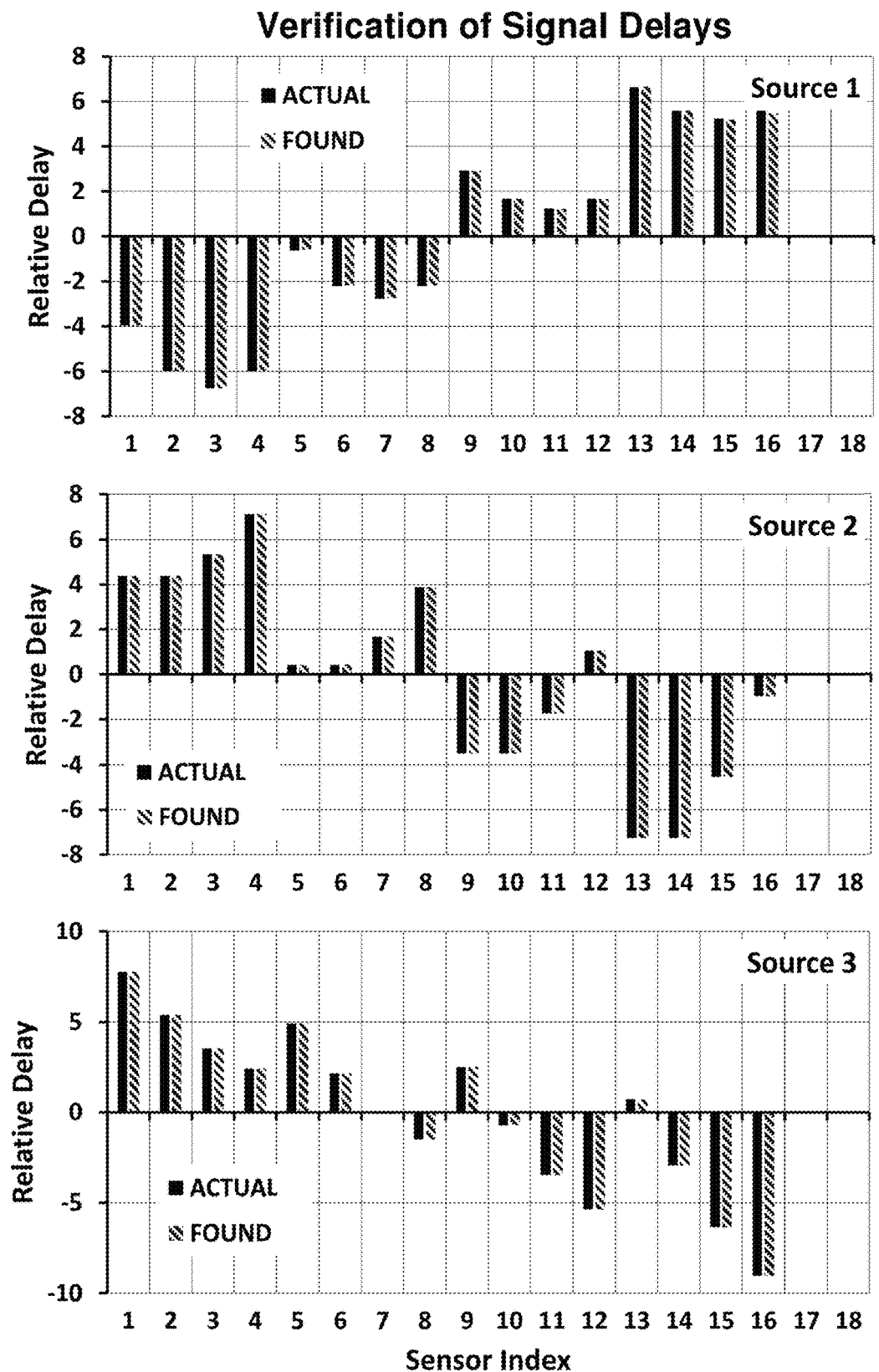

FIGS. 13B and 14B show comparisons between the computed source signals $H_3$ (open squares) and the input source signals (solid lines). The input source signals were configured to have weak correlation, which may be seen in these figures. FIGS. 13C and 14C show comparisons between the computed mixing matrices (right-hand side) and the input mixing matrices (left-hand side). FIGS. 13D and 14D show comparisons between computed delays from each source to all sensors (hatched bars) and the input delays (solid bars). The correspondence between the results of the Shift-NMFk procedure and the input data demonstrates the quality and confirms the robustness of the Shift-NMFk procedure.

In these examples, the source locations were also determined. Table 2 provides the summary of Shift-NMFk results for both synthetic examples, with their standard deviation obtained by Bayesian Analysis. The two-left hand columns identify the corresponding Example and source location relative to the sensor grid. The next two columns compare the actual X source coordinates for the synthetic example and the corresponding X coordinates computed by the NMF procedure with Bayesian analysis. The two right-most columns similarly compare the actual Y source coordinates for the synthetic example and the corresponding Y coordinates computed by the NMF procedure with Bayesian analysis. Very good position reconstruction can be noted.

TABLE 2

| Ex. | Source Position | $X_{ACTUAL}$ | $X_{NMF} \pm 2\sigma_x$ | $Y_{ACTUAL}$ | $Y_{NMF} \pm 2\sigma_y$ |
|---|---|---|---|---|---|
| 5 | Inside | 3.0 | 3.11 ± 0.07 | 7.0 | 6.95 ± 0.09 |
|   |   | 3.5 | 3.50 ± 2.1e−6 | 3.0 | 2.99 ± 2.9e−6 |
|   |   | 6.8 | 6.80 ± 1.6e−4 | 5.0 | 5.00 ± 5.5e−4 |
| 6 | Outside | −3.0 | 2.98 ± 0.021 | 6.0 | 5.99 ± 2.0e−3 |
|   |   | 10.0 | 10.01 ± 4.0e−5 | 3.0 | 2.99 ± 6.0e−6 |
|   |   | 10.8 | 10.82 ± 3.0e−4 | 9.6 | 9.62 ± 2.4e−4 |

Figure 15A:
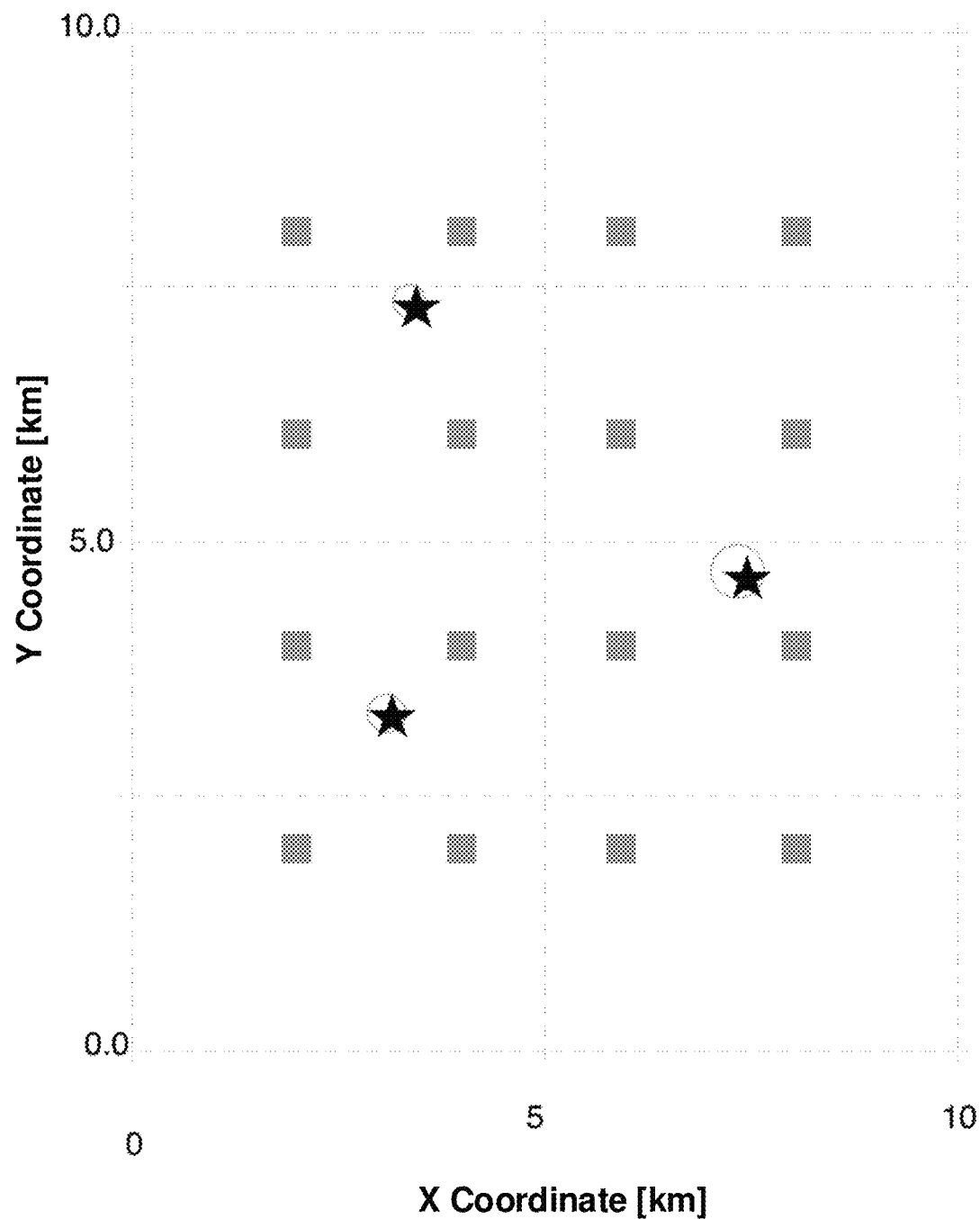
FIGS. 15A-15B are diagrams illustrating identified sensor locations for the examples of FIGS. 13A-13D and FIGS. 14A-14D respectively.
Figure 15B:
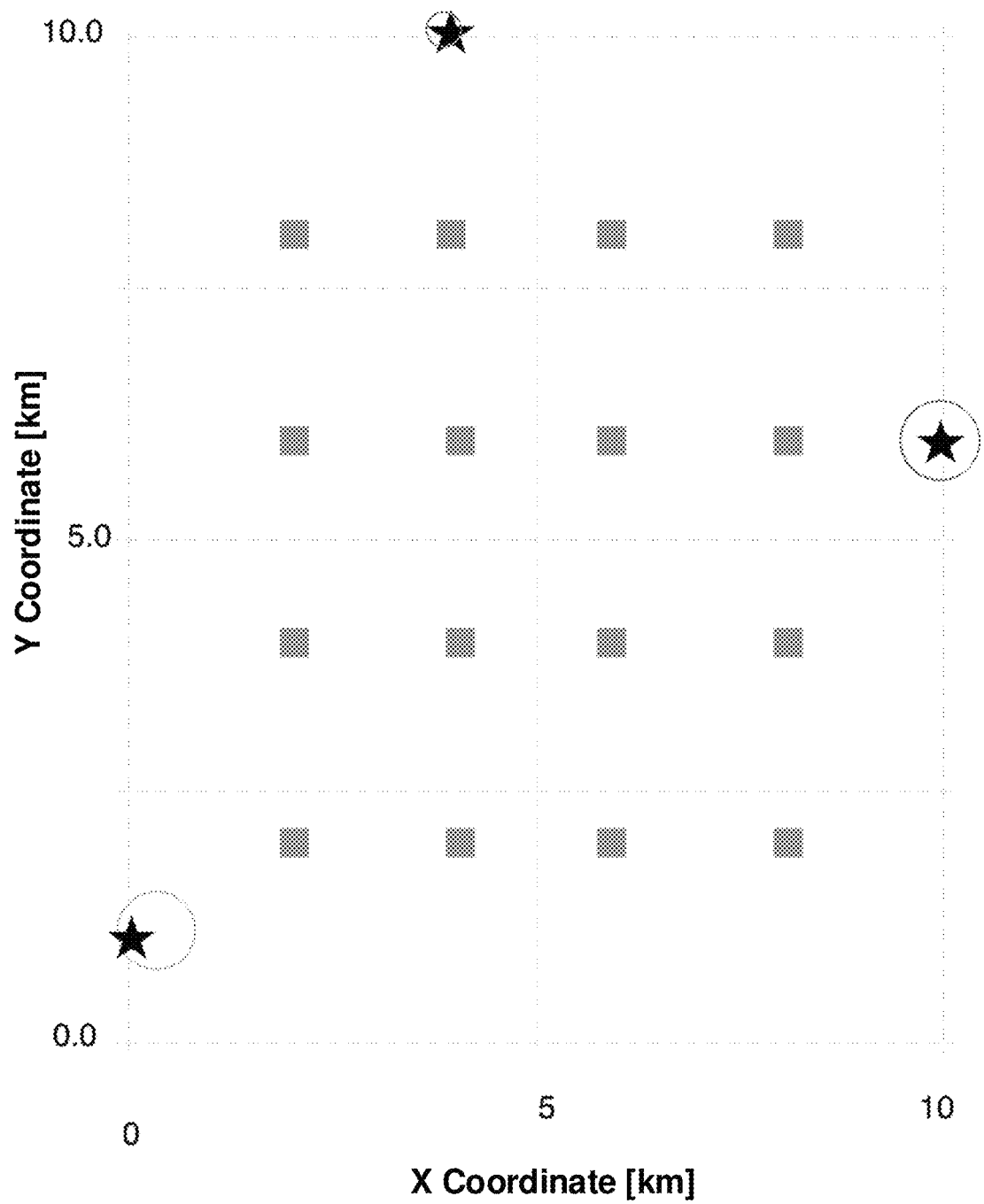

FIGS. 15A and 15B show comparisons between the computed source locations (region of likelihood shown by open circles) and the actual source locations (shown by stars) for examples 5 and 6 respectively. For reference, these plots also show the grid of sensor locations (gray squares).

Example Application of AIC to Determine Number of Sources

Table 3 shows the Akaike Information Criterion (AIC) values for Examples 1, 3, 5, and 6 above, for different values of source number b. The two left columns identify the Example and provide the actual source/sensor configuration, while the remaining columns provide the AIC for different source numbers b as indicated in the top row.

TABLE 3

| Ex. Source No. b Actual | 1 | 2 | 3 | 4 | 5 | 6 |
|---|---|---|---|---|---|---|
|  |  |  |  | AIC × 10⁻³ |  |  |
| 1  3 sources<br>18 sensors | −27.697 | −30.686 | −42.226 | (−39.242) | (−41.554) | (−44.184) |
| 3  4 sources<br>24 sensors | −38.638 | −41.629 | −46.455 | −56.253 | (−53.891) | (−54.754) |
| 5  3 sources<br>inside<br>16 sensors | −36.023 | −43.889 | −54.003 | (−48.421) | (−50.921) | — |
| 6  3 sources<br>outside<br>16 sensors | −35.957 | −44.292 | −55.145 | (−49.299) | (−50.388) | — |

Lower values of AIC can be interpreted as having a greater likelihood of being correct. In these examples, the AIC is combined with a threshold silhouette value of 0.7. Values shown in (parentheses) can be rejected because they correspond to silhouette values below threshold. From the remaining values, the lowest AIC value is used to determine the number of sources A, and is indicated in bold.

As seen in Table 3, the combination of silhouette threshold and AIC yields the correct number of sources in all four examples.

XII. Effect of Source Correlations

The Shift-NMFk procedure is found to be influenced by the degree of correlation of the source signals. In some examples, it can be hard for any procedure to distinguish between two correlated sources and one source. Thereby good reconstruction can be obtained even with incorrect signals. A study was performed using a series of examples with three sources, in which varying correlation was imposed between two of the signals. The third source remained uncorrelated with the other two. For each value of correlation, a group of 100 Shift-NMF trials was performed, and the proportion of trials resulting in good reconstruction (cosine distance below 0.05) was studied. Because the objective of this study was to demonstrate varying proportions of trials that would fail one or more selection criteria, selection criteria were not applied in this study. The correlation study shows how many Shift-NMF trials would have to be discarded in examples with highly correlated signals. In some actual Shift-NMFk examples, many such trials could be discarded through application of selection criteria as described above.

Figure 16:
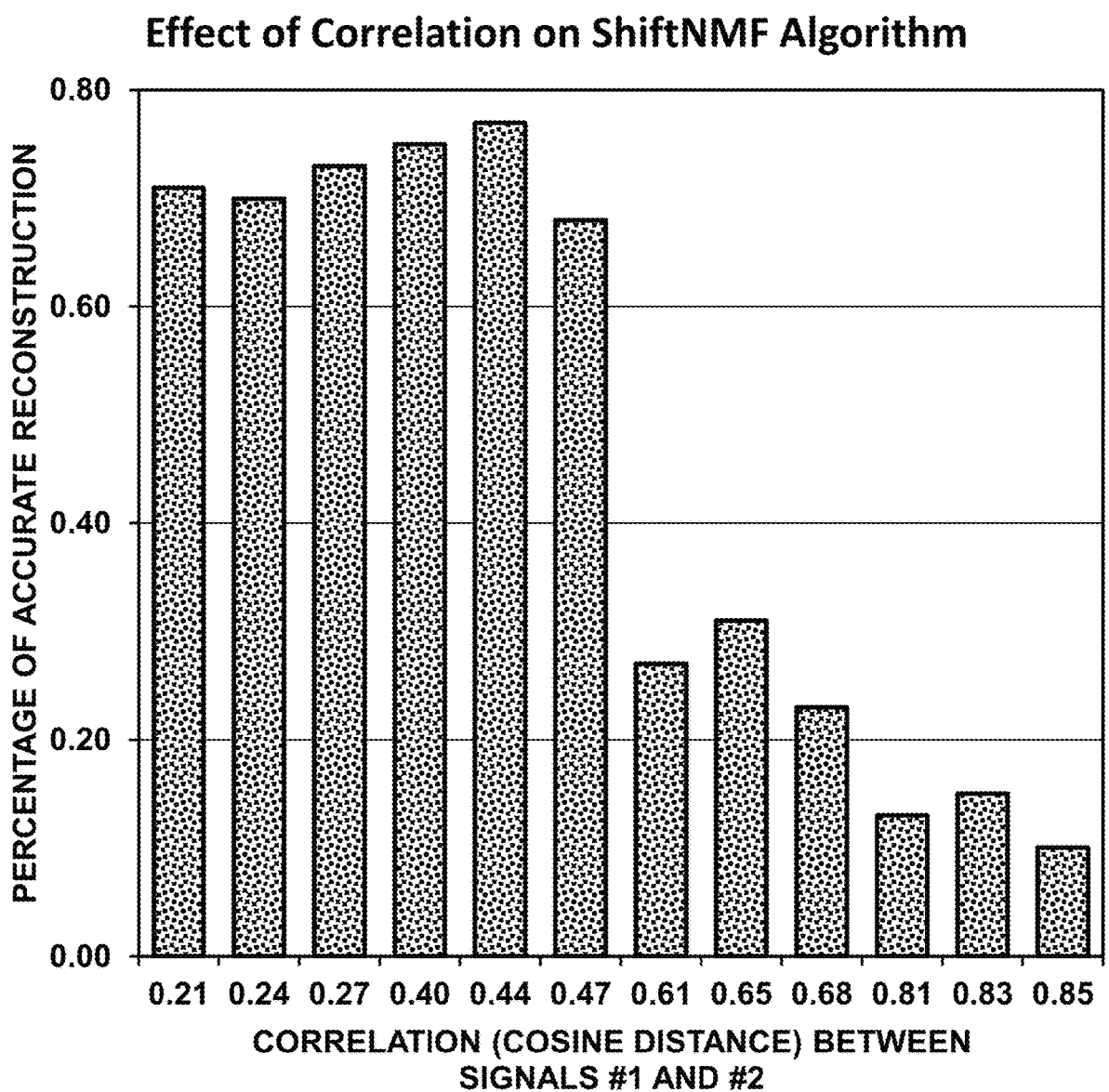
FIG. 16 is a bar chart illustrating reconstruction accuracy for a synthetic example problem having three sources, with varying correlations between two of the sources according to an example of the disclosed technology.

FIG. 16 shows results from this study. Success rates above 70% were found for correlations up to 0.5, with steep drop-off in success at and above correlation of 0.6.

The above examples illustrate the applicability of the Shift-NMFk procedure for identification of unknown delayed sources based on Shift-NMF combined with custom semi-supervised clustering, minimization, and elimination procedures. The synthetic examples successfully identified the number and the location of unknown sources based on mixed signals recorded by arrays of monitoring sensors, without any additional information about the sources, their locations, or source-to-sensor delays. This inverse problem is under-determined (ill-posed). The Shift-NMFk algorithm explores plausible inverse solutions and their corresponding delays, and estimates the optimal number of signals needed to robustly and accurately characterize the observed data. The signals and their associated delays are also determined. Together with knowledge of the geometry of the sensor array and, in some examples, knowledge of an attenuation model (specifically, how the drop-off of signal amplitude varies with distance), the locations of the unknown sources can be determined. Thus, the number of unknown sources, their signals, their delays, and their locations can all be determined.

XIII. Experimental Results—Green-NMFk

Figure 17:
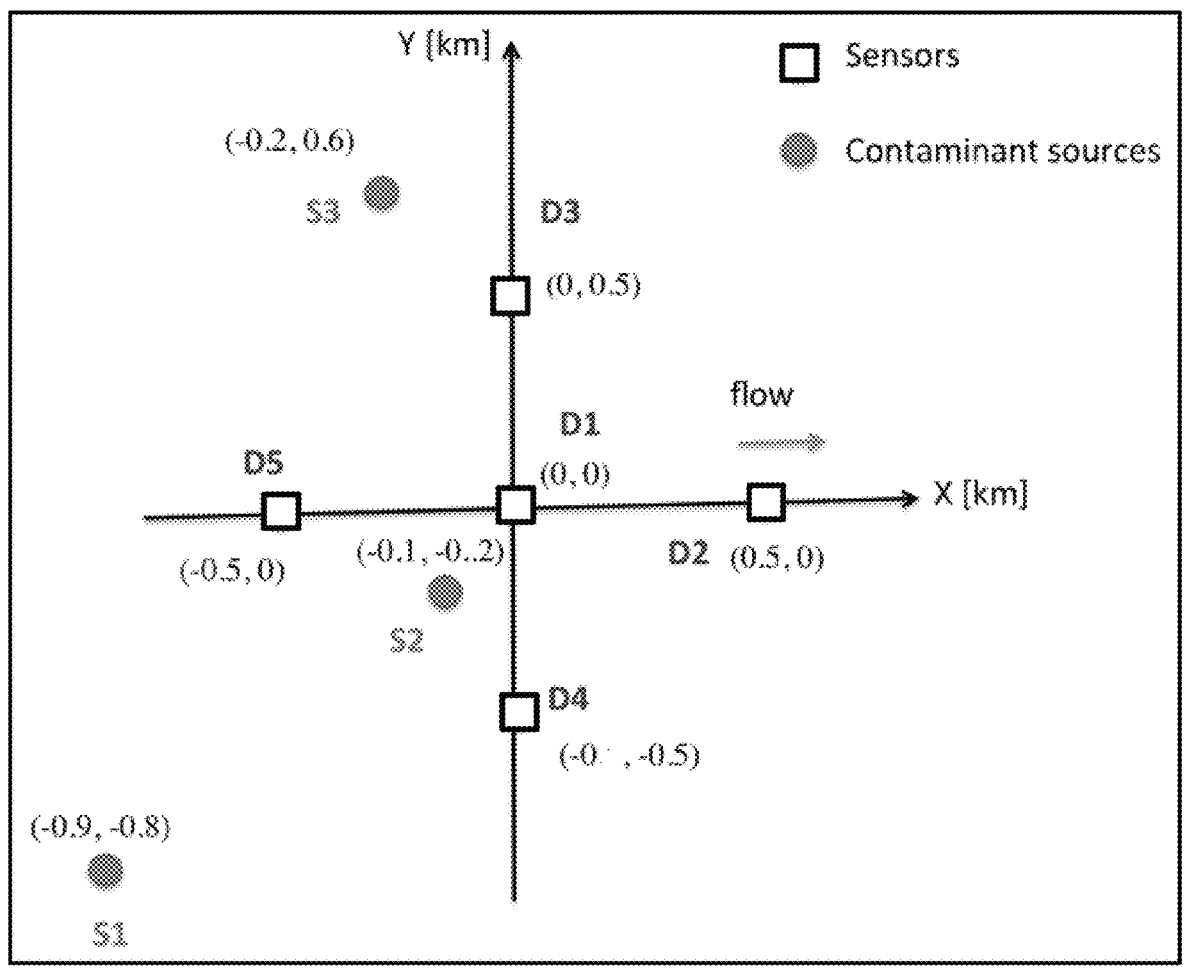
FIG. 17 is a diagram illustrating spatial locations of three contaminant sources and five sensors in a synthetic example problem according to an example of the disclosed technology.

Synthetic datasets were used to verify capabilities and performance of the Green-NMFk procedure. FIG. 17 is a diagram illustrating spatial locations of three contaminant sources and five sensors for the synthetic 2-D examples described below. Three contaminant sources S1-S3 are represented by solid circles, while five sensors D1-D5 are represented by open squares, with Cartesian coordinates as shown. All dimensions are in kilometers. The sensor positions were randomly chosen, subject to an assumption that the sources are upstream from the sensors. Physical parameters of the sources and medium have been set to approximate an aquifer near LANL. An advection vector was assumed to be 0.05 km/year. Due to the presence of advection and mechanical dispersion, anisotropic dispersion parameters were assumed: $D_x$=0.005 km/yr² and $D_y$=0.00125 km/yr², which corresponds to $D_y/D_x$=0.25. Sources are assumed to have been activated at t=−10 years, while data collection was begun at t=0. The source strengths of S1-S3 are 0.5, 0.7, and 0.3 respectively. The sensors were sampled quarterly for 80 time points, giving a total sampling interval of approximately 20 years. Adding Gaussian noise of amplitude $10^3$ (relative to the source strength), observational data matrices were constructed for 1, 2, and 3 of the sources shown in FIG. 17, to be used as synthetic input data to a Green-NMFk procedure.

Because the H matrix incorporates three parameters (source index i, sensor index n, and time index m), it was reshaped for computational efficiency as a two-dimensional matrix of size A×(N×T), with the $i^{th}$ row corresponding to source i (from 1 to A) and comprising a long vector of length N (number of sensors) times T (number of sampling times). This facilitates simultaneous minimization with respect to all data points.

A function which is a linear combination of A Green's functions (for A point-like sources) was formed, with unknown source coordinates $x_s$ and $y_s$, and unknown strength $Q_s$. The parameters of the medium $v_x$, $D_x$, and $D_y$ are also unknown. An NLS minimization procedure was run, starting with random values for the unknown parameters, until the L2 cost converged, or until a maximum number of iterations was reached. For each possible number of sources (b=1, 2, 3), runs were performed with M=10,000 Diffuse-NMF trials. Then, following the algorithm outlined above, those were gradually pruned, guided by the quality of clustering of the remaining solutions.

Example 7: One Source and Three Sensors

Figure 18:
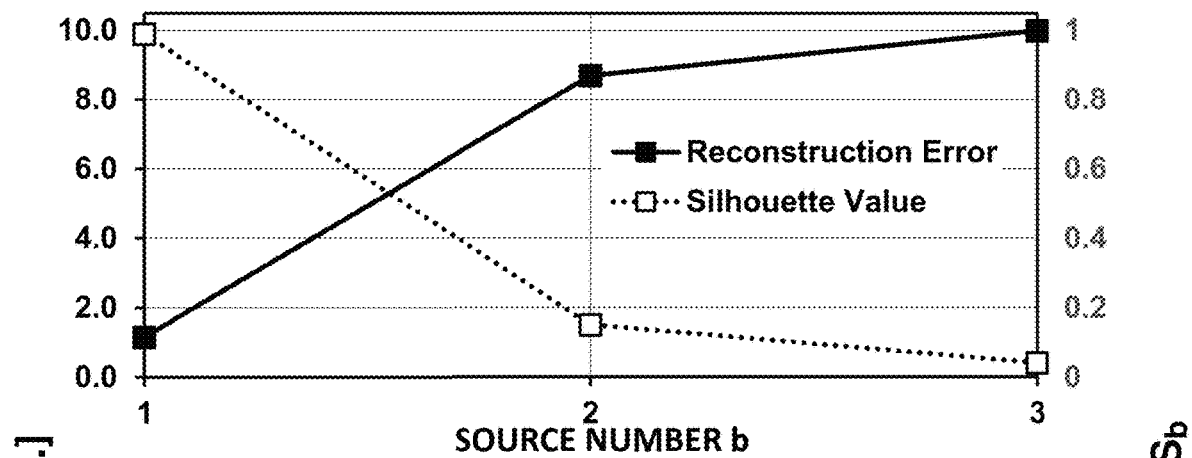
FIG. 18 is a graph illustrating reconstruction error and silhouette value for a synthetic example problem having one source and three detectors according to an example of the disclosed technology.

The first example has only one point-like source, S3, with coordinates (0.2, −0.6) and strength $Q_3$=0.3, and with three detectors; D3, D2, and D4. FIG. 18 shows the clustering evaluation parameters as a function of source number b. The right-hand axis and the solid circles indicate the silhouette value $S_b$, while the left-hand value and the open circles shows a measure of reconstruction error, in arbitrary units (a.u.). It is apparent that the only value of source number b for which degree of cluster separation is high and reconstruction error is low is b=1, and this is the answer determined by the Green-NMFk procedure. As shown in Table 4, determination of number of sources using AIC yields the same result.

The following source and transport parameters were determined from the results for b=1: advection velocity $v_x$=0.005002 km/year; transport parameters $D_x$=0.050125 km/year$^2$ and $D_y$=0.0012485 km/year$^2$; the coordinates of the source $S_3$ ($x_3$=0.1980 km, $y_3$=−0.59874 km); and source strength $Q_3$=0.29913. As shown in Table 4, all of these results are in excellent agreement with the parameters used to construct the synthetic data, demonstrating the quality and robustness of the Green-NMFk procedure.

Example 8: Two Sources and Four Sensors

Figure 19:
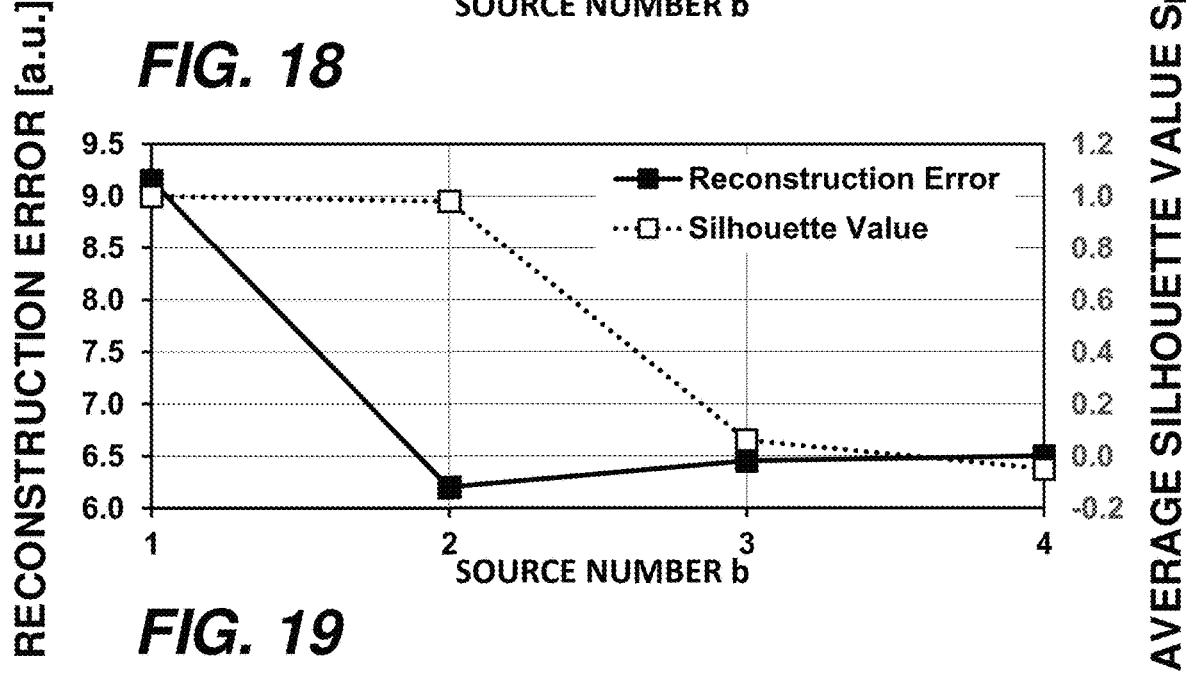
FIG. 19 is a graph illustrating reconstruction error and silhouette value for a synthetic example problem having two sources and four detectors according to an example of the disclosed technology.

The second example has only two point-like sources S1 and S2, and four detectors D1, D2, D3, and D4, as shown in FIG. 17. FIG. 19 shows the corresponding clustering evaluation parameters as a function of source number b. The right-hand axis and the solid circles indicate the silhouette value $S_b$, while the left-hand value and the open circles shows a measure of reconstruction error, in arbitrary units (a.u.). It is seen that the degree of cluster separation falls off sharply above b=2, while the reconstruction error is best at b=2. The only suitable answer for the number of sources is 2: for b=1, the reconstruction error is high, while for b≥3, the degree of cluster separation is poor. Green-NMFk returns an answer of 2 for the number of sources. The following source and transport parameters were determined from the results for b=2: advection velocity $v_x$=0.005012 km/year; transport parameters $D_x$=0.052245 km/year$^2$ and $D_y$=0.0012496 km/year$^2$; the coordinates of the sources S1 ($x_1$=−0.89892 km, $y_1$=−0.80101 km), S2 ($x_2$=−0.09980 km, $y_2$=−0.19972 km); and source strengths $Q_1$=0.51147, $Q_2$=0.70401. All of these results are in excellent agreement with the parameters used to construct the synthetic data, confirming the quality and robustness of the Green-NMFk procedure.

Example 9: Three Sources and Five Sensors

Figure 20:
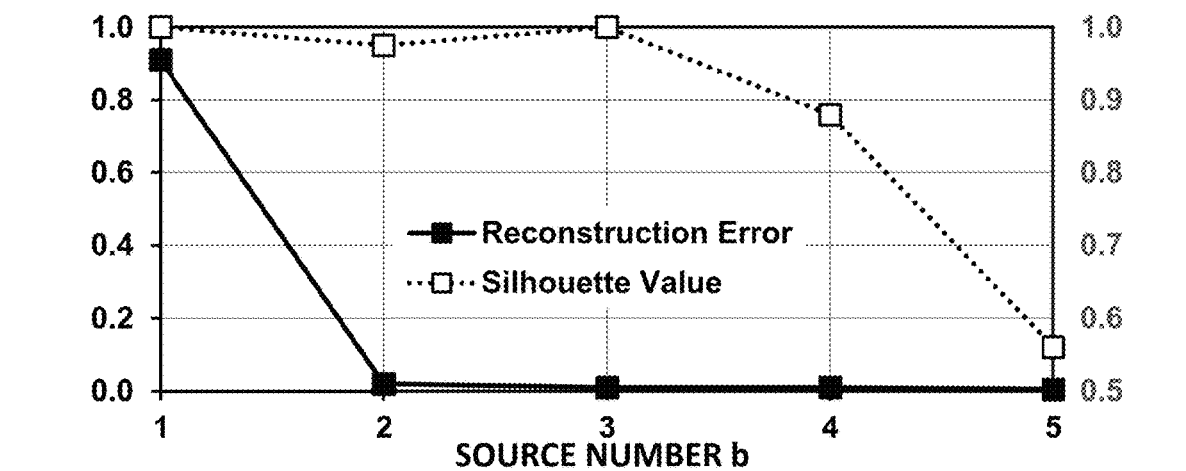
FIG. 20 is a graph illustrating reconstruction error and silhouette value for a synthetic example problem having three sources and five sensors according to an example of the disclosed technology.

The third example has only all three point-like sources S1-S3, and all five detectors D1-D5, as shown in FIG. 17. FIG. 20 shows the corresponding clustering evaluation parameters as a function of source number b. The right-hand axis and the solid circles indicate the silhouette value $S_b$, while the left-hand value and the open circles shows a measure of reconstruction error, in arbitrary units (a.u.). The best answer for the number of sources is 3: for b=1, the reconstruction error is high, while for b≥4, the degree of cluster separation deteriorates. b=2 has fairly good reconstruction error and fairly good cluster separation, however, b=3 is superior with regard to both measures. Green-NMFk returns b=3 for the number of clusters. The following source and transport parameters were determined from the results for b=3: advection velocity $v_x$=0.005132 km/year; transport parameters $D_x$=0.051341 km/year$^2$ and $D_y$=0.0012512 km/year$^2$; the coordinates of the sources S1 ($x_1$=−0.89850 km, $y_1$=−0.79940 km), S2 ($x_2$=−0.09751 km, $y_2$=−0.19958 km), S3 ($x_3$=−0.20069 km, $y_3$=0.59736 km); and source strengths $Q_1$=0.49899, $Q_2$=0.70380, $Q_3$=0.29732. These results are also in excellent agreement with the parameters used to construct the synthetic data, further confirming the quality and robustness of the Green-NMFk procedure.

The above examples illustrate the applicability of the Green-NMFk procedure for identification of contamination sources subject to diffusion and advection, based on Diffuse-NMF, which combines NMF with explicit Green's functions for the advection-diffusion equation, further combined with custom semi-supervised clustering, minimization and elimination procedures. The synthetic examples successfully identified the number and the location of unknown sources based on mixed signals recorded by arrays of monitoring sensors, without any additional information about the sources, their locations, or source-to-sensor transport. This inverse problem is under-determined (ill-posed). The Green-NMFk procedure explores plausible inverse solutions and their corresponding reconstructions, and estimates the optimal number of signals needed to robustly and accurately characterize the observed data. The signals, source locations, and transport parameters (such as advection velocity and dispersion coefficients) are also determined. The Green-NMFk can be applied to any real problem subject to partial-differential parabolic equation where mixtures of an unknown number of physical sources are monitored at multiple locations.

Example 10: Four Sources and Nine Sensors

A fourth example has only four point-like sources S1-S4, and nine detectors D1-D9; results of this example are described further below.

Example Application of AIC to Determine Number of Sources

Table 4 shows the Akaike Information Criterion (AIC) values for Examples 7-10 above, for different values of source number b. The two left columns identify the Example and provide the actual source/sensor configuration, while the remaining columns provide the AIC for different source numbers b as indicated in the top row.

TABLE 4

| Ex. | Source No. b Actual | 1 | 2 | 3 AIC × 10⁻³ | 4 | 5 |
|---|---|---|---|---|---|---|
| 7 | 1 source 3 detectors | −1.262 | −0.714 | −0.7 | na | na |
| 8 | 2 sources 4 detectors | −1.126 | −1.236 | (−1.209) | (−1.192) | na |
| 9 | 3 sources 5 detectors | −0.978 | −4.229 | −4.47 | (−4.455) | (−4.438) |
| 10 | 4 sources 9 detectors | −5.431 | −6.777 | −8.229 | −10.942 | (−10.794) |

| Ex. | Source No. b Actual | 6 | 7 | 8 AIC × 10⁻³ | 9 |
|---|---|---|---|---|---|
| 7 | 1 source 3 detectors | na | na | na | na |
| 8 | 2 sources 4 detectors | na | na | na | na |
| 9 | 3 sources 5 detectors | na | na | na | na |
| 10 | 4 sources 9 detectors | (−10.204) | (−9.865) | (−8.209) | (−8.024) |

Lower values of AIC can be interpreted as having a greater likelihood of being correct. In these examples, the AIC is combined with a threshold silhouette value of 0.7. Values shown in (parentheses) can be rejected because they correspond to silhouette values below threshold. From the remaining values, the lowest AIC value is used to determine the number of sources A, and is indicated in bold. Values marked "na" were not evaluated.

As seen in Table 4, the combination of silhouette threshold and AIC yields the correct number of sources in all four examples.

Example Verification of Source Parameters

In these examples, the source locations and amplitudes were also determined. Table 5 provides the summary of Green-NMFk results for Examples 7-10. The three left-hand columns identify the corresponding Example, source/detector configuration, and source number. The remaining pairs of columns compare actual values used to construct the synthetic example with values found through the Green-NMFk procedure for the following parameters: source amplitude Q, x coordinate, and y coordinate. Very good model parameter estimation can be noted.

TABLE 5

| | | | Q [Mg/L] | | x [km] | | y [km] | |
|---|---|---|---|---|---|---|---|---|
| Ex. | Case | Source | Actual | Found | Actual | Found | Actual | Found |
| 7 | 1 source 3 detectors | #1 | 0.300 | 0.299 | −0.200 | −0.198 | 0.600 | 0.599 |
| 8 | 2 sources 4 detectors | #1 | 0.500 | 0.511 | −0.900 | −0.899 | −0.800 | −0.801 |
| | | #2 | 0.700 | 0.704 | −0.100 | −0.100 | −0.200 | −0.200 |
| 9 | 3 sources 5 detectors | #1 | 0.300 | 0.297 | −0.200 | −0.201 | 0.600 | 0.597 |
| | | #2 | 0.500 | 0.499 | −0.900 | −0.899 | −0.800 | −0.744 |
| | | #3 | 0.700 | 0.704 | −0.100 | −0.097 | −0.200 | −0.199 |
| 10 | 4 sources 9 detectors | #1 | 0.500 | 0.502 | −0.300 | −0.300 | 0.400 | 0.400 |
| | | #2 | 0.500 | 0.499 | −0.300 | −0.300 | −0.400 | 0.403 |
| | | #3 | 0.500 | 0.500 | −0.300 | −0.301 | 0.650 | 0.650 |
| | | #4 | 0.500 | 0.510 | −0.100 | −0.099 | −0.250 | 0.249 |

XIV. Further Variations

Examples with Constraints

Some examples above have been presented for problems in which detected signals are additive and the principle of linear superposition applies. In such problems, update steps such as shown above at Equations (3) and (4) above can be used. However in other problems in which a constraint is applicable, detected signals may not be additive, and a variation of the NMF optimization can be used.

Constraints or non-additive signals can arise in different ways. In the context of groundwater contaminants, signals may be in the form of concentrations of various geochemical species. Combining a first flow containing species X with a second flow containing species Y can result in dilution of both flows, with a decrease in concentration of both species as seen in the mixture of the two flows. A similar situation is encountered if the two flows have a common species. The concentrations do not add linearly. In other problems, the measured signals can be a ratio of two constituents, including isotope ratios or delta notations based on standard normalized isotope ratios.

An example of a constraint can be a requirement that the source contributions at each sensor add up to unity (or, 100%), that is $\Sigma_{d=1}^{b} W_{n,d} = 1$ for mixing matrix W having row index n (from 1 to N) representing sensor n and column index d (from 1 to b) representing source d. Such a constraint can be applied to groundwater concentration problems, and to other problems where source contributions are physically constrained to add up to 1 or another sum value.

To determine an NMF solution by minimizing Frobenius norm O (Equation (2)) subject to a constraint, a nonconvex nonlinear optimzation procedure can be used such as the nonlinear minimization procedure provided by Julia packages JuMP.jl and Ipopt.jl, instead of the update procedure using Equations (3) and (4) described above.

Tables 6-8 present data from a synthetic constrained example in which three geochemical constituents (A, B, C) are monitored at each of five wells (W1-W5).

TABLE 6

Actual and found concentrations of three geochemical constituents (A, B & C) from two synthetic sources (S1 & S2).

| H:2 × 3 | Actual | | | Found | | |
|---|---|---|---|---|---|---|
| Source | A | B | C | A | B | C |
| S1 | 0.932661 | 0.793833 | 1.000000 | 0.927047 | 0.776642 | 1.077320 |
| S2 | 1.000000 | 1.000000 | 0.072724 | 0.996028 | 0.987838 | 0.127424 |

TABLE 7

Actual and found mixing coefficients of the two sources at five monitoring wells (W1-W5).

| W:5 × 2 | Actual | | Found | |
|---|---|---|---|---|
| Well | S1 | S2 | S1 | S2 |
| W1 | 0.901005 | 0.098996 | 0.821967 | 0.178033 |
| W2 | 0.734414 | 0.265586 | 0.659343 | 0.340657 |
| W3 | 0.33299 | 0.66701 | 0.267476 | 0.732524 |
| W4 | 0.466407 | 0.533593 | 0.397717 | 0.602283 |
| W5 | 0.468169 | 0.531831 | 0.399436 | 0.600564 |

TABLE 8

True and estimated concentrations of the three geo-chemical constituents (A, B, C) observed at five observation points (W1-W5).

| V: 5 × 3 | Actual | | | Found | | |
|---|---|---|---|---|---|---|
| Well | A | B | C | A | B | C |
| W1 | 0.939328 | 0.814242 | 0.908204 | 0.939328 | 0.814242 | 0.908204 |
| W2 | 0.950546 | 0.848588 | 0.753729 | 0.950546 | 0.848588 | 0.753729 |
| W3 | 0.977577 | 0.931348 | 0.381497 | 0.977577 | 0.931348 | 0.381497 |
| W4 | 0.968593 | 0.903842 | 0.505212 | 0.968593 | 0.903842 | 0.505212 |
| W5 | 0.968474 | 0.903479 | 0.506846 | 0.968474 | 0.903479 | 0.506846 |

The left-hand sides of Tables 6-8 show the actual data of the synthesized example, while the right-hand sides of these tables show the solutions achieved by the disclosed constrained optimization procedure. That is, the left-hand side of Table 6 shows the actual sources used to construct the synthesized example (2×3 matrix $H_{d,m}$), the left-hand side of Table 7 shows the mixing coefficients (5×2 matrix $W_{n,d}$), and the left-hand side of Table 8 shows the observed (5×3 matrix $V_{n,m} = W_{n,d}H_{d,m}$). Note that the rows of the W matrix (Table 7) are constrained to add up to 1. In this example, the geochemical concentrations are taken to be time-invariant, the index m from 1 to 3 is used to identify the chemical species A, B, and C. The constrained optimization procedure seeks to match the concentration of every component (columns in Table 8) at every well (rows in Table 8).

In this example, there are a fixed number of measurements: 5 wells×3 chemical components=15 observations. As apparent from Tables 6-7, a two source solution has 16 model parameters (6 for the H matrix in Table 6 and 10 for the W matrix in Table 7). Similarly, a three source solution would have 24 model parameters (15 for W and 9 for H). Thus, the problem is under-determined.

Turning to the right-hand sides of Tables 6-8, the results of NMF minimization are shown for the case of b=2 candidate sensors. Table 8 shows that the NMF minimization reaches an excellent agreement with the synthesized measurement data, which could be unsurprising given the large number of model parameters. The determined source matrix (right-hand side of Table 6) and determined mixing matrix (right-hand side of Table 7) are in general agreement with the original values used for synthesis. A similar analysis can be performed for different numbers of candidates sources such as b=1 and b=3. Table 9 shows the reconstruction error (Frobenius norm O), degree of clustering (silhouette value S), and Akaike Information Criterion (AIC) obtained for different values of b.

TABLE 9

Constrained NMFk results; the reconstruction quality O, silhouette value S, and AIC for source numbers b = 1-3.

| Source Number b | Reconstruction Error O | Silhouette Value S | Akaike Information Criterion AIC |
|---|---|---|---|
| 1 | 0.193 | 1 | 11.455 |
| 2 | 8.346 × 10⁻¹⁶ | 0.984 | −235.066 |
| 3 | 2.506 × 10⁻¹⁶ | 0.594 | −242.489 |

It is apparent that b=2 has high silhouette value and low reconstruction error and therefore the correct number of sources is A=2. It can be noted from Table 9 that the AIC is also low (good) for b=2, however AIC used by itself does not give the correct number of sources. A combination of silhouette value and AIC, or a combination of silhouette value with reconstruction error, is superior to using AIC alone.

In this example, the AIC has been defined as $$AIC = 2 \cdot P - 2 \cdot \ln(L) = 2 \cdot (b \cdot (N + M) - N) + NM \cdot \ln\left(\frac{O^{(b)}}{NM}\right) \quad (47)$$

where P is the number of free parameters, L is the likelihood, b is the source number, N is the number of sensors, M is the number of geochemical components, and $O^{(b)}$ is the reconstruction error for source number b.

The nonlinear optimization procedure is applicable to a wide range of constraints as can be encountered in diverse problems. This procedure can also be applied to transient data by repeating for multiple snapshots in time. In general, the problem of identifying groundwater sources can be complicated by similarity between geochemical signatures of different sources, and by chemical interaction between species or non-conservation of species en route from sources to detectors. Furthermore, various processes such as diffusion, dispersion, precipitation, retardation, or sorption can also occur.

Examples with Systematic Errors

In some applications of NMF, inadvertent signal shifts can arise. For example, NMF has been applied to analyzing material constituents of X-ray microdiffraction patterns in a combinatorial materials library. The additive composition of sample microdiffraction patterns from the spectra of identifiable constituents is well-suited to NMFk analysis. However, it has been observed that spurious spectra can arise as experimental artifacts, for example due to lattice deformation. Particularly, a material constituent can give rise to one spectral signature having the expected diffraction peaks, as well as another, spurious, signature in which the main peaks are shifted in angular position relative to the expected signature. In another example, a physical environment can cause a signal source to appear as a combination of a true source and a spurious image source.

A new procedure, Estimation of Systematic Errors in the Features (ESEF) has been developed to address such problems. In ESEF examples, pair-wise cross-correlations are evaluated among the basis sources determined from an NMFk, Shift-NMFk, or Green-NMFk analysis. For X-ray diffraction signals, the cross-correlation can be determined as a function of a signal shift which is a change in the diffraction angle. For wave propagation applications, the cross-correlation can be determined as a function of time. In other applications, the shift of the spurious signal can be described in another physical or abstract domain, and the cross-correlations determined accordingly. From one or more observed cross-correlation peaks, one or more spurious or distorted signals can be identified and removed from the NMFk, Shift-NMFk, or Green-NMFk solution.

In examples, certain constraints can be invoked to improve the effectiveness of an ESEF procedure. These constraints can include (a) an upper bound on the spurious signal shift, such as 0.5° in a diffraction application, (b) a matching criterion, such as a requirement that the spurious signal can have a number of peaks (above a predetermined absolute or relative threshold) that equals the number of peaks in the correlated true or expected signal, (c) a threshold on degree of correlation, such as Pearson correlation coefficient >0.95, which can ensure that the rejected signal source is indeed spurious, or (d) a statistical test for a null hypothesis of independent sources, for example a test on the matrix of p-values of pairwise correlations.

Example Fast Clustering Procedure

The equipartition constraint described above means that each cluster contains one source from $H_b^1$, one source from $H_b^2$, and so forth to one source from $H_b^k$ (see Equations (18) or (43)). Thus, the clustering problem can be considered as a combinatorial problem, namely picking combinations from $H_b^k$. Further, the basis sources are determined from the centroids of each cluster, and are somewhat insensitive to a substitution of a single candidate source, especially when the number of trials is large. Therefore, an alternative clustering procedure can be used to approximate optimal clusters. Semi-supervised Combinatorial Clustering (SCC) is a novel, fast, and embarrassingly parallel alternative clustering procedure that provides excellent results for certain problems, and is computationally tractable for very large scale problems that can be challenging for k-Means clustering or other computationally intensive techniques.

In SCC examples, each trial solution $H_b^i$ is processed independently, and no distances are calculated. Rather, the rows of each $H_b^i$ are sorted according to a magnitude of their respective norms. That is, the sources are sorted by size. Then, at the end of k trials, the first rows of the $H_b^i$ (the first rows being the candidate sources with the smallest norms in each $H_b^i$) are gathered into a first cluster, the centroid of which is calculated as the first basis source; the second rows of the $H_b^i$ lead to a second cluster and a second basis source, and so forth, until the last rows (with the largest norms in each $H_b^i$) are gathered into the $k^{th}$ cluster. To maintain consistency in operations involving e.g. the W or τ matrices, they can be permuted to match the sorting of the $H_b^i$ matrix for each trial.

Example Layered Procedure

In certain examples, a single application of an NMFk, Shift-NMFk, or Green-NMFk procedure can yield results which accurately reconstruct the mixed signals observed at some but not all sensors. This can arise from having heterogeneous datasets, or datasets in which there is a wide dynamic range between dominant factors and secondary factors. In a groundwater transport application, there can be separation between groups of sources and/or sensors due to geographic separation or distinct contaminant types. In a cancer genomics application, a dataset could combine weak signals for children and strong signals for adults.

A new procedure, Deep Hierarchical Layer Factorization (DHLF) has been developed to address such problems. In DHLF examples, NMFk, Shift-NMFk, or Green-NMFk can be applied in successive layers. At each layer, certain sources are determined which accurately reconstruct signals at a corresponding set of sensors. These sources and sensors form a sub-block of the original problem. Then, these sensors can be removed from the problem, and the determined sources can be either removed or subtracted from the problem, leaving a residual problem at the next layer. The NMFk, Shift-NMFk, or Green-NMFk procedure can be applied to successive layers to determine additional sources to reconstruct further sensor signals. This iterative procedure can be repeated until all sensor signals have been suitably reconstructed, or until no improvement can be obtained. Thus an observed dataset V can be factorized into L layers $V \approx V_1 \oplus V_2 \oplus \ldots \oplus V_L$. The sizes (number of sensors) of each layer are independent and can be different; the number of sources associated with each layer are also independent and can be different. In examples, DHLF can be applied with no a priori knowledge of sub-blocks or separability.

Example Applicability to Diverse NMF Variants

Non-negative matrix factorization is widely used, in many variants. The disclosed technologies can be applied to any NMF variant to provide robust, optimal, and stable solutions for problems with an unknown number of sources or contributing features in the presence of signal shifts or other constraints. Particularly, any of these NMF variants can benefit from the disclosed technologies: sparse NMF, semi-supervised NMF, semi-nonnegative NMF, NMF on manifolds (graph regularized NMF, or GNMF), NMF with missing values (e.g. for recommendations), online NMF, NMF for clustering, NMF used in deep learning as a pre-training layer (e.g., non-negative autoencoders), NMF on kernels (non-linear NMF), coupled NMF for data fusion, NMF with singular value decomposition (SVD) or other kind of smart initialization, or binary NMF (where signals take binary values such as 0 or 1).

XV. Example Computing Environment

FIG. 21 illustrates a generalized example of a suitable computing environment 2100 in which described examples, techniques, and technologies, including generating and analyzing measurement data, can be implemented. For example, the computing environment 2100 can implement all of the analysis functions described with respect to FIGS. 1-6, as described herein.

The computing environment 2100 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, compute clusters, supercomputers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 21, the computing environment 2100 includes at least one central processing unit 2110 and memory 2120. In FIG. 21, this most basic configuration 2130 is included within a dashed line. The central processing unit 2110 executes computer-executable instructions and may be a real or a virtual processor. In a multi-processing system, multiple processing units execute computer-executable instructions to increase processing power and as such, multiple processors can be running simultaneously. The memory 2120 may be volatile memory (e.g., registers, cache, RAM), non-volatile memory (e.g., ROM, EEPROM, flash memory, etc.), or some combination of the two. The memory 2120 stores software 2180, images, and video that can, for example, implement the technologies described herein. A computing environment may have additional features. For example, the computing environment 2100 includes storage 2140, one or more input devices 2150, one or more output devices 2160, and one or more communication connections 2170. An interconnection mechanism (not shown) such as a bus, a controller, or a network, interconnects the components of the computing environment 2100. Typically, operating system software (not shown) provides an operating environment for other software executing in the computing environment 2100, and coordinates activities of the components of the computing environment 2100.

The storage 2140 may be removable or non-removable, and includes magnetic disks, magnetic tapes or cassettes, CD-ROMs, CD-RWs, DVDs, or any other medium which can be used to store information and that can be accessed within the computing environment 2100. The storage 2140 stores instructions for the software 2180 and measurement data, which can implement technologies described herein.

The input device(s) 2150 may be a touch input device, such as a keyboard, keypad, mouse, touch screen display, pen, or trackball, a voice input device, a scanning device, or another device, that provides input to the computing environment 2100. The input device(s) 2150 can also include interface hardware for connecting the computing environment to control and receive data from measurement acquisition components, control excitation sources, or to display data processed according to methods disclosed herein, including data acquisition systems coupled to a plurality of sensors.

For audio, the input device(s) 2150 may be a sound card or similar device that accepts audio input in analog or digital form, or a CD-ROM reader that provides audio samples to the computing environment 2100. The output device(s) 2160 may be a display, printer, speaker, CD-writer, or another device that provides output from the computing environment 2100.

The communication connection(s) 2170 enable communication over a communication medium (e.g., a connecting network) to another computing entity. The communication medium conveys information such as computer-executable instructions, compressed graphics information, video, or other data in a modulated data signal.

Some examples of the disclosed methods can be performed using computer-executable instructions implementing all or a portion of the disclosed technology in a computing cloud 2190. For example, collection of measurement data can be executed in the computing environment (e.g., by the measurement acquisition component 120), while analysis of the measurement data can be performed on remote servers located in the computing cloud 2190 (e.g., as part of the computing environment 2100 of FIG. 1).

Computer-readable media are any available media that can be accessed within a computing environment 2100. By way of example, and not limitation, with the computing environment 2100, computer-readable media include memory 2120 and/or storage 2140. As should be readily understood, the term computer-readable storage media includes the media for data storage such as memory 2120 and storage 2140, and not transmission media such as modulated data signals.

Having described and illustrated the principles of our innovations in the detailed description and accompanying drawings, it will be recognized that the various examples can be modified in arrangement and detail without departing from such principles.

In view of the many possible examples to which the principles of the disclosed invention may be applied, it should be recognized that the illustrated examples are only preferred examples of the invention and should not be taken as limiting the scope of the invention. We claim as our invention all such embodiments as may come within the scope of the following claims and equivalents thereto.

We claim:

1. A method, comprising:
    with a computer system:
        performing a plurality of non-negative matrix factorization (NMF) trials on mixed signals generated by one or more unidentified sources and detected by a plurality of sensors, each of the NMF trials producing a predetermined number b of candidate sources referred to each of the sensors according to a signal propagation model;

for each of the NMF trials, ranking the corresponding b candidate sources according respective magnitudes of the corresponding b candidate sources; and determining b basis sources for the mixed signals by:
for each index d from 1 to b, determining the $d^{th}$ basis source as an average, across the plurality of NMF trials, of the candidate sources having $d^{th}$ rank.

2. A method comprising:
performing the method of claim 1 for each of a sequence of values of the predetermined number b;
for each value of b:
calculating a first parameter representing reconstruction error of the b basis sources; and
calculating a second parameter representing separation of the b basis sources; and
determining a first number A of the unidentified sources for which a combination of the calculated first parameter and the calculated second parameter is optimized.

3. The method of claim 2, further comprising:
identifying the unidentified sources as the b basis sources determined with b equal to A.

4. The method of claim 1, further comprising:
responsive to determining the b basis sources, adjusting one or more conditions of a physical environment in which the sensors are located,
wherein the adjusting comprises at least one or more of the following acts, for at least a first one of the b basis sources and/or a first one of the sensors:
probing local conditions at or near a location of the first source,
counteracting the first source to reduce a signal strength of the first source, or
making changes in the physical environment that will reduce a contribution from the first source to the mixed signal detected by the first sensor, without changing the signal strength of the first source.

5. The method of claim 1, wherein the mixed signals represent one or more of: atmospheric pollution, water pollution, pressure transients, acoustic signals, seismic disturbances, or electromagnetic interference.

6. The method of claim 1, further comprising determining spatial locations for one or more of the b basis sources.

7. One or more computer-readable storage media storing computer-readable instructions that, when executed by the computer system, cause the computer system to perform the method of claim 1.

8. The method of claim 1, wherein the signal propagation model is a wave-like propagation model.

9. The method of claim 1, wherein the propagation model incorporates diffusion and advection.

10. The method of claim 1, wherein the average is a centroid.

11. The method of claim 1, wherein the computer system is a distributed computer system.

12. The method of claim 11, wherein the method is performed using more than one processor in the distributed computer system.

13. A computer-implemented system comprising:
one or more computing nodes each comprising one or more processors, memory coupled thereto, and one or more network adapters, the one or more computing nodes being interconnected by one or more network connections and configured to perform operations comprising:
performing a plurality of non-negative matrix factorization (NMF) trials on mixed signals generated by one or more unidentified sources and detected by a plurality of sensors, each of the NMF trials producing a predetermined number b of candidate sources referred to each of the sensors according to a signal propagation model;
for each of the NMF trials, ranking the corresponding b candidate sources according respective magnitudes of the corresponding b candidate sources; and
determining b basis sources for the mixed signals by:
for each index d from 1 to b, determining the $d^{th}$ basis source as an average, across the plurality of NMF trials, of the candidate sources having $d^{th}$ rank.

14. The computer-implemented system of claim 13, wherein the operations are performed for each of a sequence of values of the predetermined number b, and wherein the operations further comprise:
for each value of b:
calculating a first parameter representing reconstruction error of the b basis sources; and
calculating a second parameter representing separation of the b basis sources; and
determining a first number A of the unidentified sources for which a combination of the calculated first parameter and the calculated second parameter is optimized.

15. The computer-implemented system of claim 14, wherein the operations further comprise:
identifying the unidentified sources as the b basis sources determined with b equal to A.

16. The computer-implemented system of claim 13, wherein the one or more computing nodes are a plurality of computing nodes distributed over a plurality of locations.

17. A method, comprising:
with a computer:
performing a plurality of non-negative matrix factorization (NMF) trials on mixed signals generated by one or more unidentified sources and detected by a plurality of sensors, each of the NMF trials producing a predetermined number of candidate sources referred to each of the sensors according to a signal propagation model;
identifying clusters of the candidate sources and determining basis sources, by performing clustering on the candidate sources;
evaluating results of the clustering by:
generating a first parameter representing reconstruction error of at least one of the basis sources, and
generating a second parameter representing separation of at least two of the identified clusters; and
determining a first number of the unidentified sources for which a combination of the calculated first parameter and the calculated second parameter is optimized.

18. The method of claim 17, wherein the NMF trials are performed using one or more of:
sparse NMF, semi-supervised NMF, semi-nonnegative NMF, graph regularized NMF, NMF with missing values, online NMF, non-linear NMF, coupled NMF, or NMF incorporating singular value decomposition.

19. The method of claim 17, wherein the mixed signals take binary values.

20. The method of claim 17, further comprising determining, for at least one of the unidentified sources, one or more coordinates and respective uncertainty or uncertainties of the one or more coordinates.

21. The method of claim 17, wherein the first number is a minimum number for which:
    the reconstruction error is less than or equal to a predetermined accuracy threshold; and
    the separation is greater than or equal to a predetermined separation threshold.

22. The method of claim 17, wherein the mixed signals comprise one or more of:
    radioactivity; or
    microdiffraction patterns.

23. The method of claim 17, wherein the mixed signals comprise microdiffraction patterns, and the method further comprises:
    identifying one or more spurious sources by evaluating pair-wise cross-correlations among the basis sources; and
    removing the one or more spurious sources from the basis sources.

24. The method of claim 12, wherein the method is performed using a plurality of program modules stored in the distributed computer system.

25. The method of claim 24, wherein at least a first one of the plurality of program modules is stored in a local memory storage device of the distributed computer system and a second one of the plurality of program modules is stored in a remote storage device of the distributed computer system.

26. The computer-implemented system of claim 16, wherein one or more of the operations are performed by computing nodes in different locations.

27. The method of claim 17, wherein the computer comprises distributed processors.

28. The method of claim 27, wherein the method is performed using more than one of the distributed processors.

* * * * *